(12) United States Patent
Ouellet et al.

(10) Patent No.: US 10,212,951 B2
(45) Date of Patent: Feb. 26, 2019

(54) SYSTEM AND METHOD FOR TRUSSING SLAUGHTERED BIRDS

(75) Inventors: Jean-Claude Ouellet, St-Jean-Port-Joli (CA); Jean-Guy Boucher, Saint-Étienne-de-Lauzon (CA); Jacques Grenier, Québec (CA); Jacques Aubin, St-Jean-Crysostome (CA); Nicolas Deschénes, Québec (CA); Alain Gaudreault, Québec (CA); Jean Labbé, Portneuf (CA)

(73) Assignee: CENTRE DE RECHERCHE INDUSTRIELLE DU QUÉBEC (CA)

( * ) Notice: Subject to any disclaimer, the term of this patent is extended or adjusted under 35 U.S.C. 154(b) by 1830 days.

(21) Appl. No.: 13/503,567

(22) PCT Filed: Oct. 22, 2010

(86) PCT No.: PCT/CA2010/001712
§ 371 (c)(1),
(2), (4) Date: Apr. 23, 2012

(87) PCT Pub. No.: WO2011/047487
PCT Pub. Date: Apr. 28, 2011

(65) Prior Publication Data
US 2012/0214391 A1 Aug. 23, 2012

Related U.S. Application Data

(60) Provisional application No. 61/254,549, filed on Oct. 23, 2009.

(51) Int. Cl.
*A22C 21/00* (2006.01)
(52) U.S. Cl.
CPC ............................. *A22C 21/0038* (2013.01)

(58) Field of Classification Search
CPC . A22C 21/00; A22C 21/0007; A22C 21/0015; A22C 21/0023; A22C 21/0038; A22C 21/0046
(Continued)

(56) References Cited

U.S. PATENT DOCUMENTS 2,560,067 A 7/1951 Bell
3,082,475 A 3/1963 Belknap
(Continued)

FOREIGN PATENT DOCUMENTS

EP 413629 A1 2/1991
EP 425400 A1 5/1991
(Continued)

OTHER PUBLICATIONS

Siebeck GMBH, Chicken Trussing Machine FRT-MF, http://www.siebeck.de/poultry-tying-machine-FRT-MF.html, Mar. 27, 2009.

*Primary Examiner* — Richard T Price, Jr.

(57) ABSTRACT

A system for trussing slaughtered birds comprises a conveyer provided with at least one bird holder for transporting a bird to at least one working position along the transport path of the conveyer, a bird trussing station located at the working position, which station includes a trussing module defining a working zone, and a mechanical arrangement for bringing the bird within the working zone in predetermined position and orientation relative thereto to allow for operation of the trussing module according to a trussing pattern by which a trussing element catches and maintains the bird in a trussed condition. The system further comprises a controller operatively connected to the conveyer and the bird trussing station. The system may also comprise a bird's legs crossing station located at a working position upstream the trussing station where the trussing of bird's legs is desired. The system may further comprise a bird's legs flexing station located at a working position upstream the bird's legs (Continued)

crossing station, to flex bird's legs sufficiently to provide relaxation thereof prior to flexion. A further trussing station for applying a further trussing element to the bird according to another pattern may also be used by the system.

56 Claims, 77 Drawing Sheets

(58) Field of Classification Search
USPC .......................................... 452/177–179, 185
See application file for complete search history.

(56) References Cited

U.S. PATENT DOCUMENTS

| | | |
|---|---|---|
| 3,955,002 A | 5/1976 | Maxon et al. |
| 3,986,231 A | 10/1976 | Harben |
| 4,074,389 A | 2/1978 | Blair et al. |
| 4,121,321 A | 10/1978 | Mosterd |
| 4,255,831 A | 2/1981 | Van Ginkel et al. |
| 4,339,847 A | 7/1982 | Niccolls |
| 4,458,380 A | 7/1984 | Tendick et al. |
| 4,550,473 A | 11/1985 | Simmons |
| 4,574,428 A | 3/1986 | Meyn |
| 4,597,133 A | 7/1986 | Van de Nieuwelaar |
| 4,619,017 A | 10/1986 | Simmons |
| 4,660,256 A | 4/1987 | Innes et al. |
| 4,756,056 A | 7/1988 | Innes et al. |
| 5,340,351 A | 8/1994 | Minderman et al. |
| 6,450,873 B2* | 9/2002 | van der Steen ........ A22C 21/00 452/185 |
| 6,899,613 B2* | 5/2005 | van den Nieuwelaar .................. A22B 3/005 452/63 |
| 7,175,519 B2 | 2/2007 | Mignone et al. |
| 7,476,148 B2* | 1/2009 | McQuillan ......... A22C 21/0038 452/154 |
| 8,105,138 B2* | 1/2012 | Van Den Nieuwelaar .................. A22C 21/0038 452/177 |
| 8,900,039 B2* | 12/2014 | Drabbels ............ A22C 21/0046 452/116 |
| 2007/0243807 A1 | 10/2007 | McQuillan et al. |

FOREIGN PATENT DOCUMENTS

| | | |
|---|---|---|
| EP | 493852 B1 | 10/1996 |
| EP | 1419697 A1 | 5/2004 |
| EP | 2201844 A1 | 6/2010 |
| FR | 2724294 A1 | 3/1996 |
| WO | 9811784 A1 | 3/1998 |
| WO | 2005011389 A1 | 2/2005 |

* cited by examiner

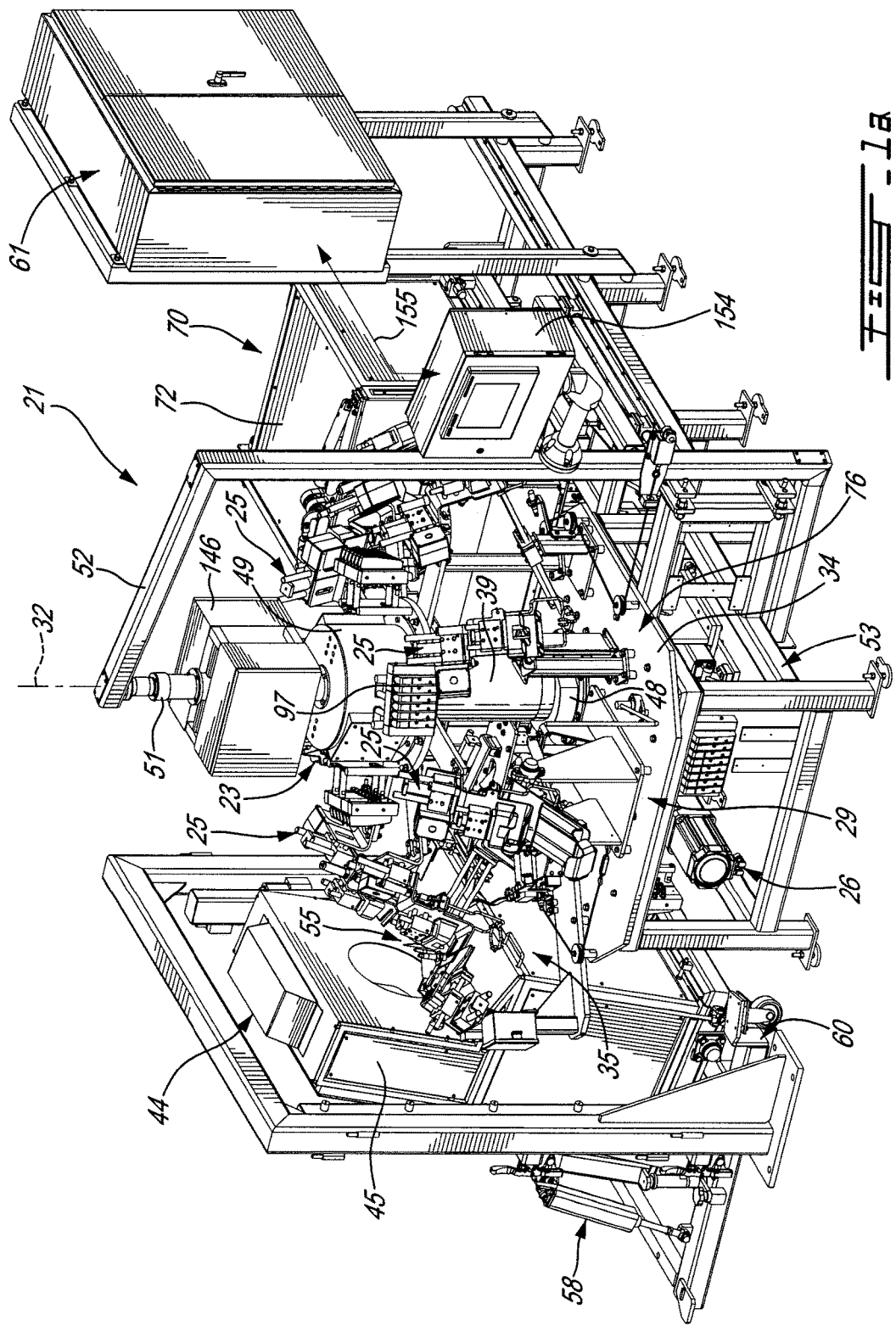

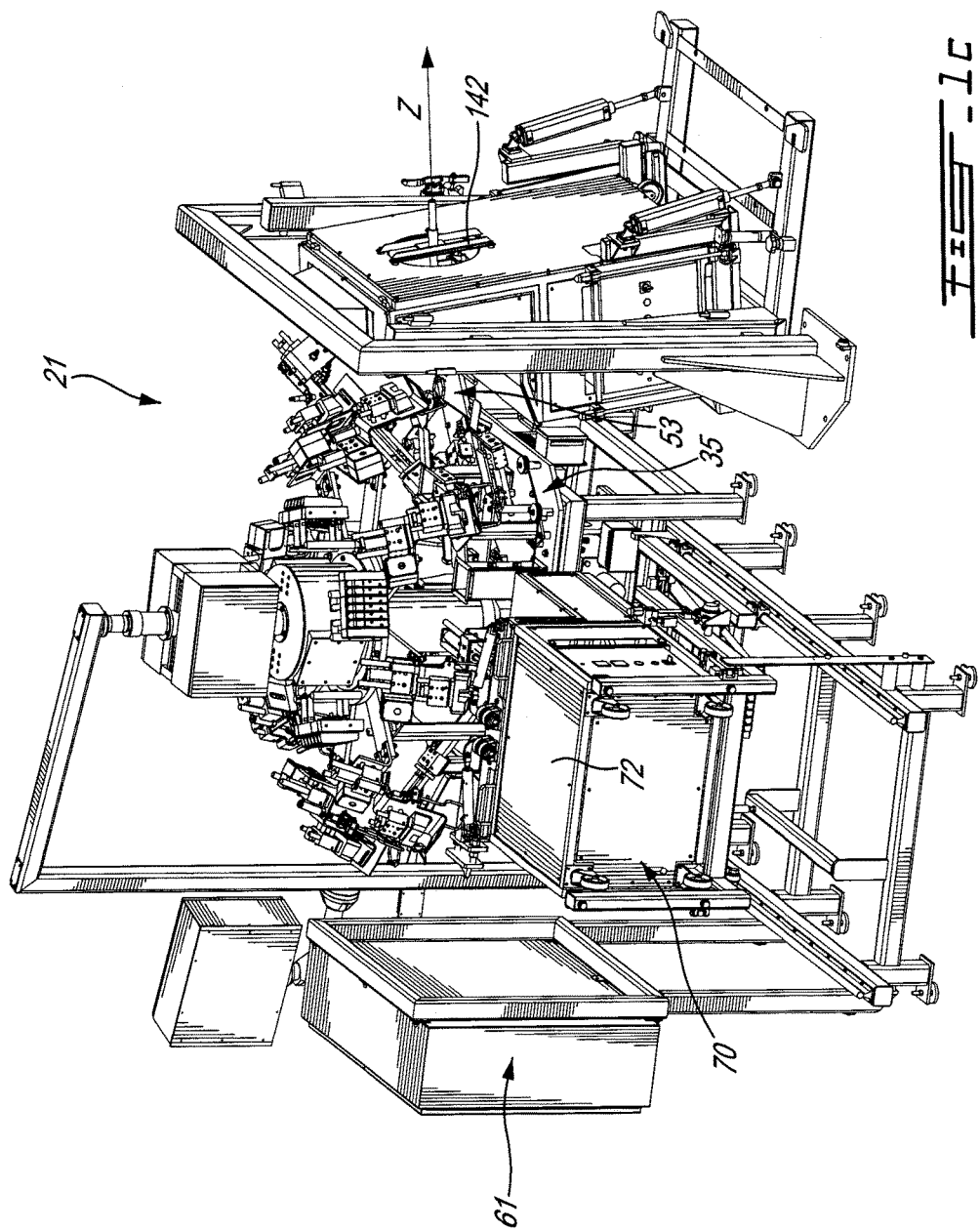

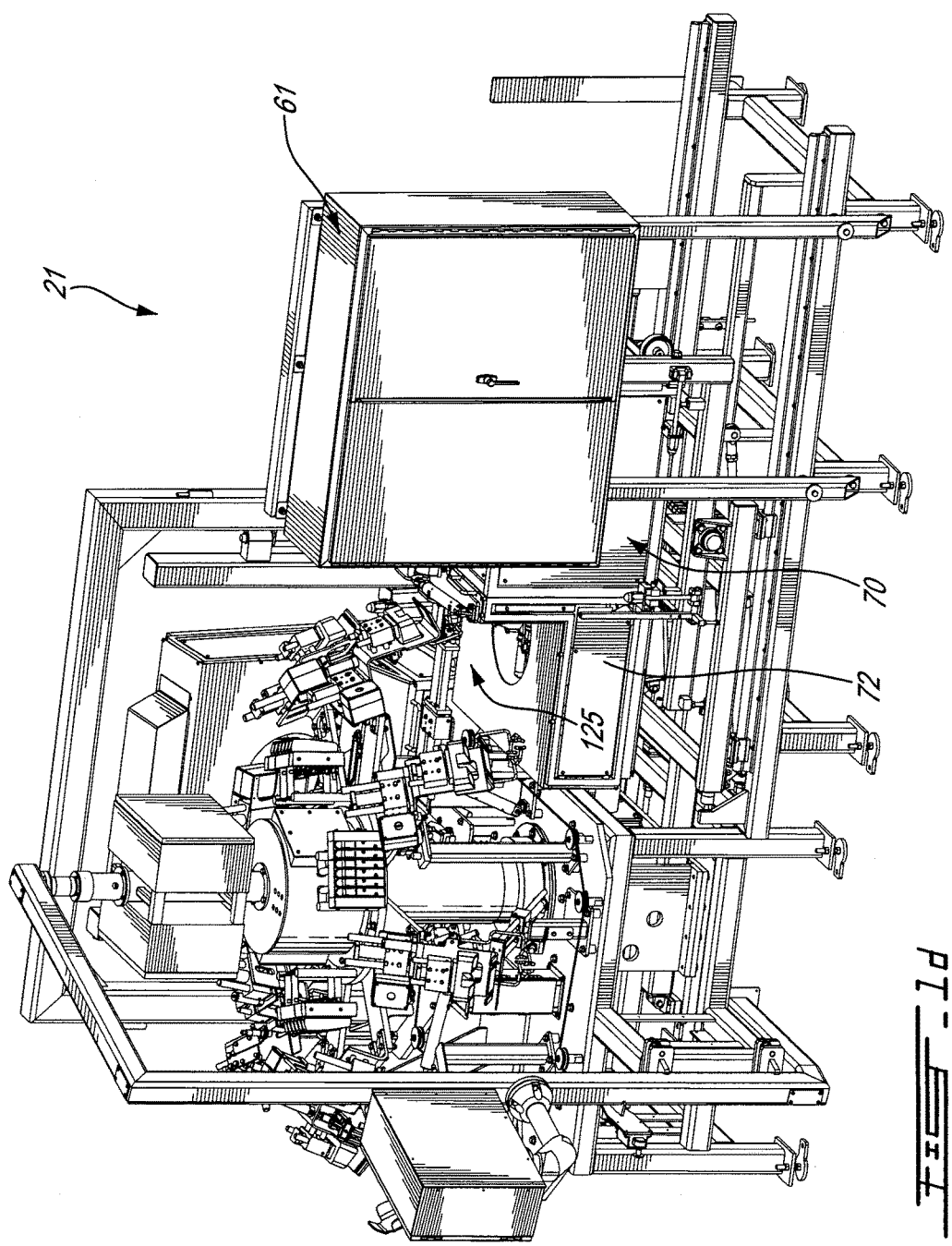

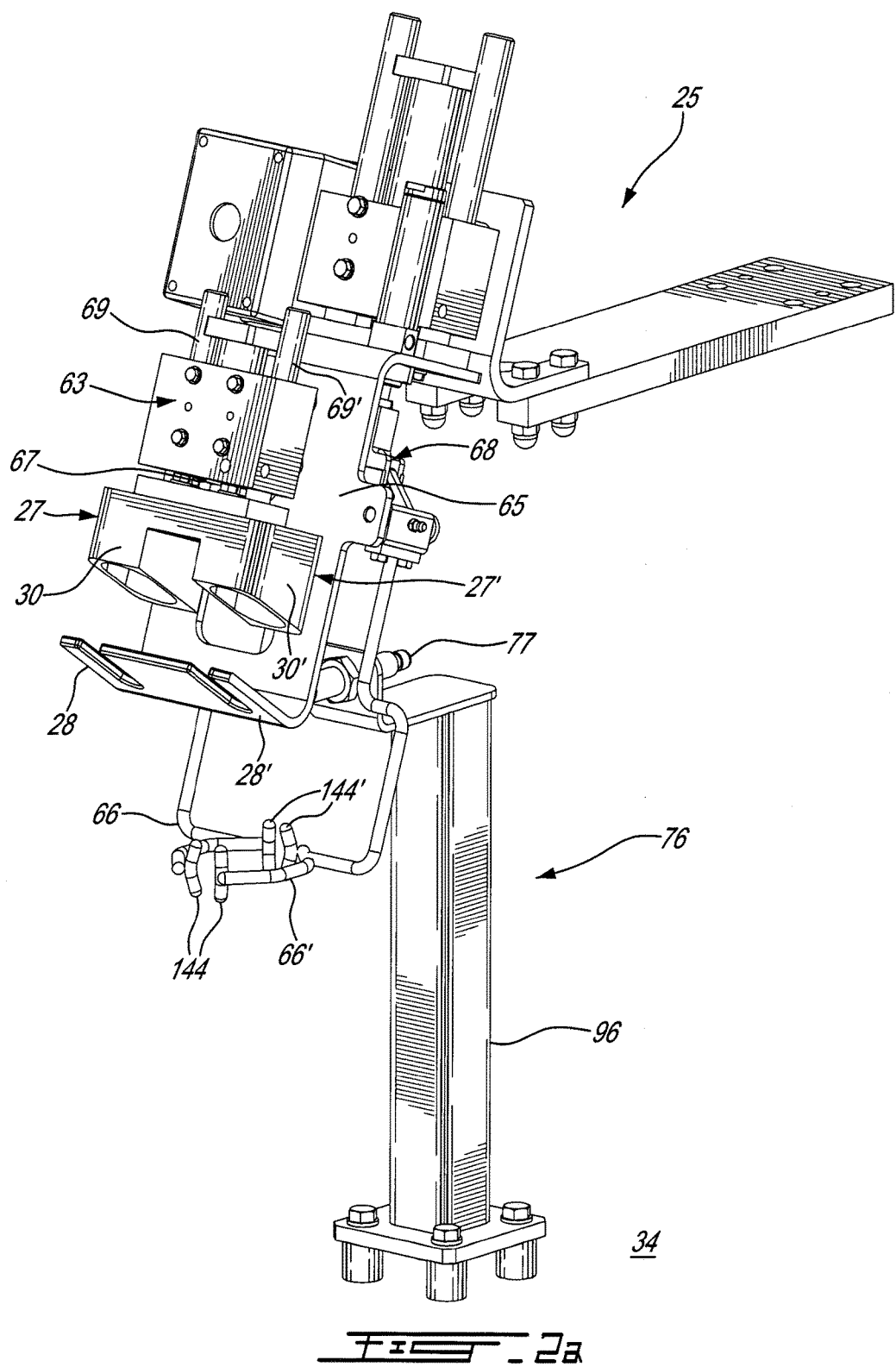

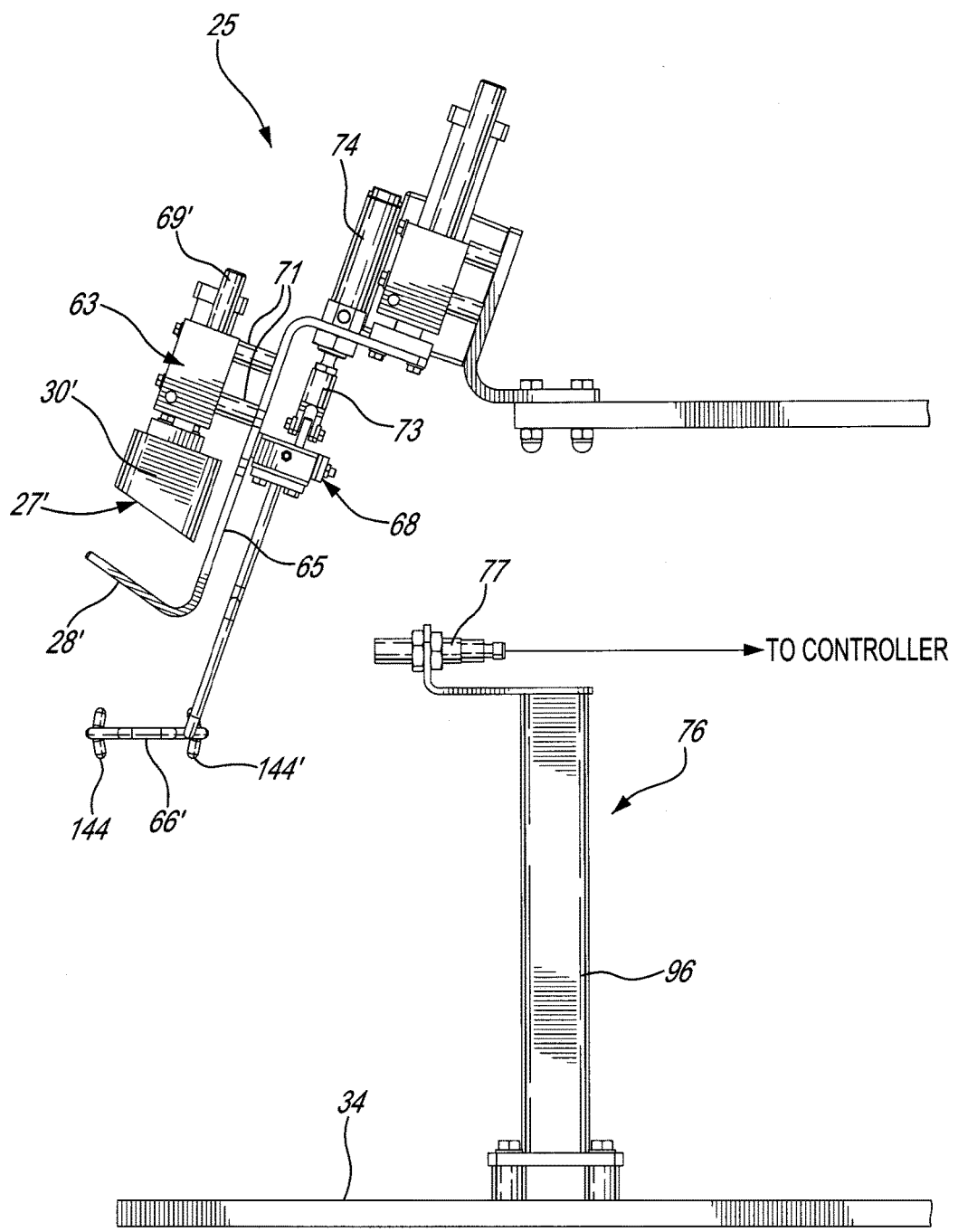

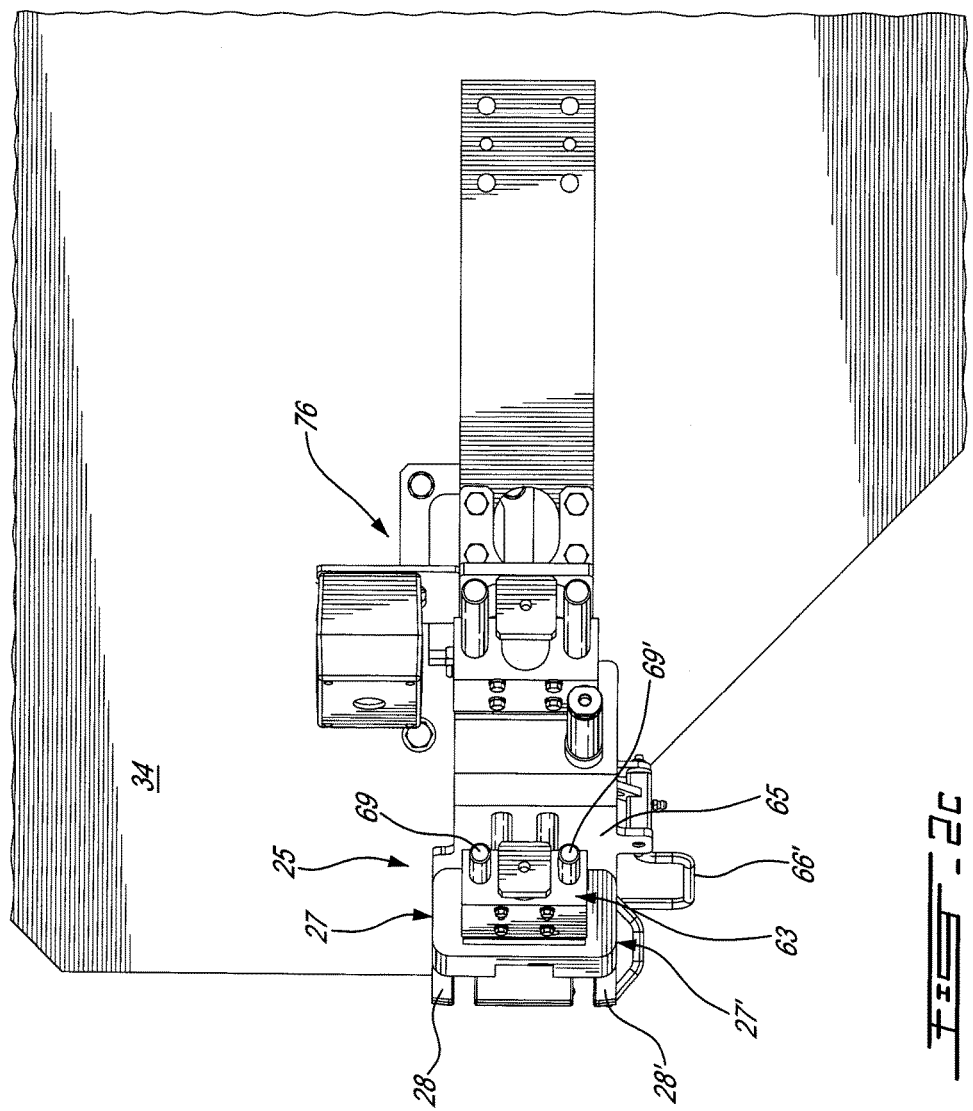

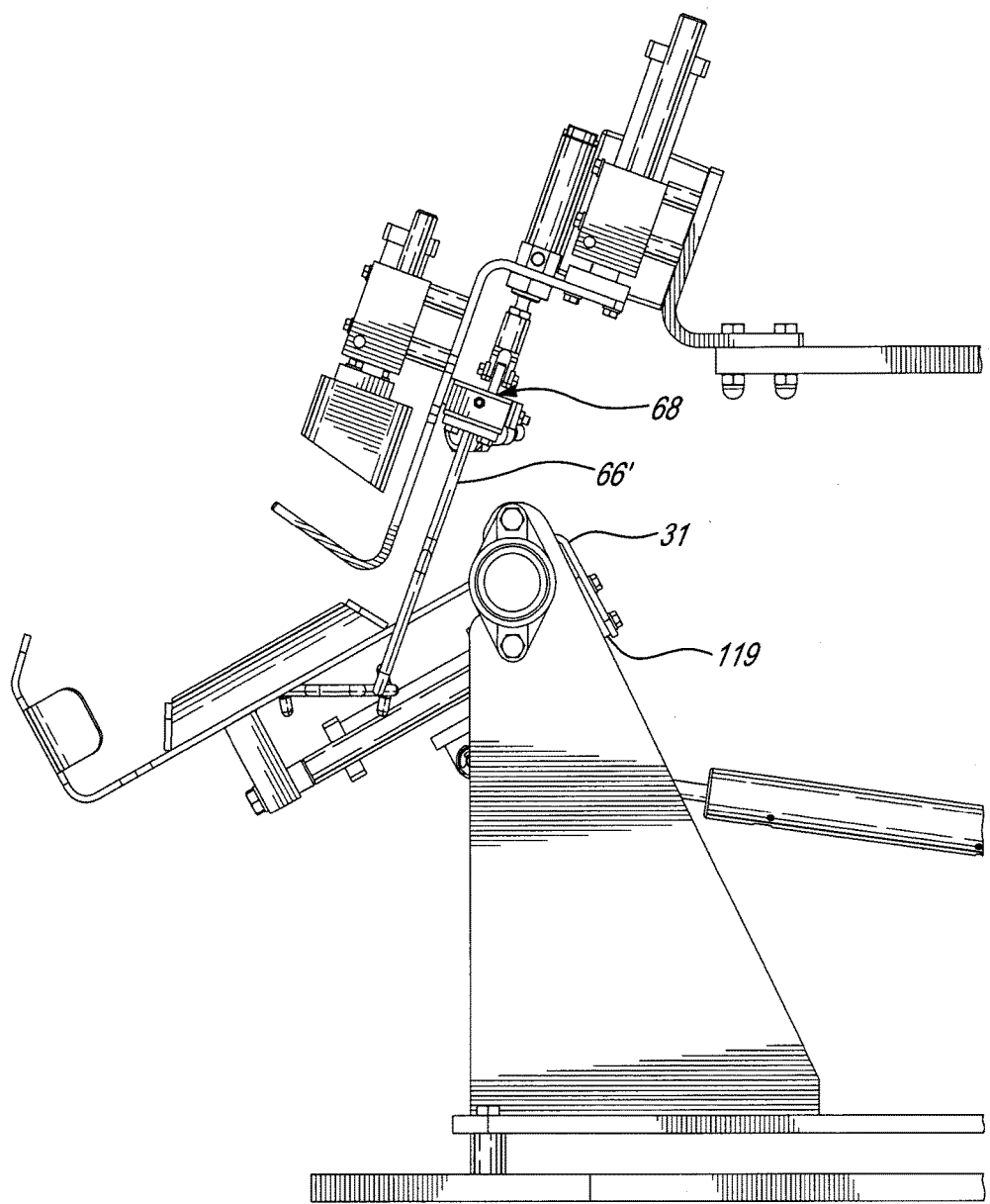

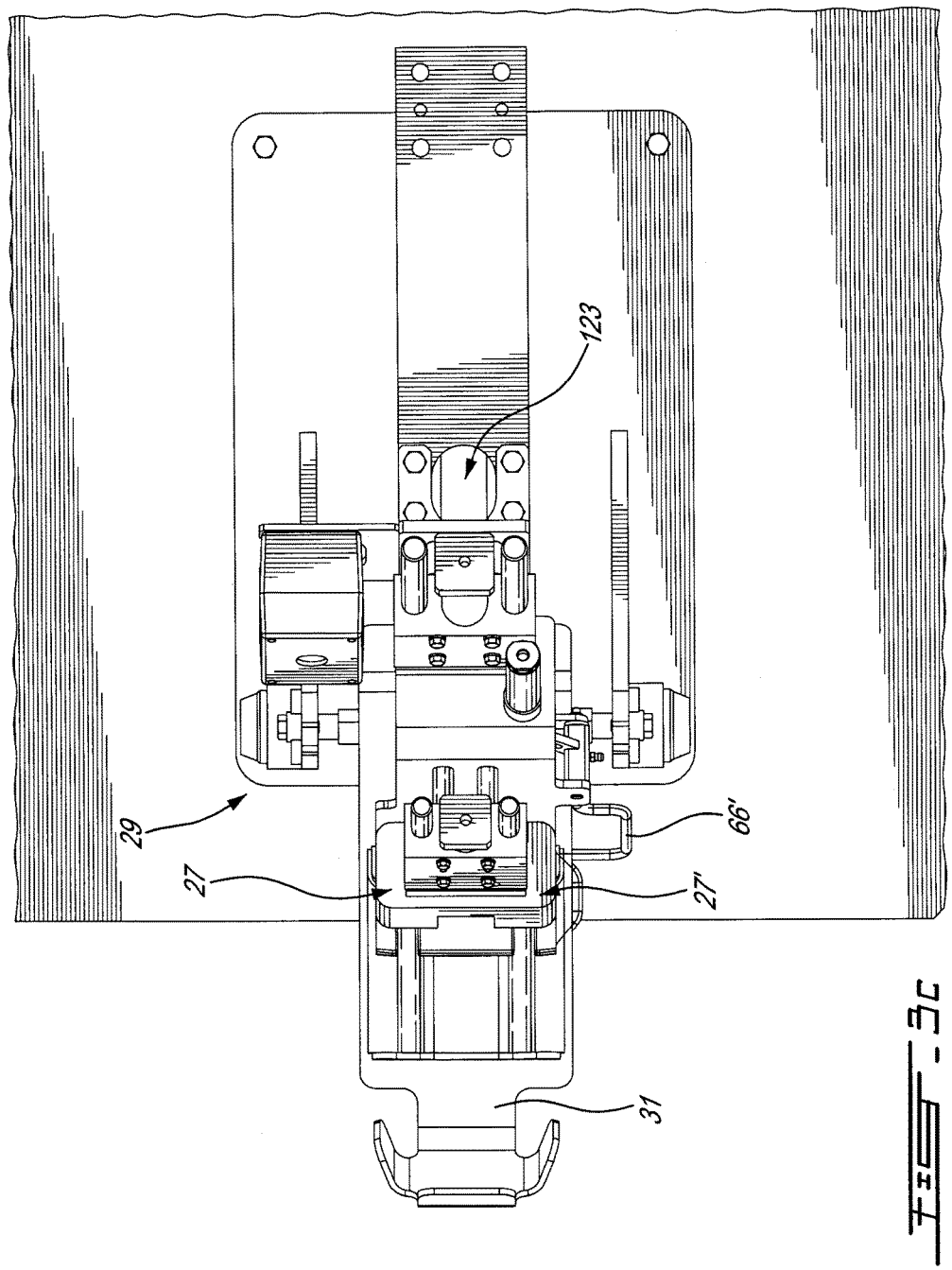

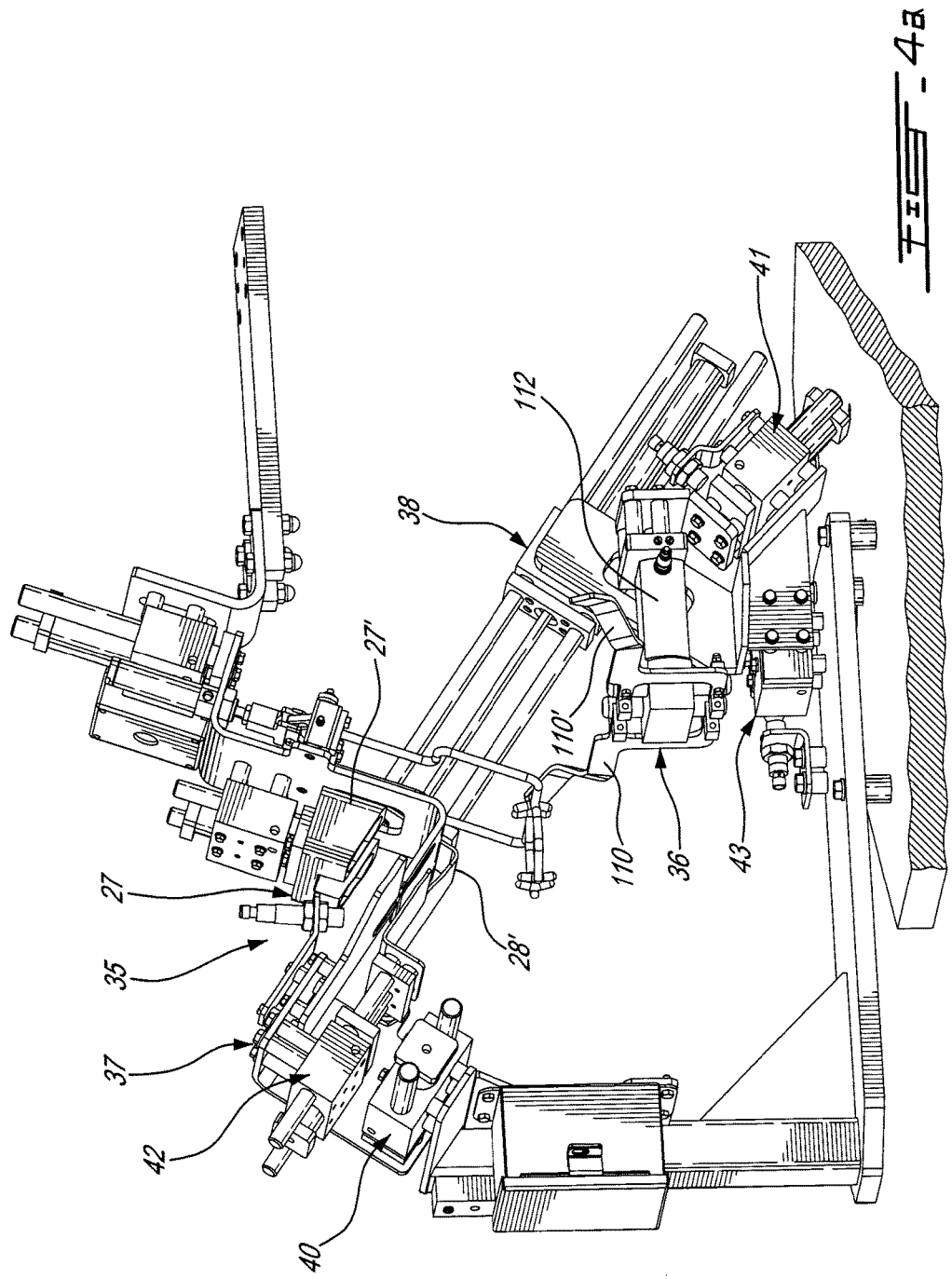

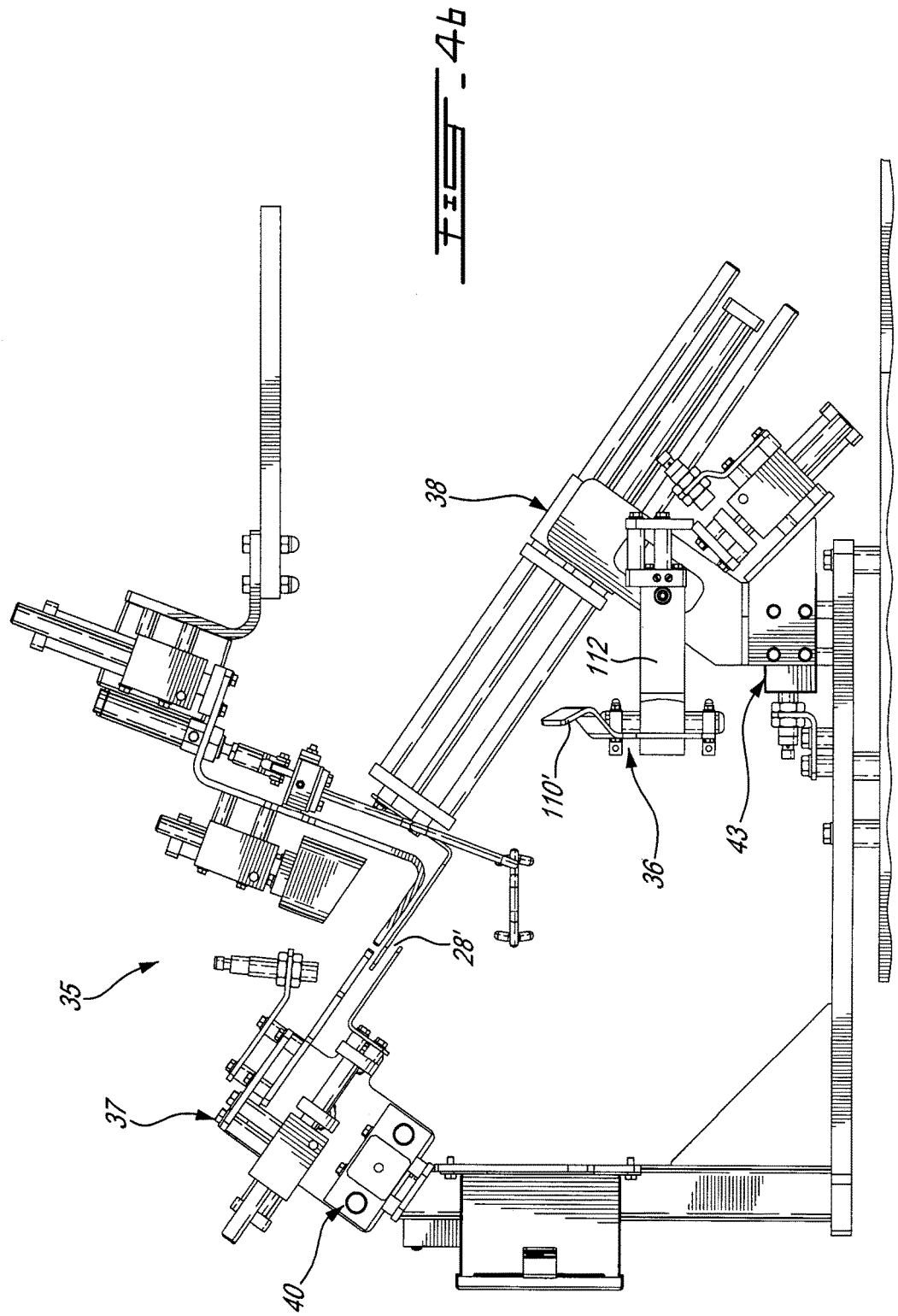

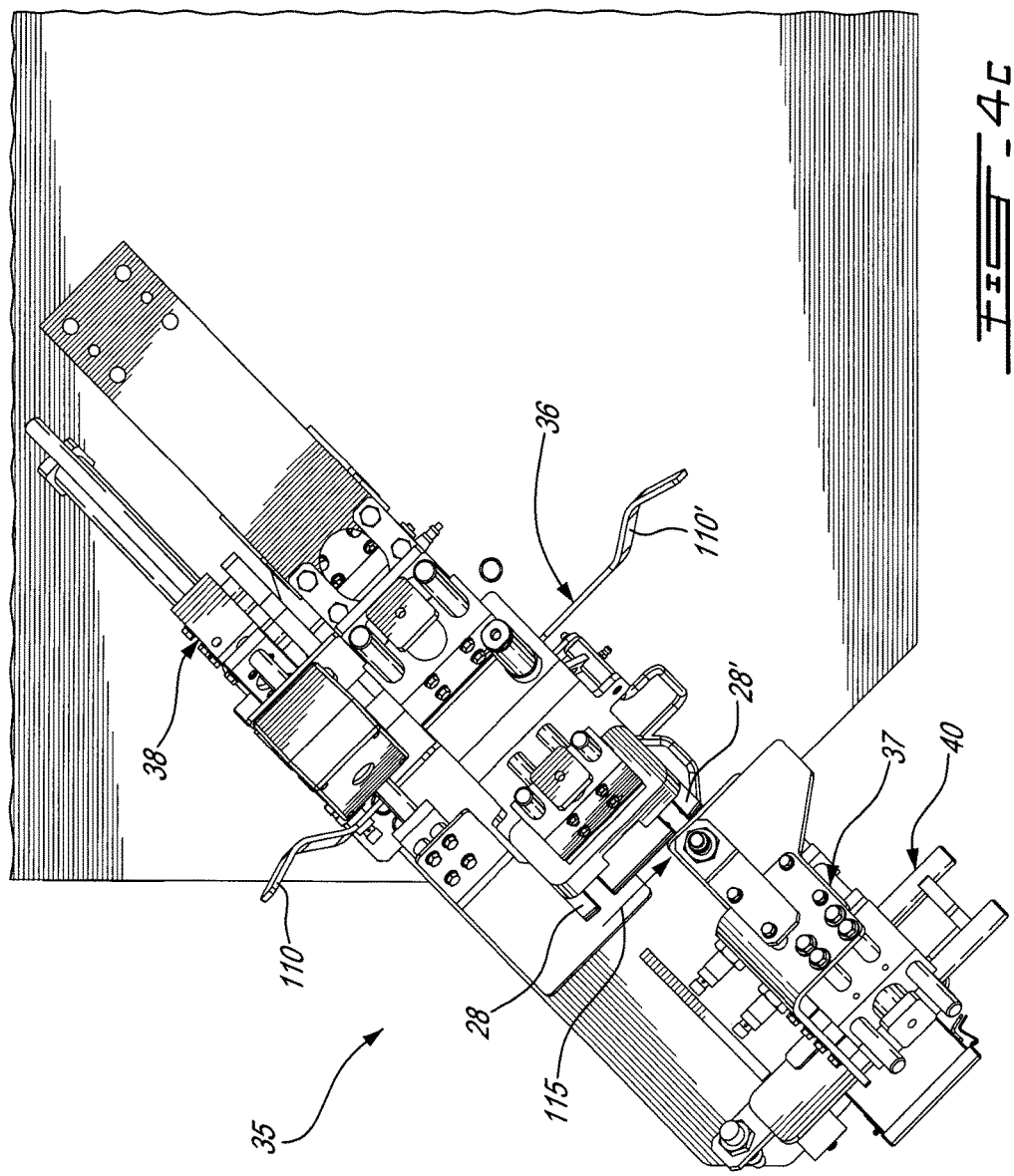

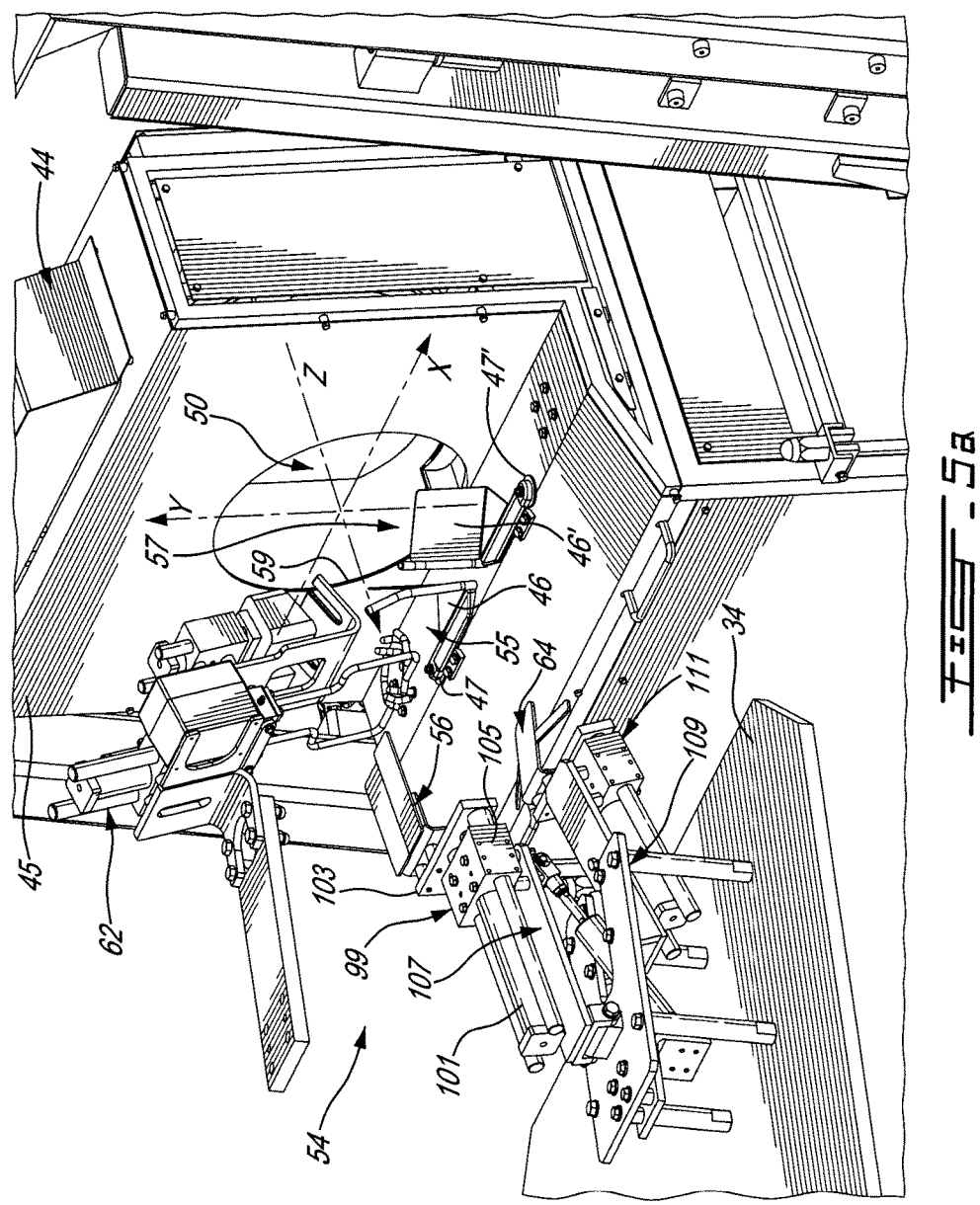

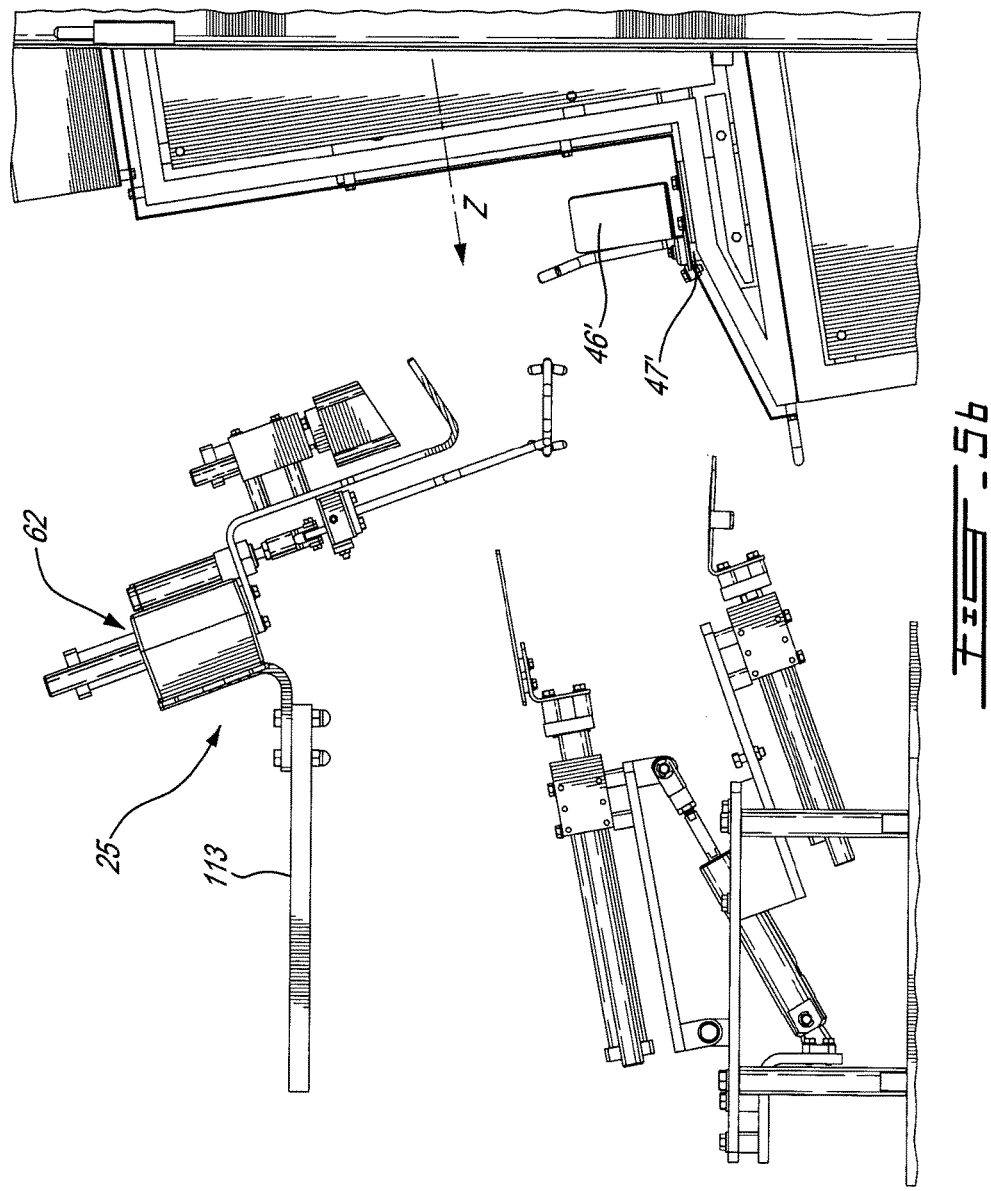

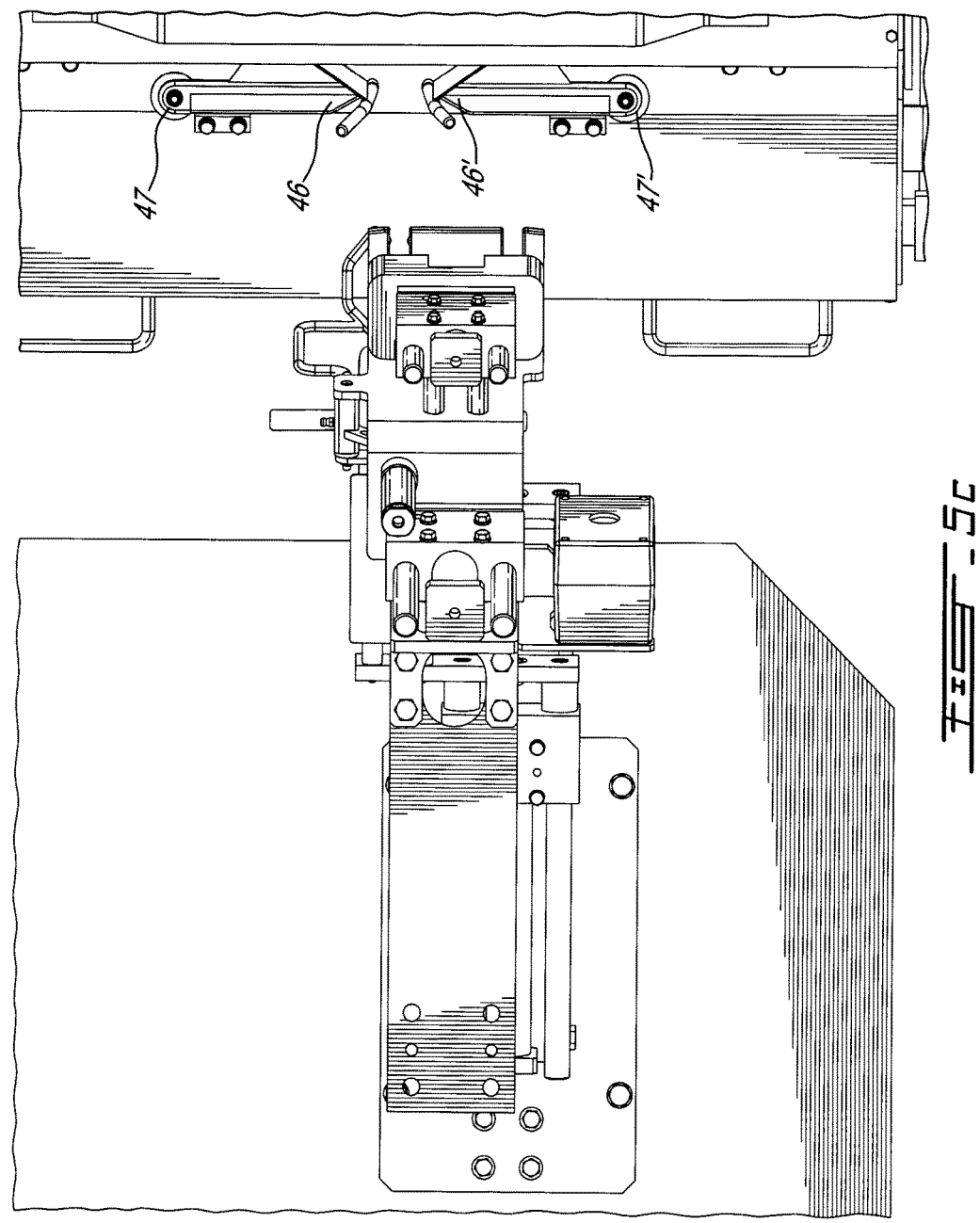

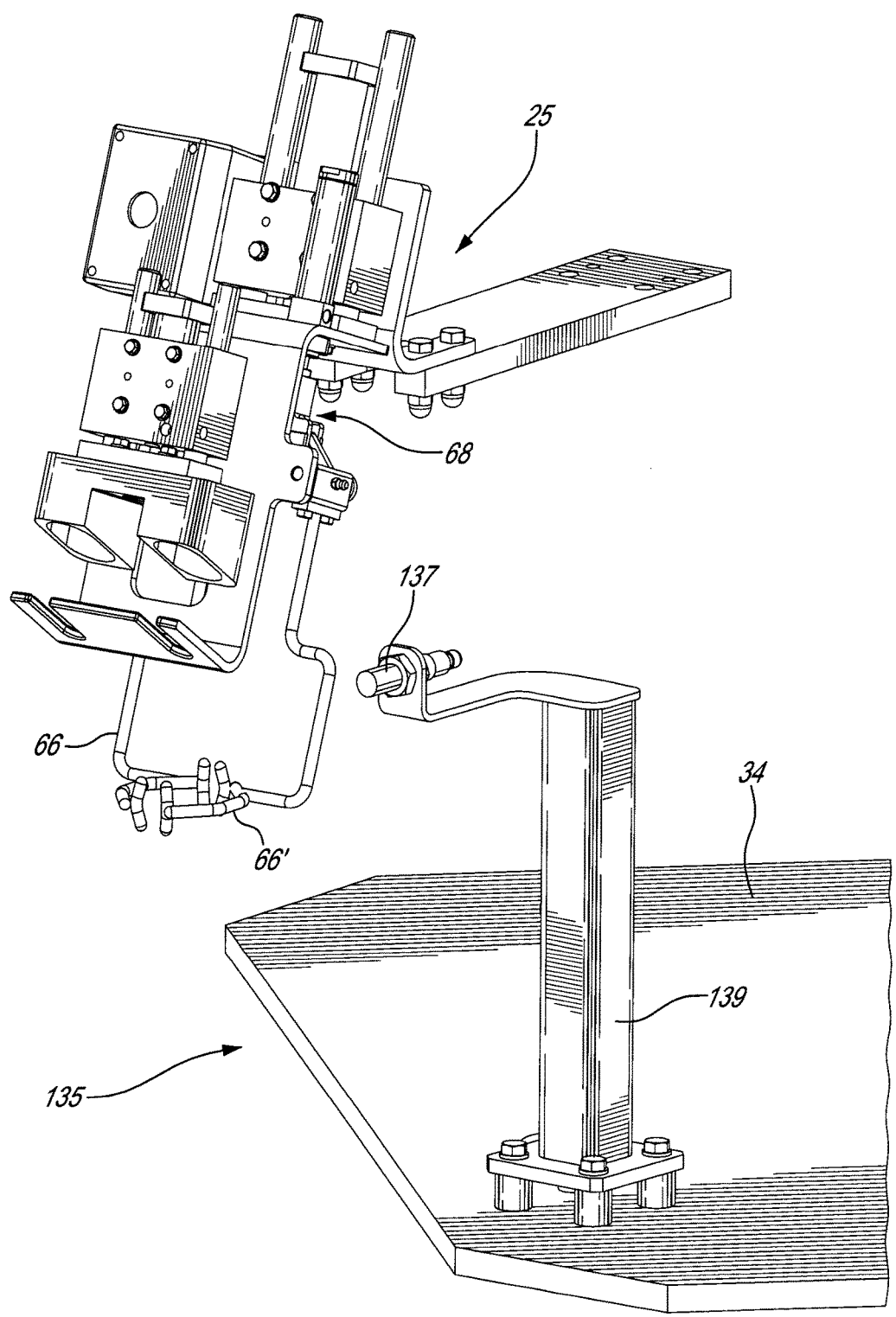

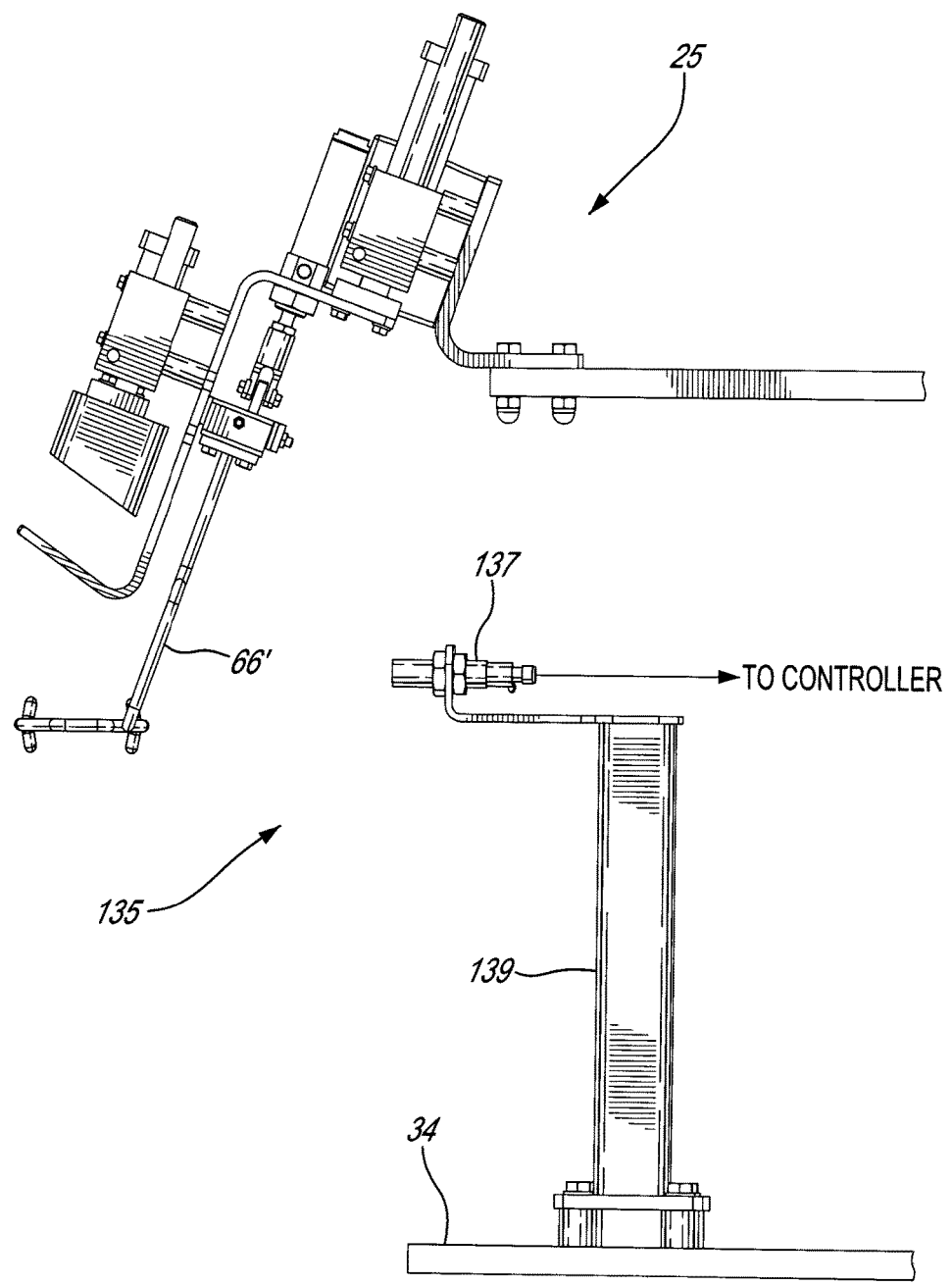

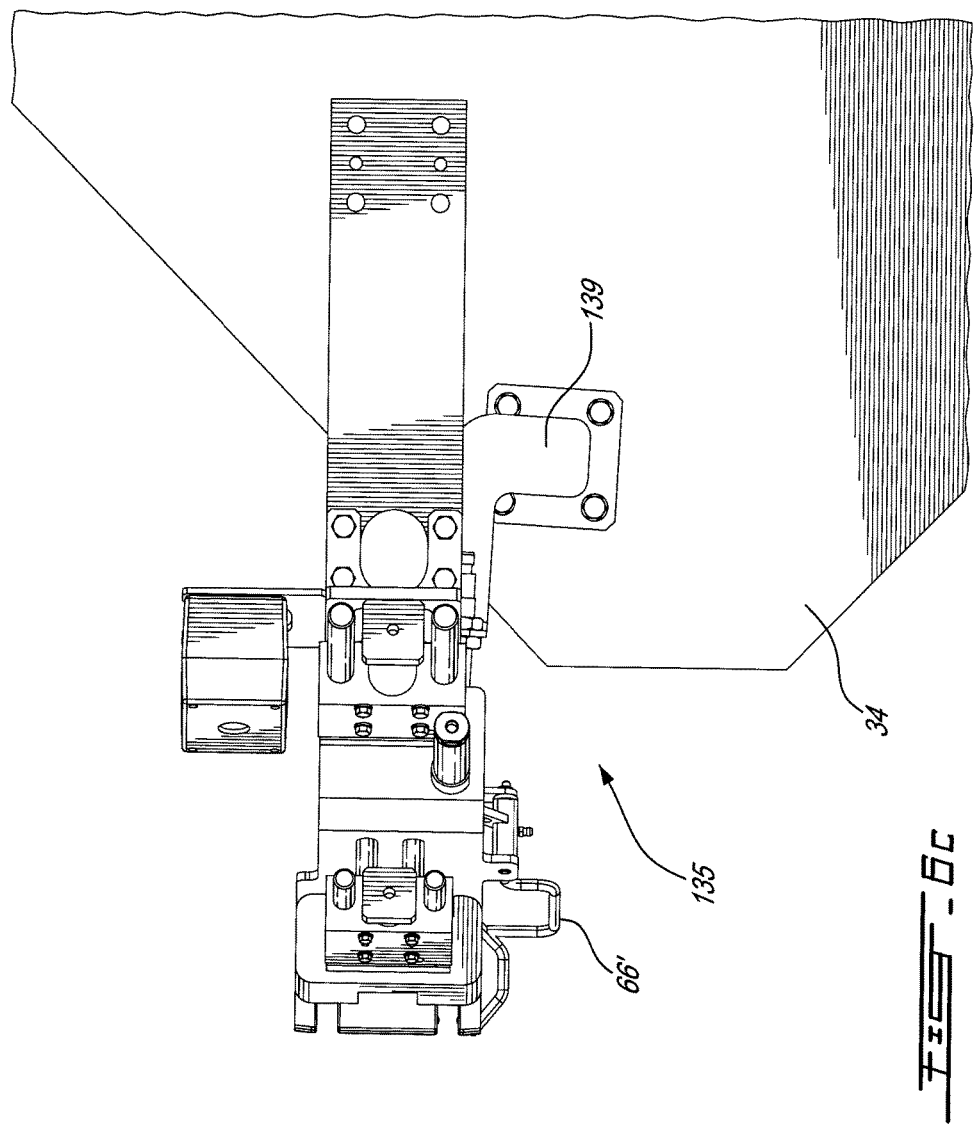

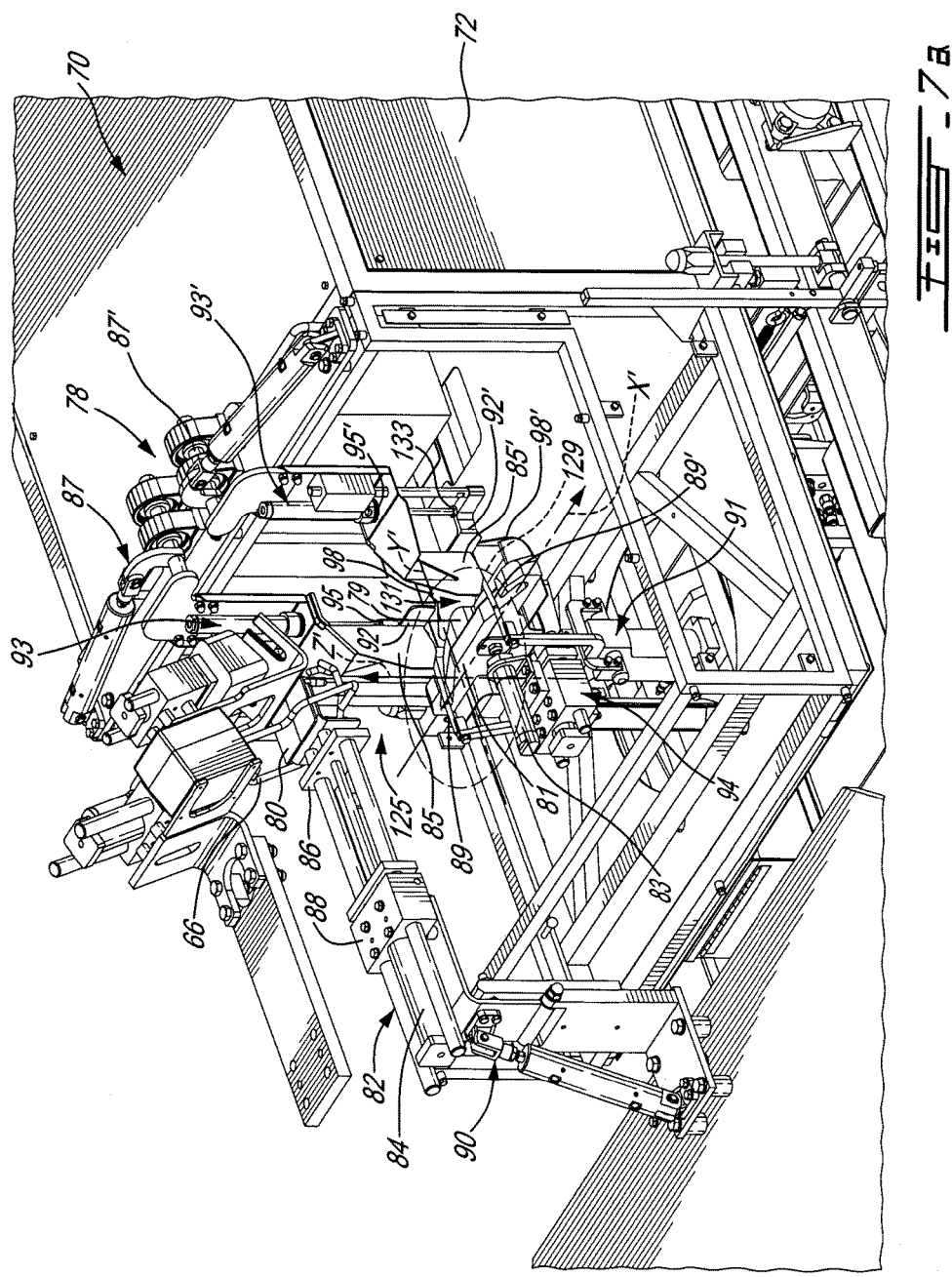

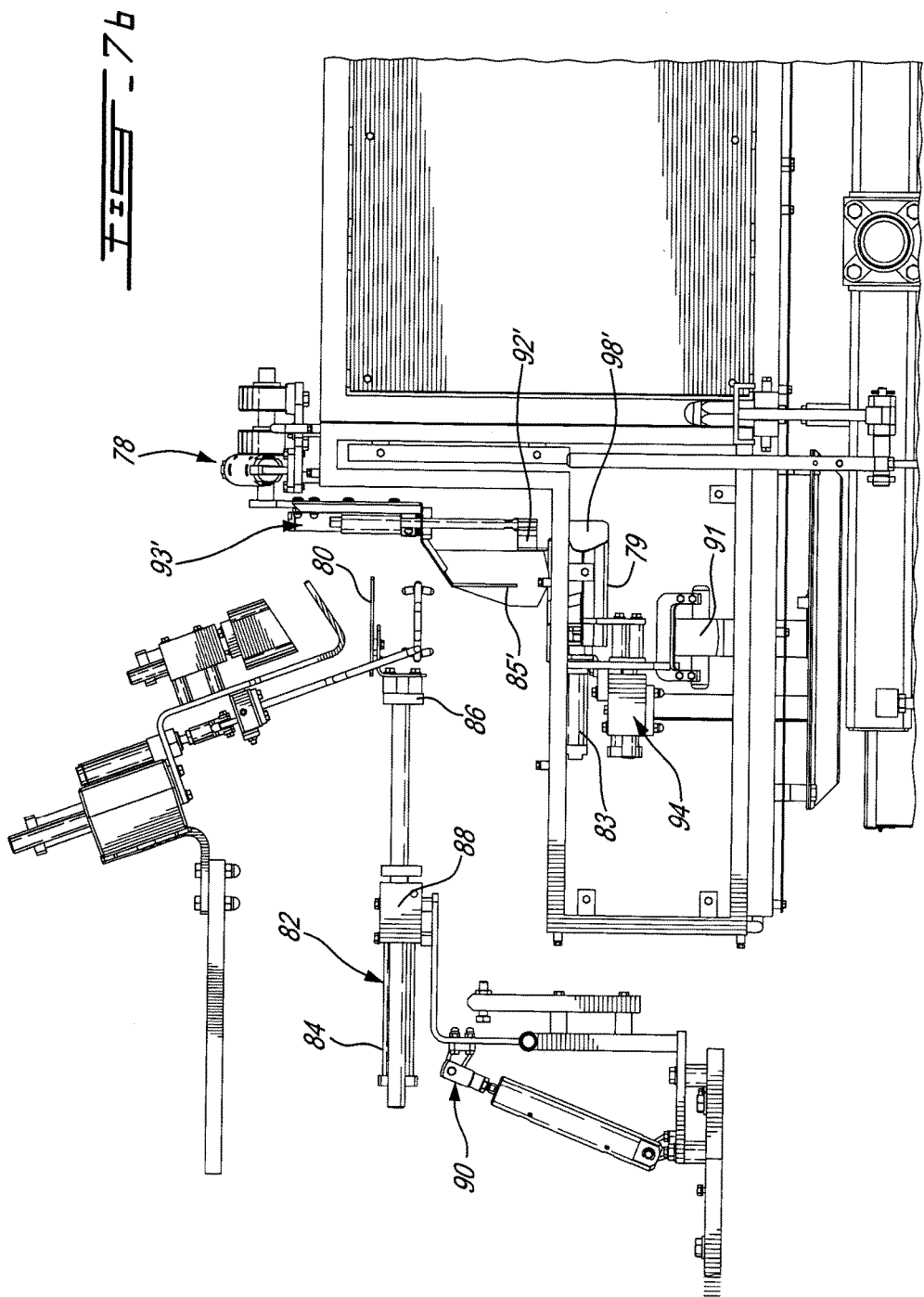

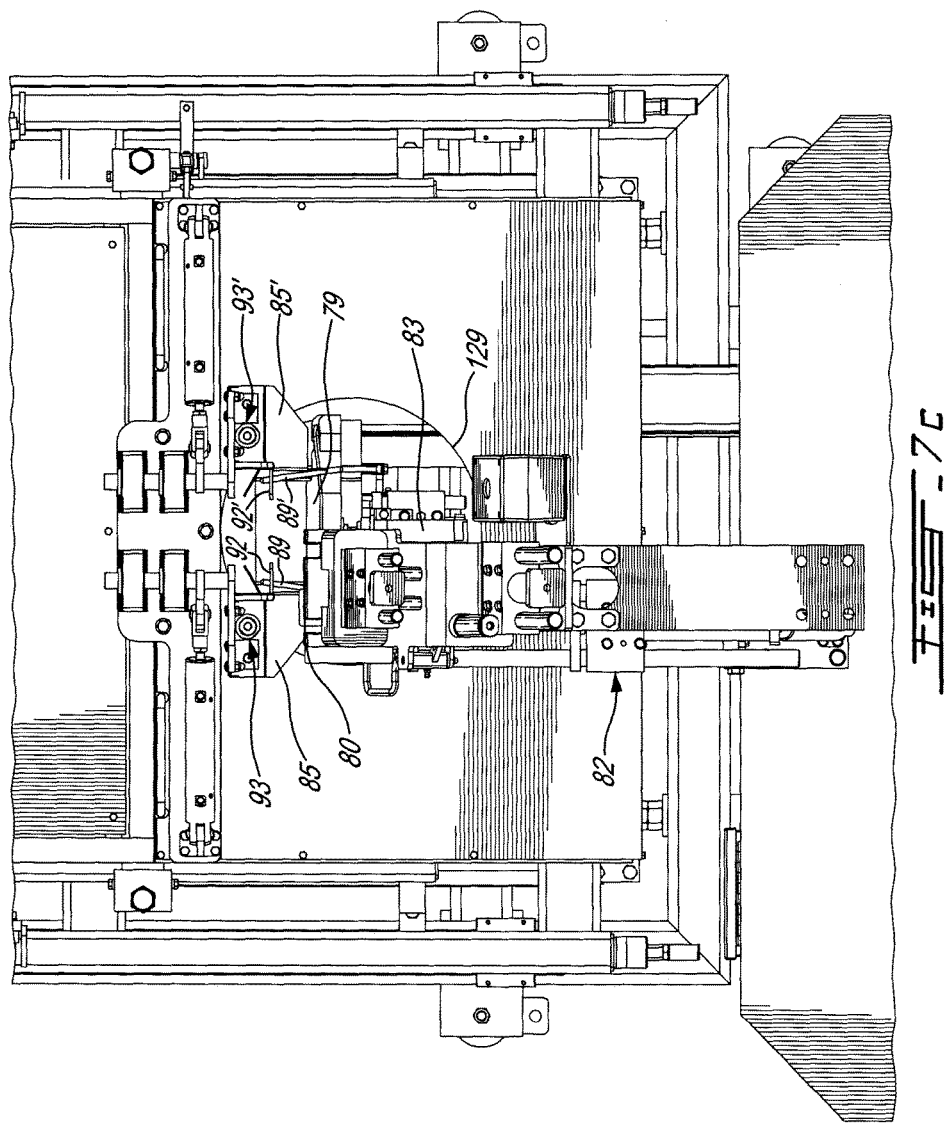

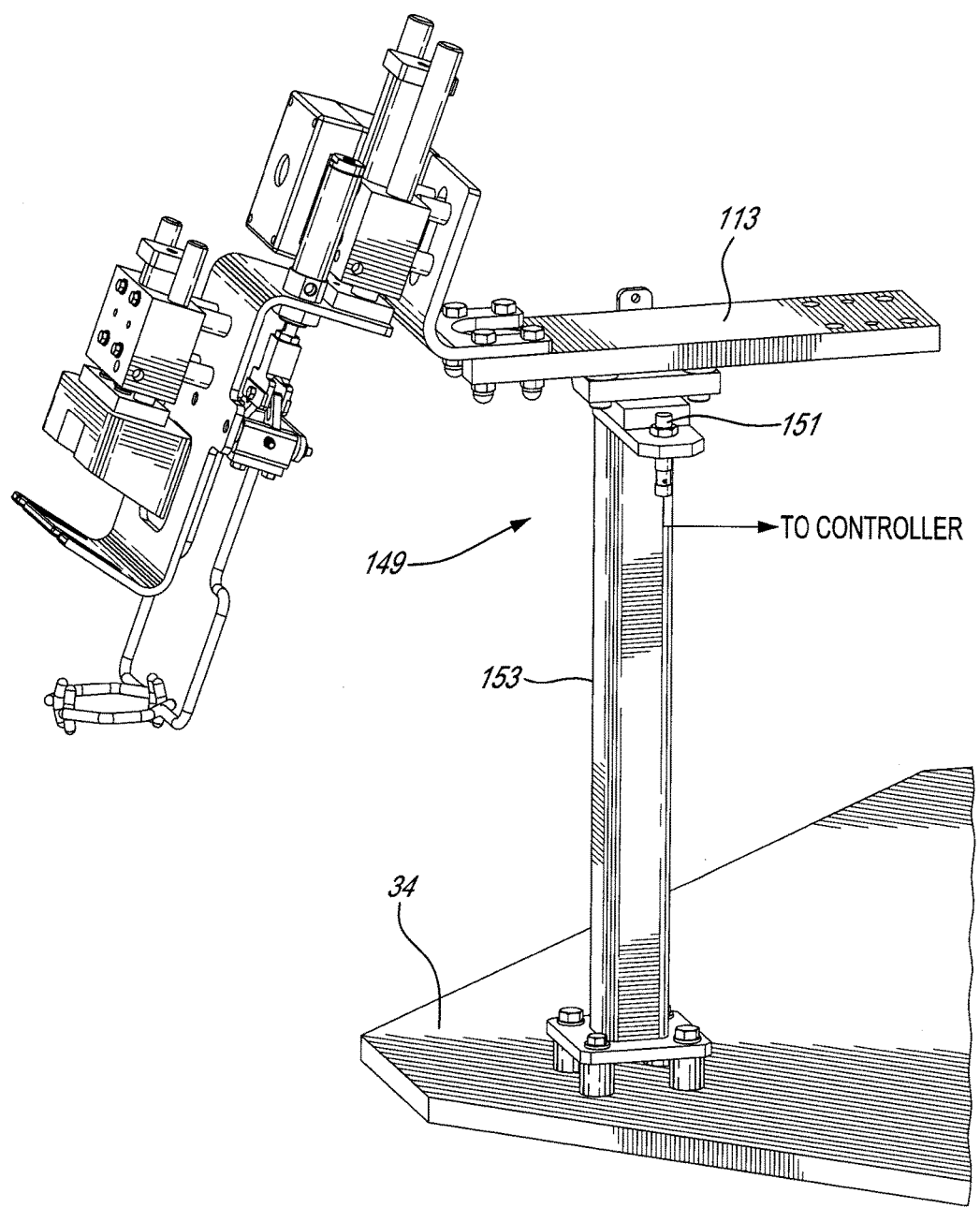

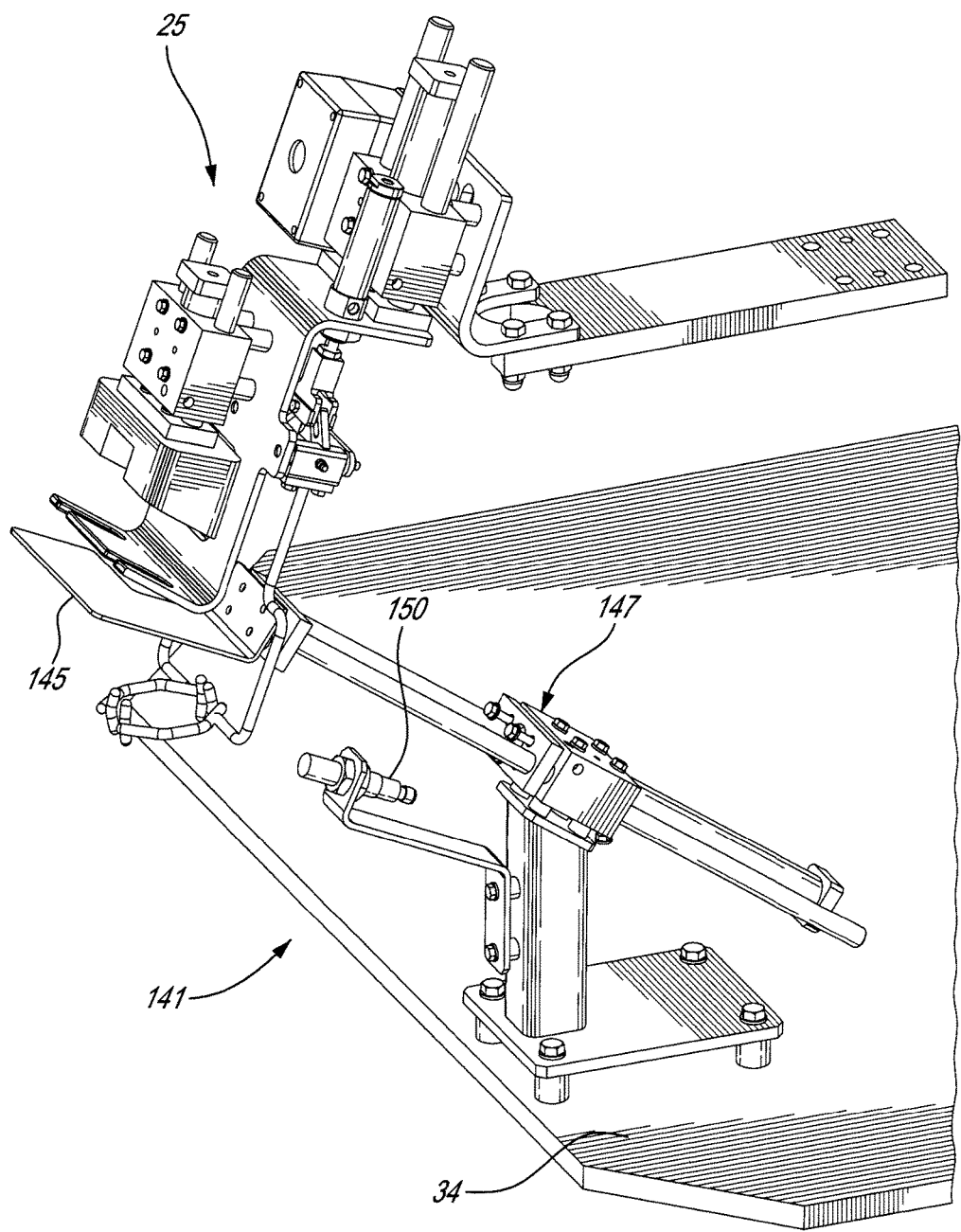

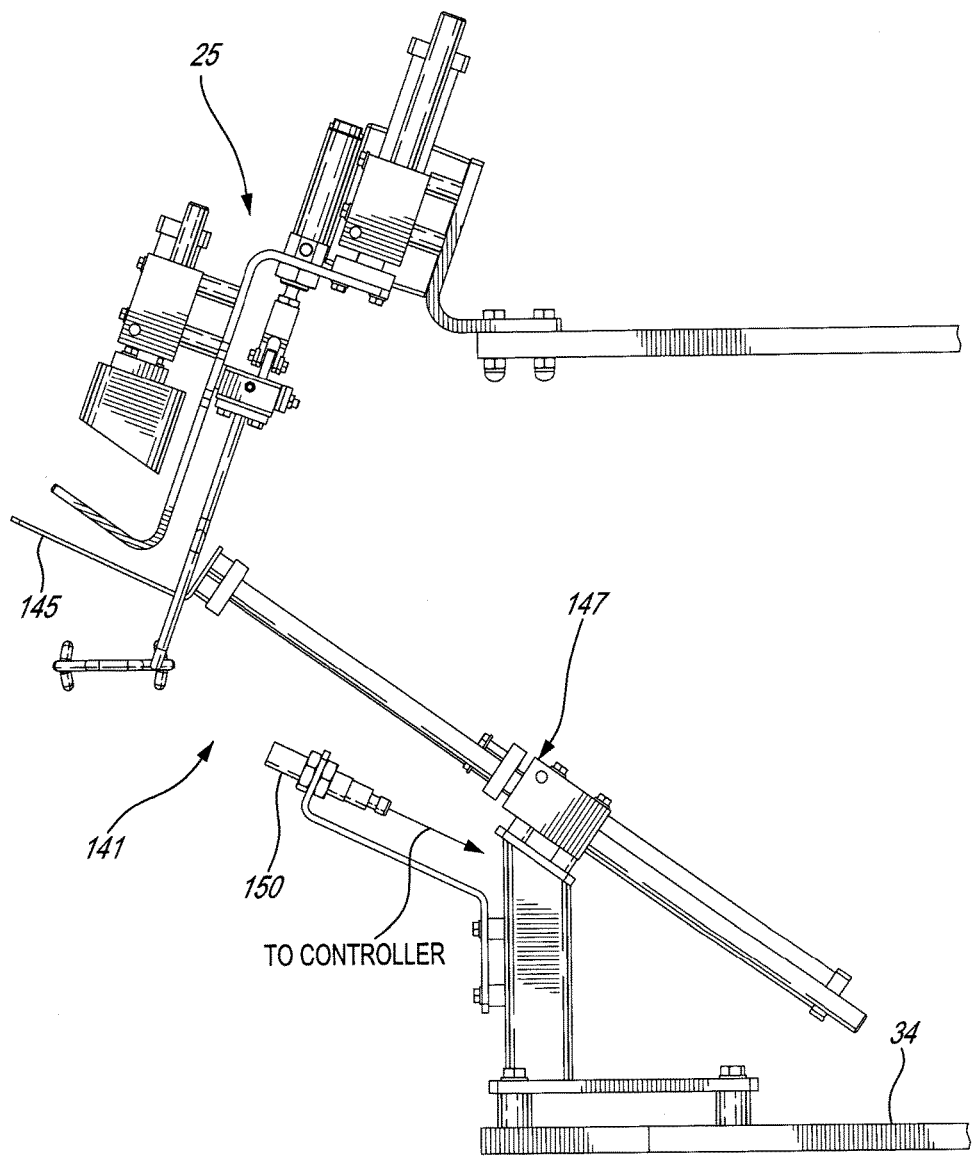

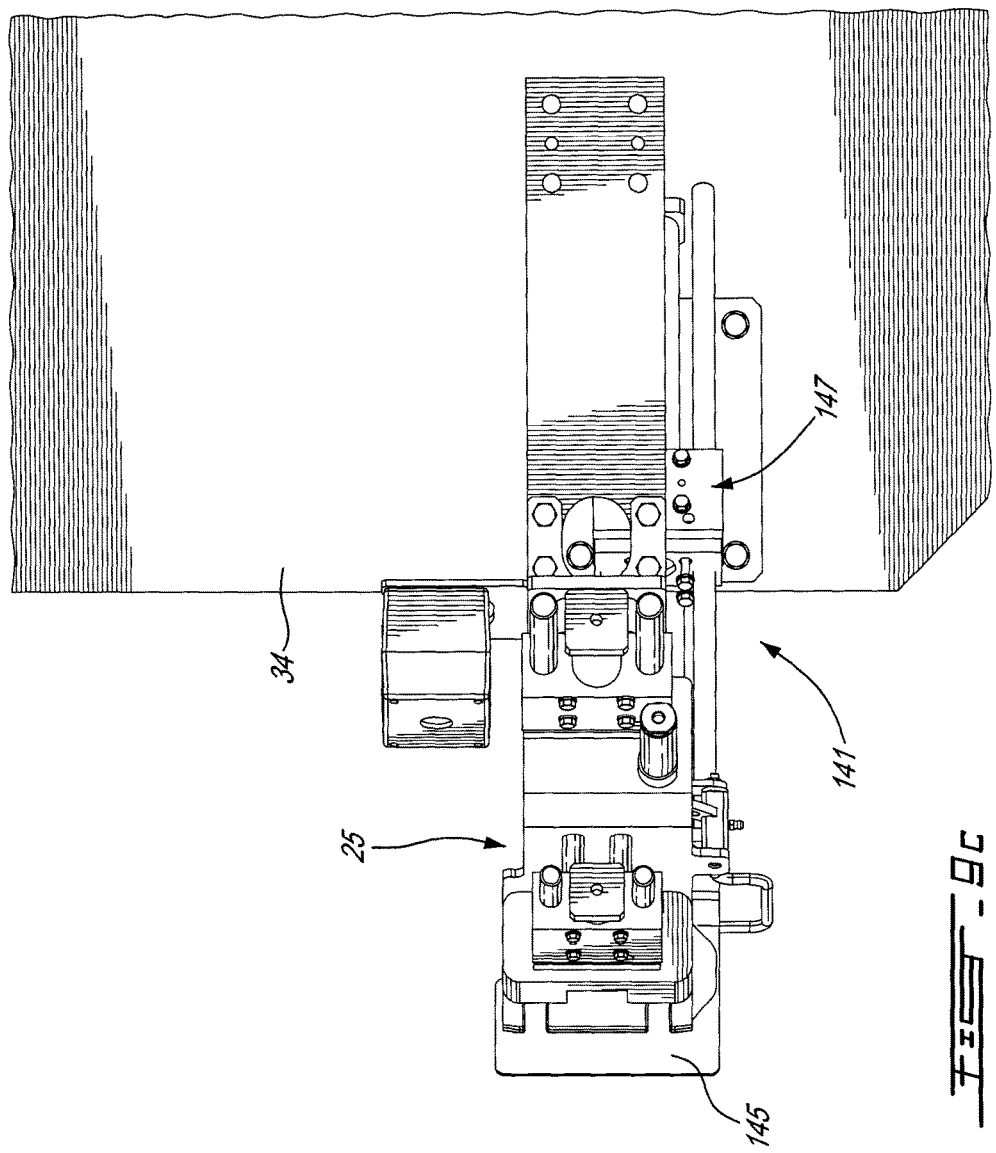

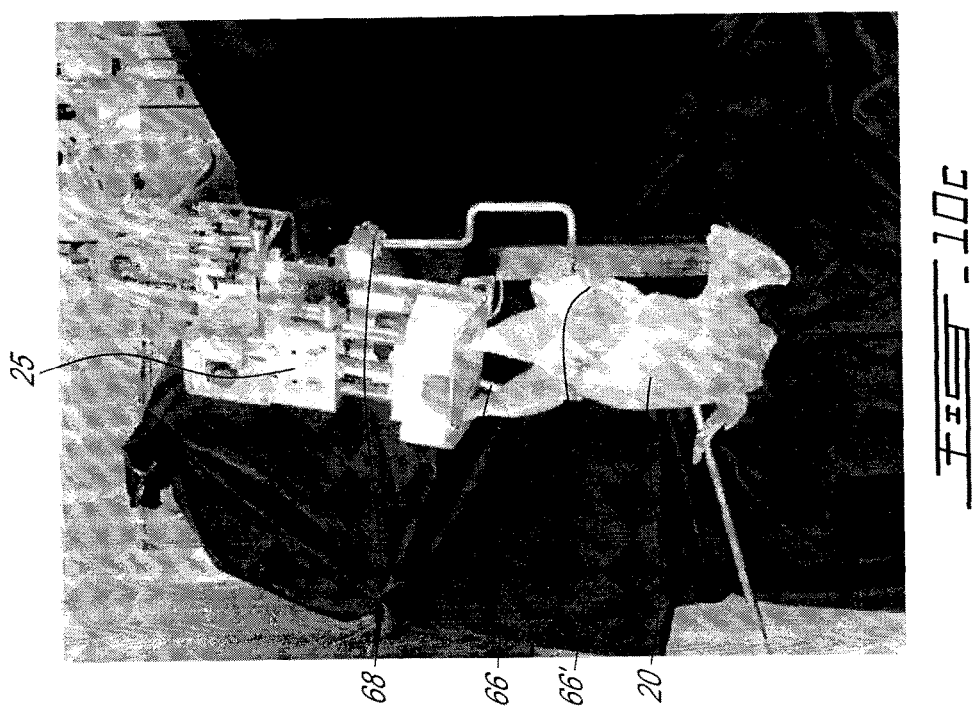

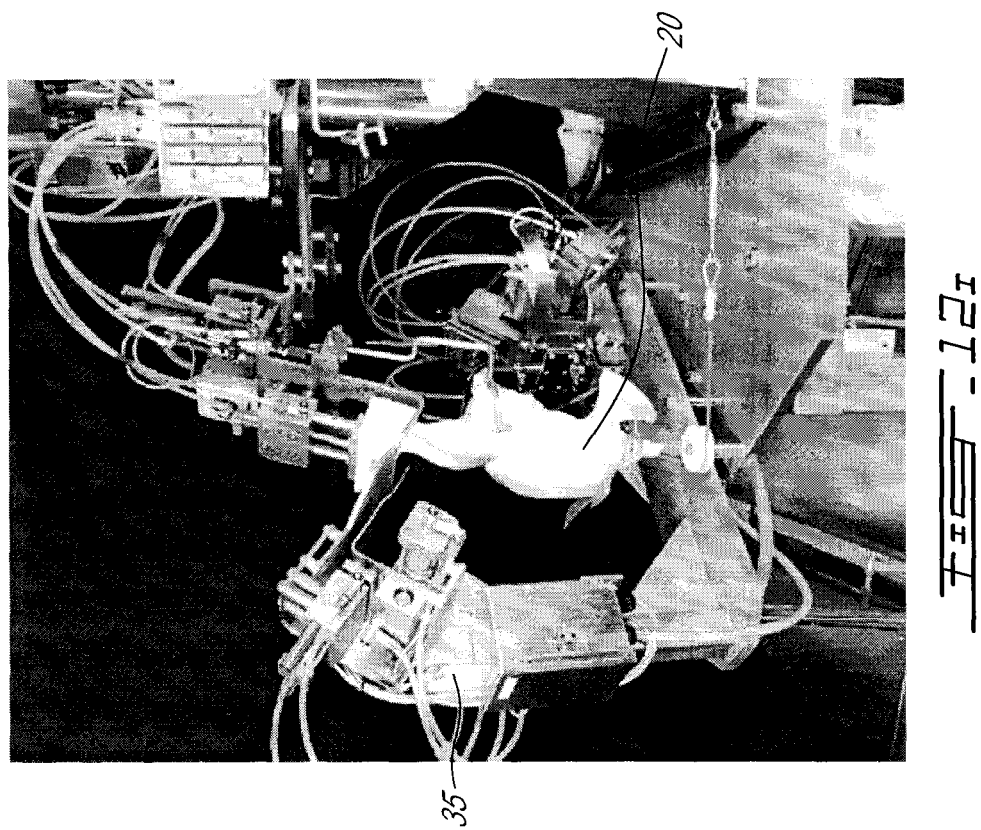

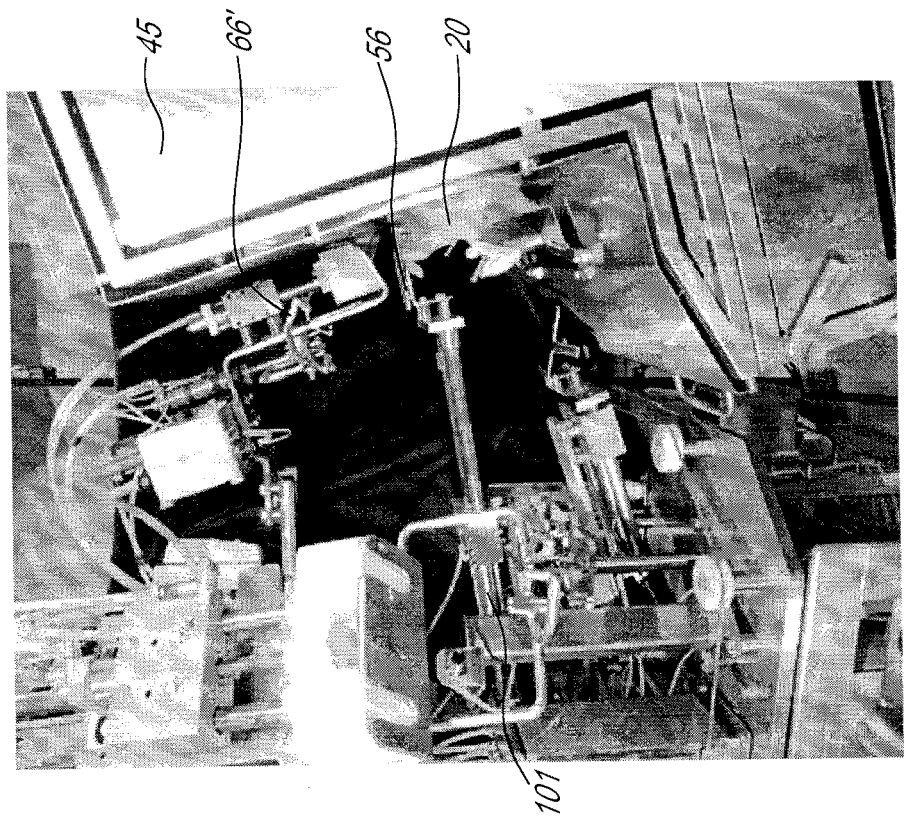
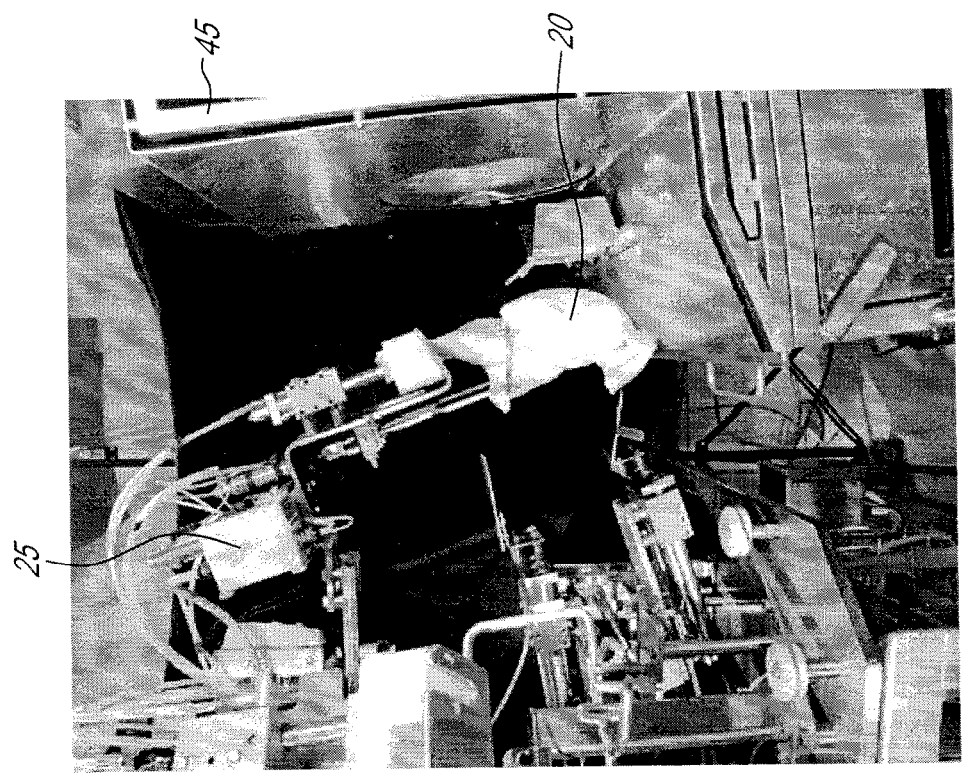

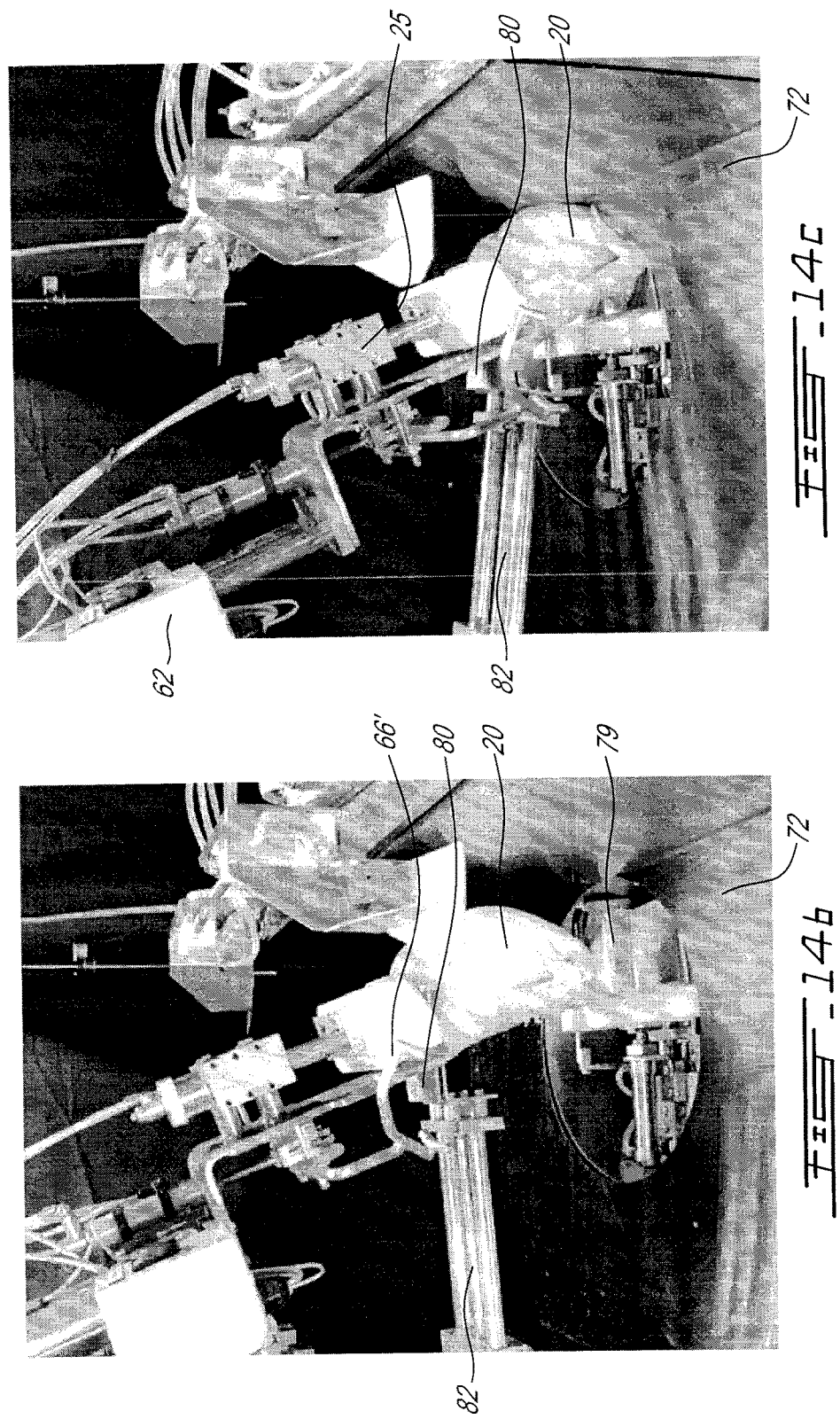

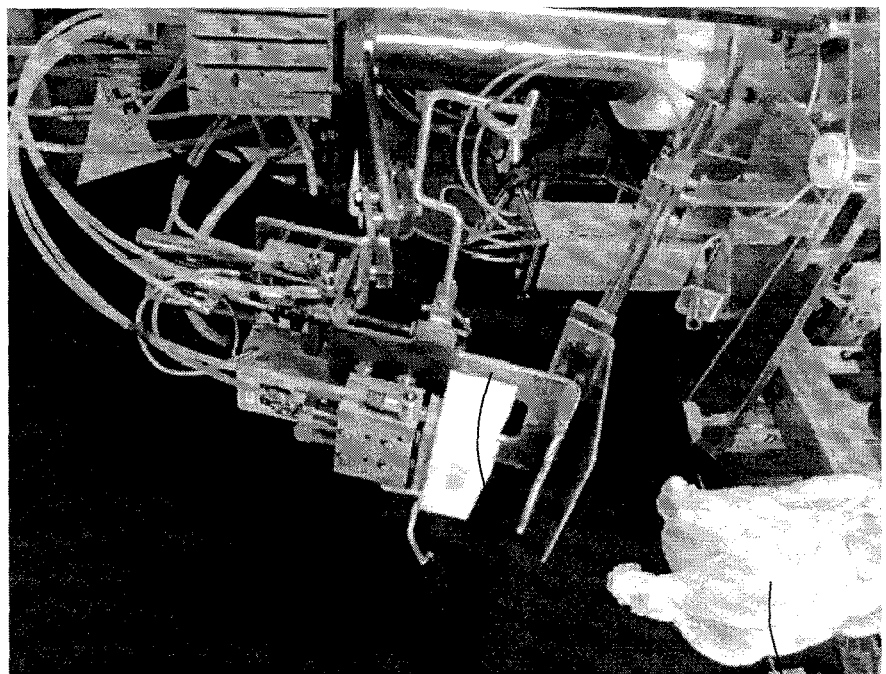

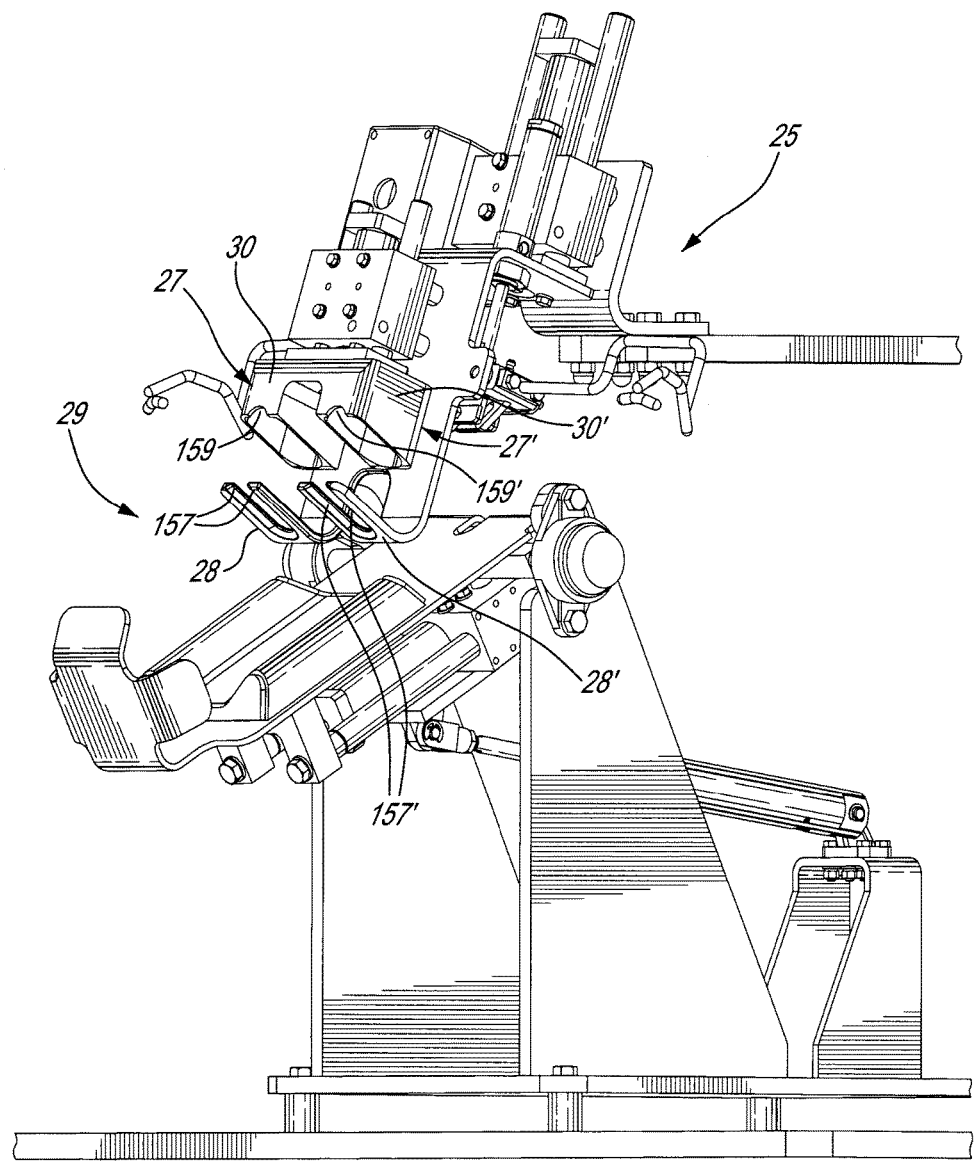

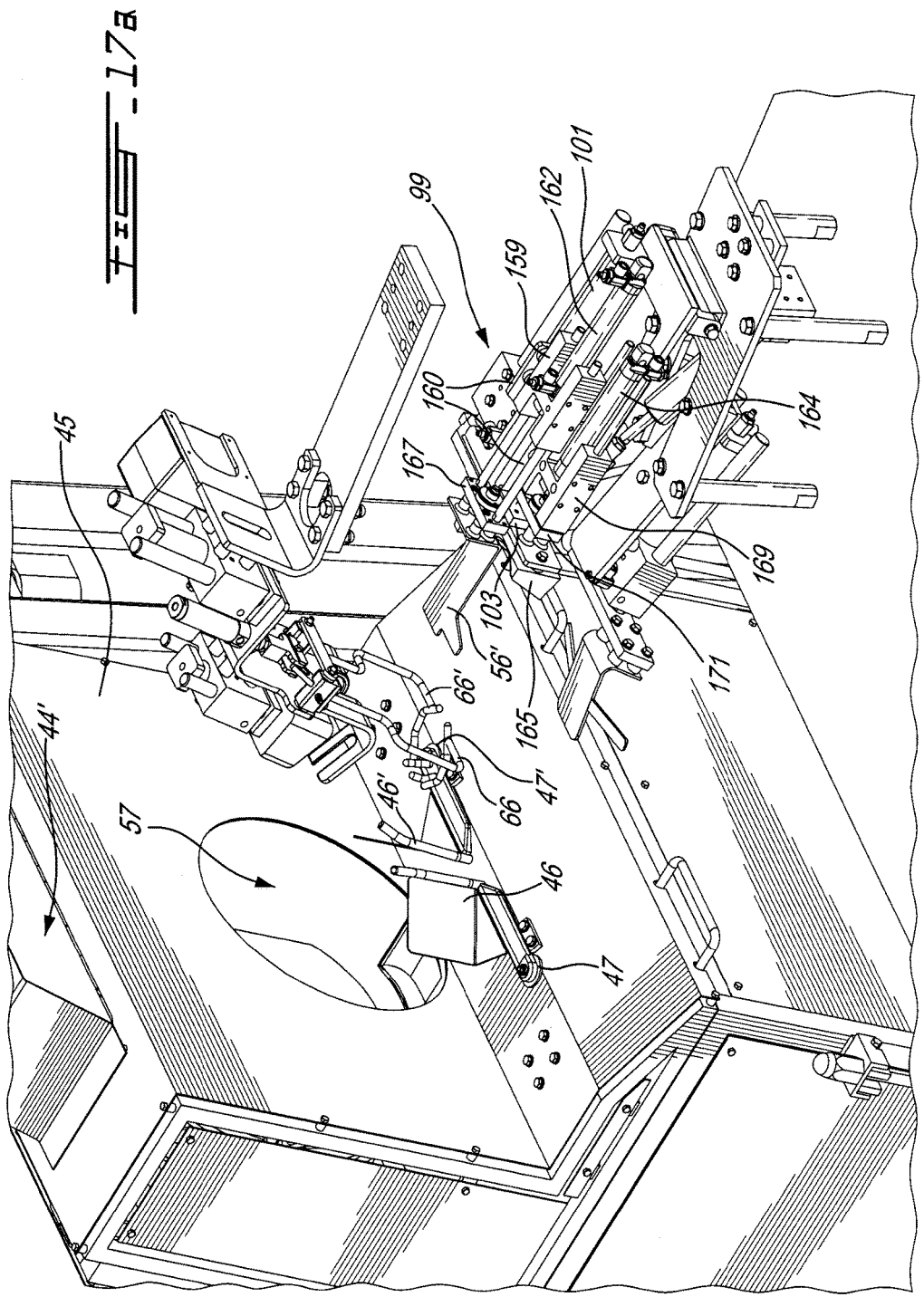

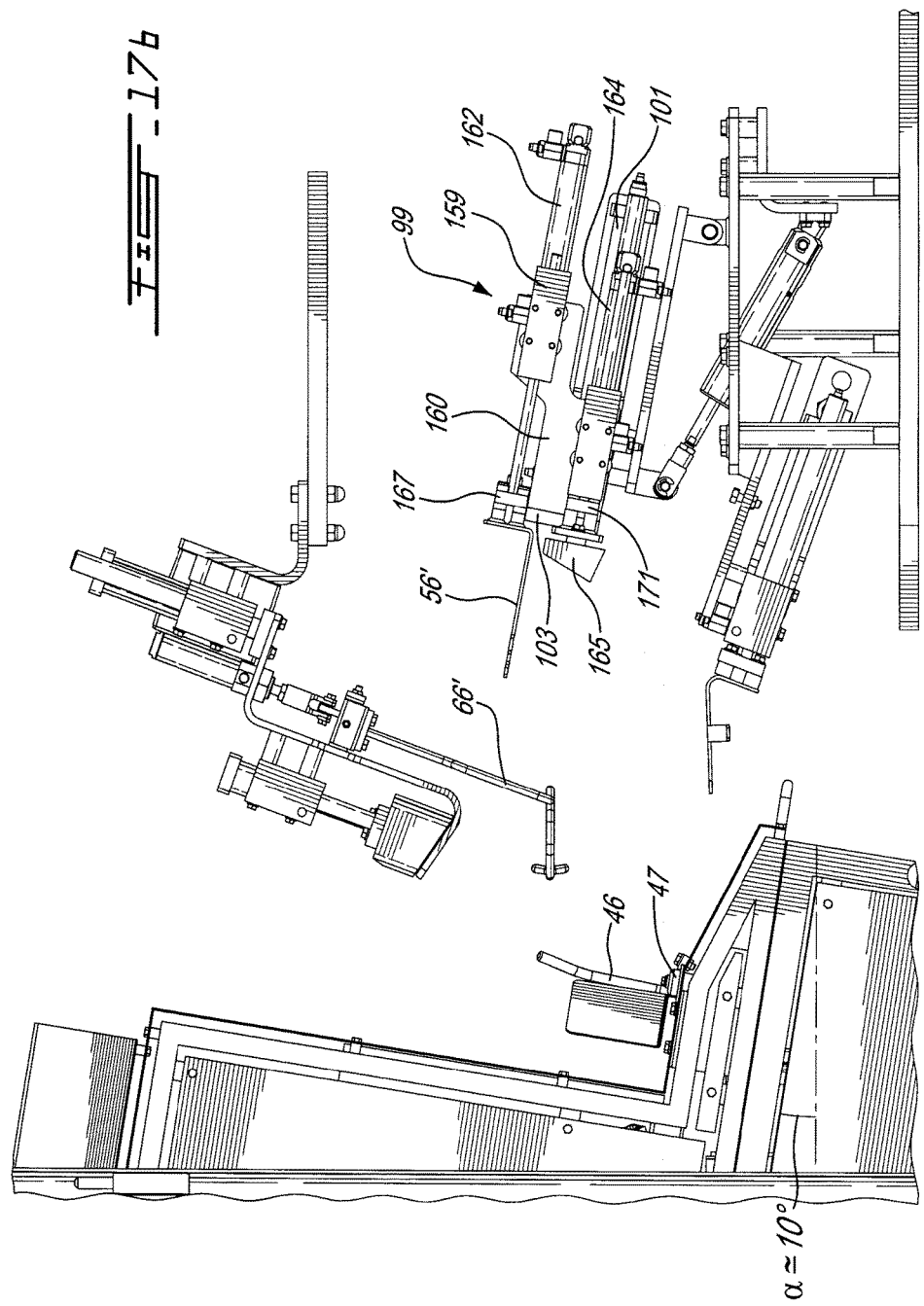

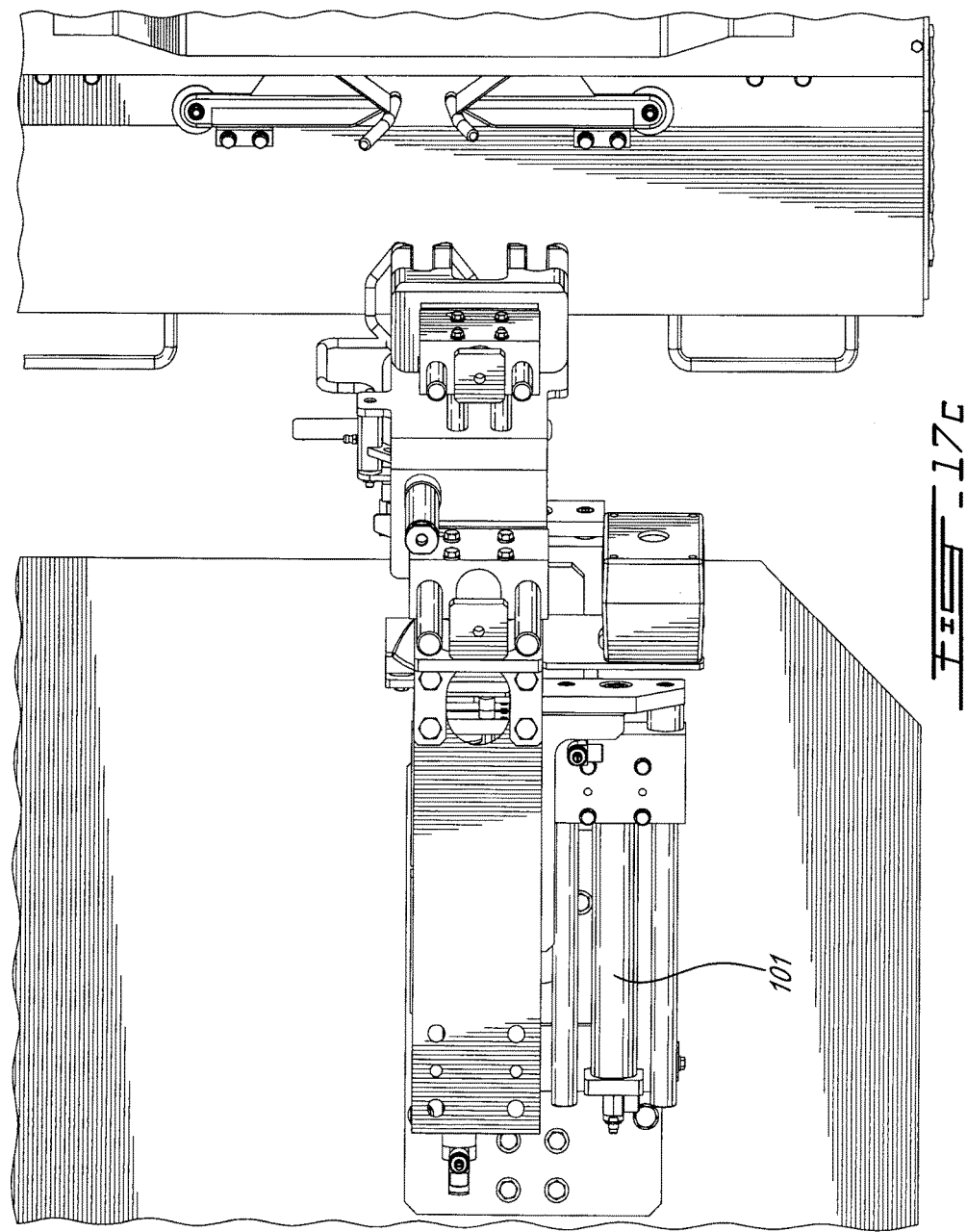

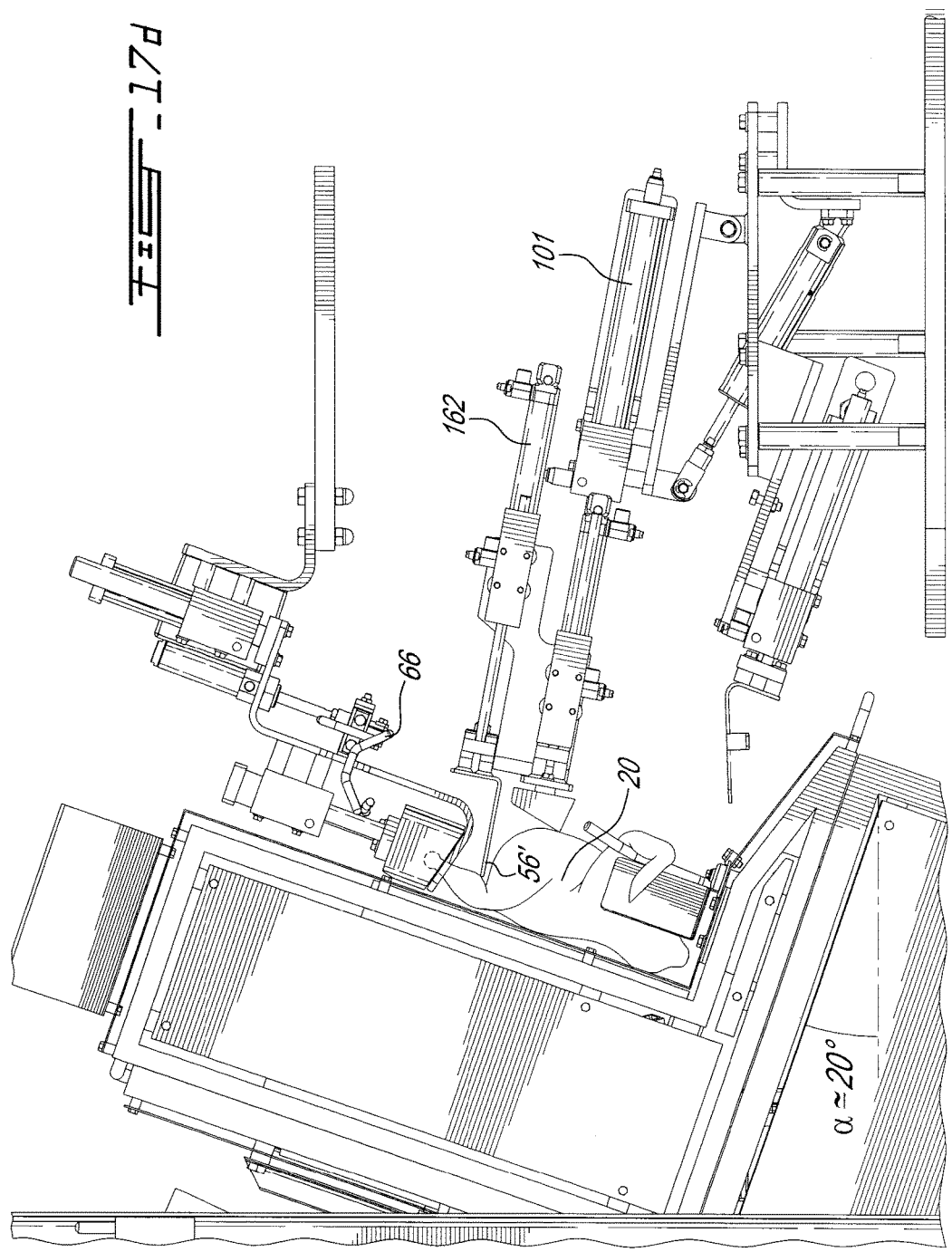

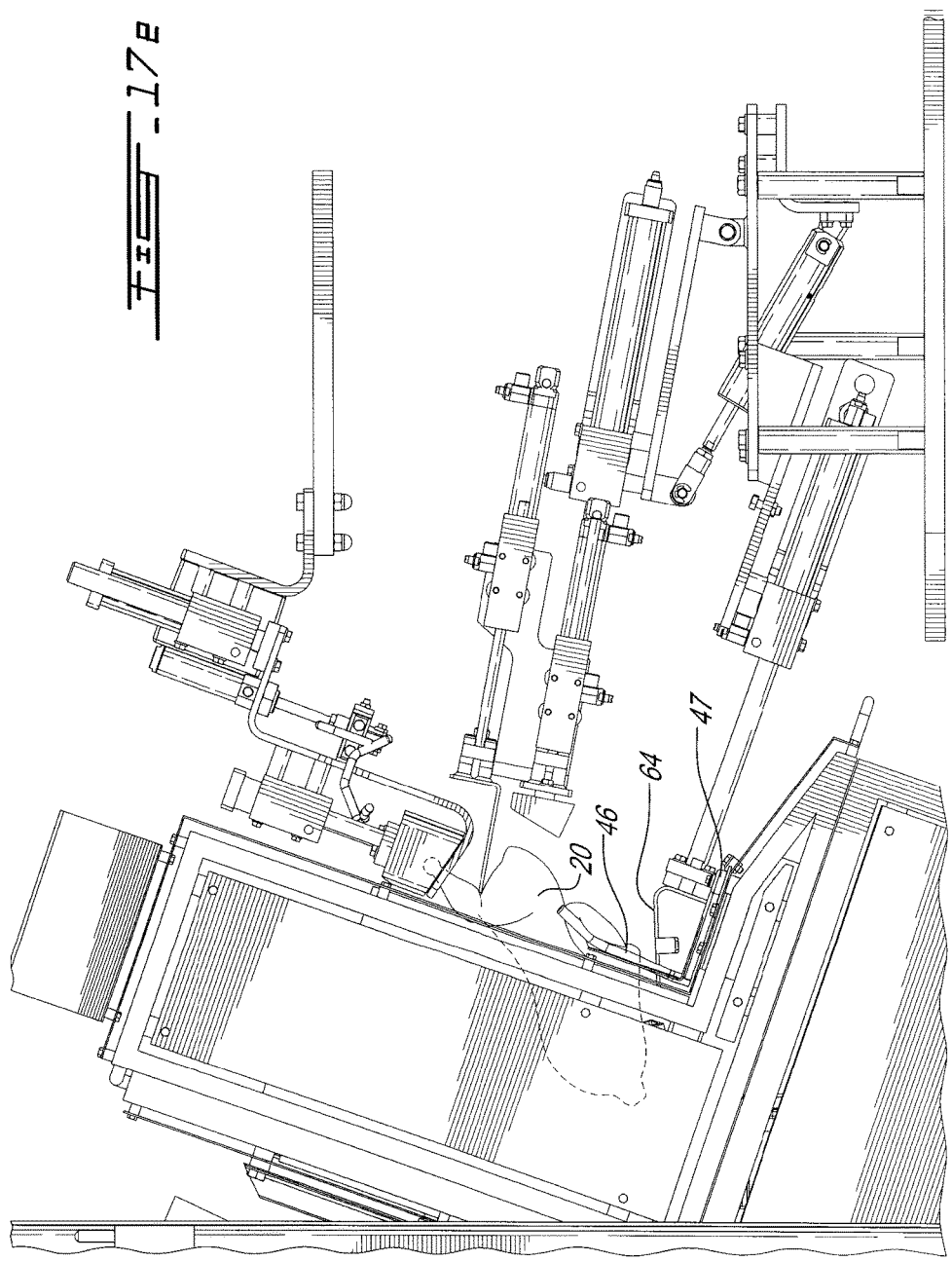

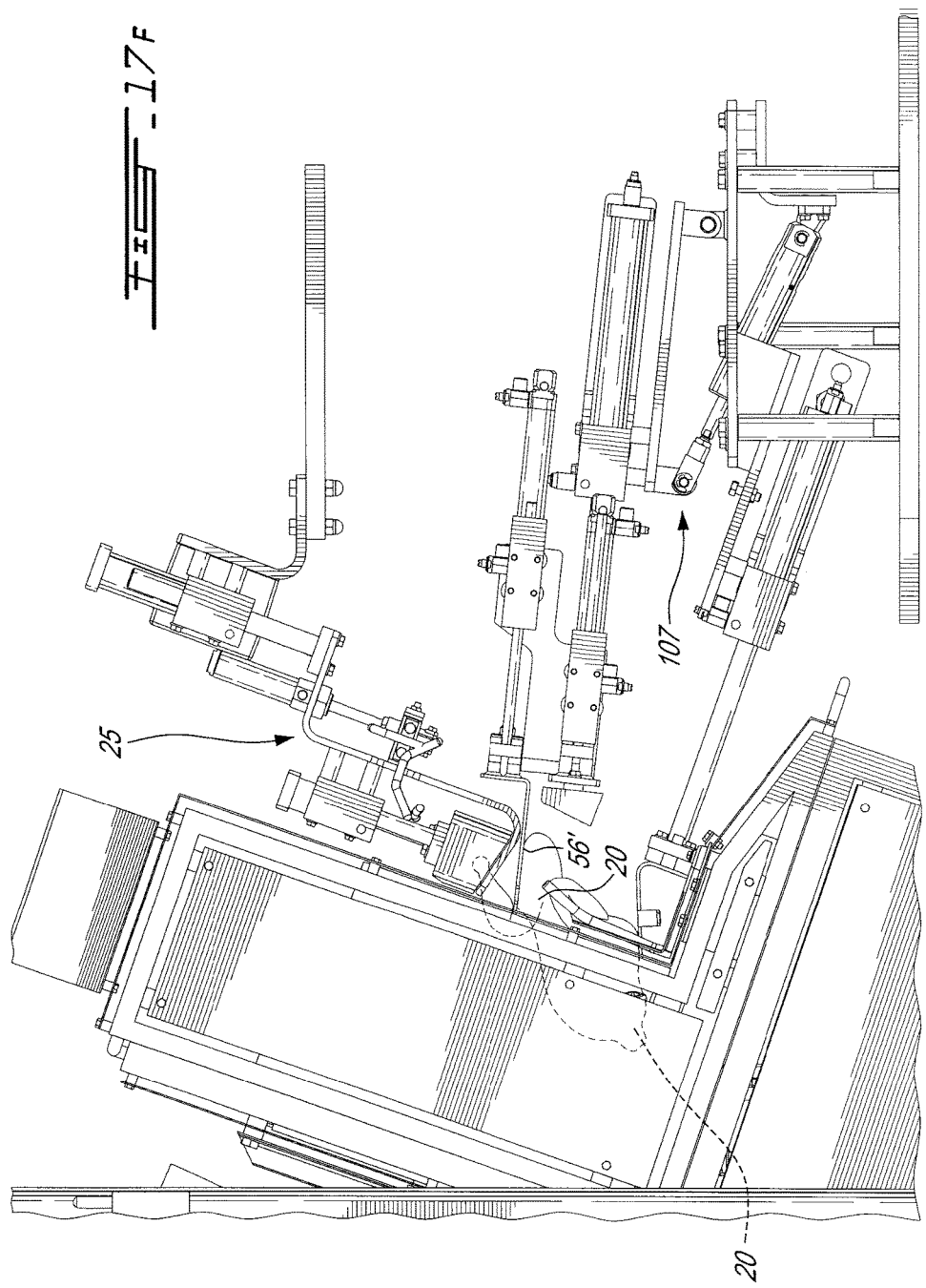

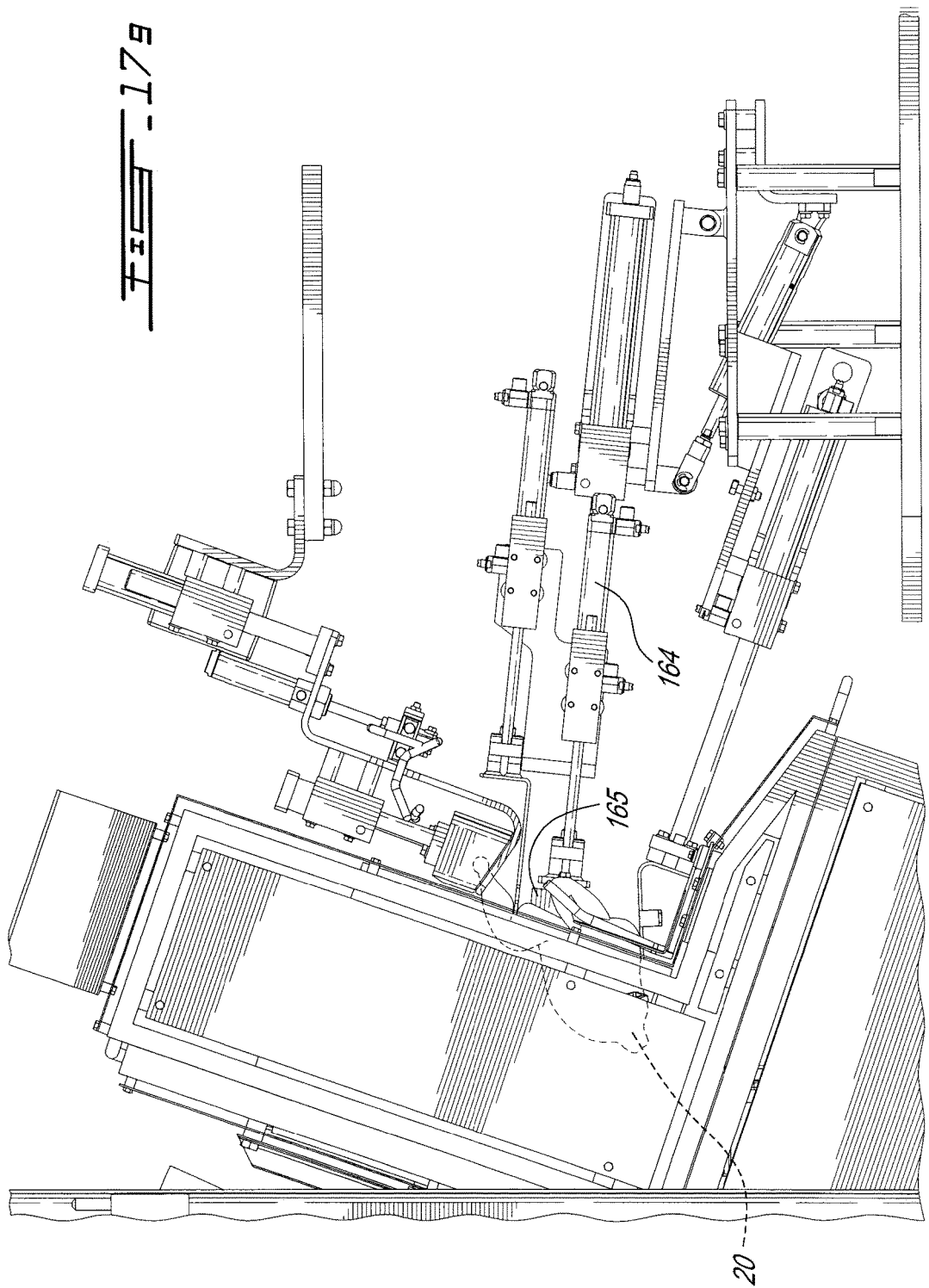

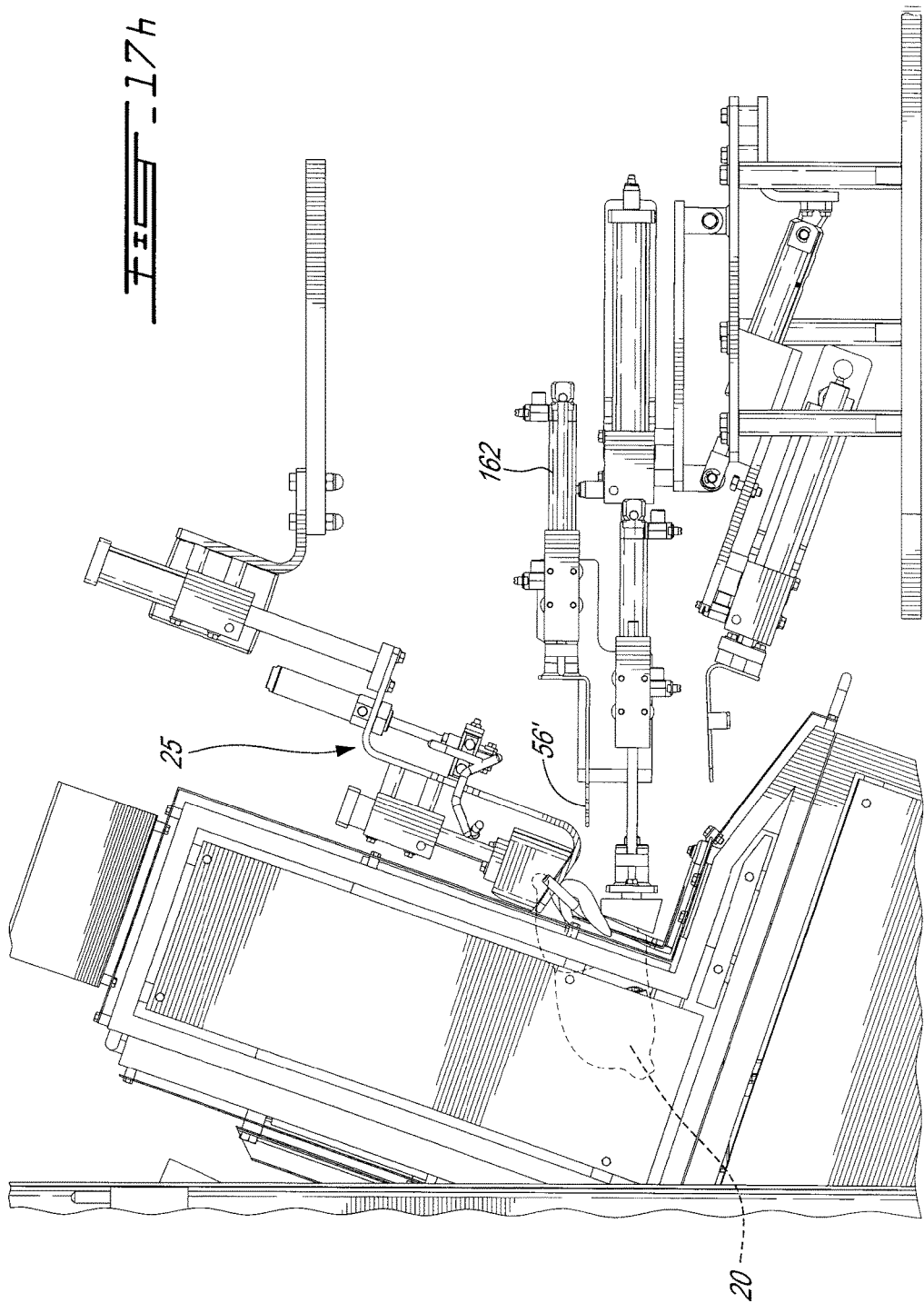

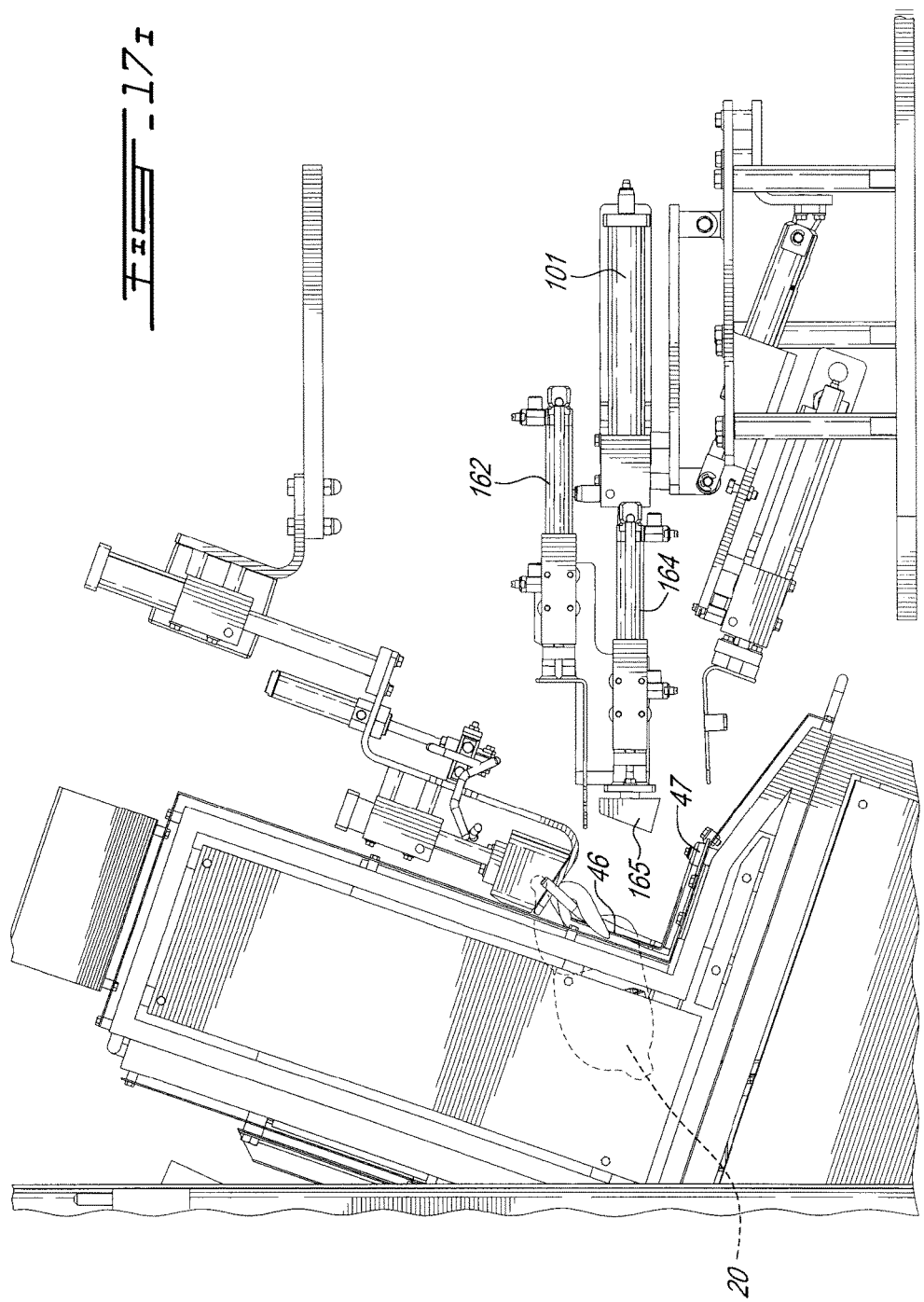

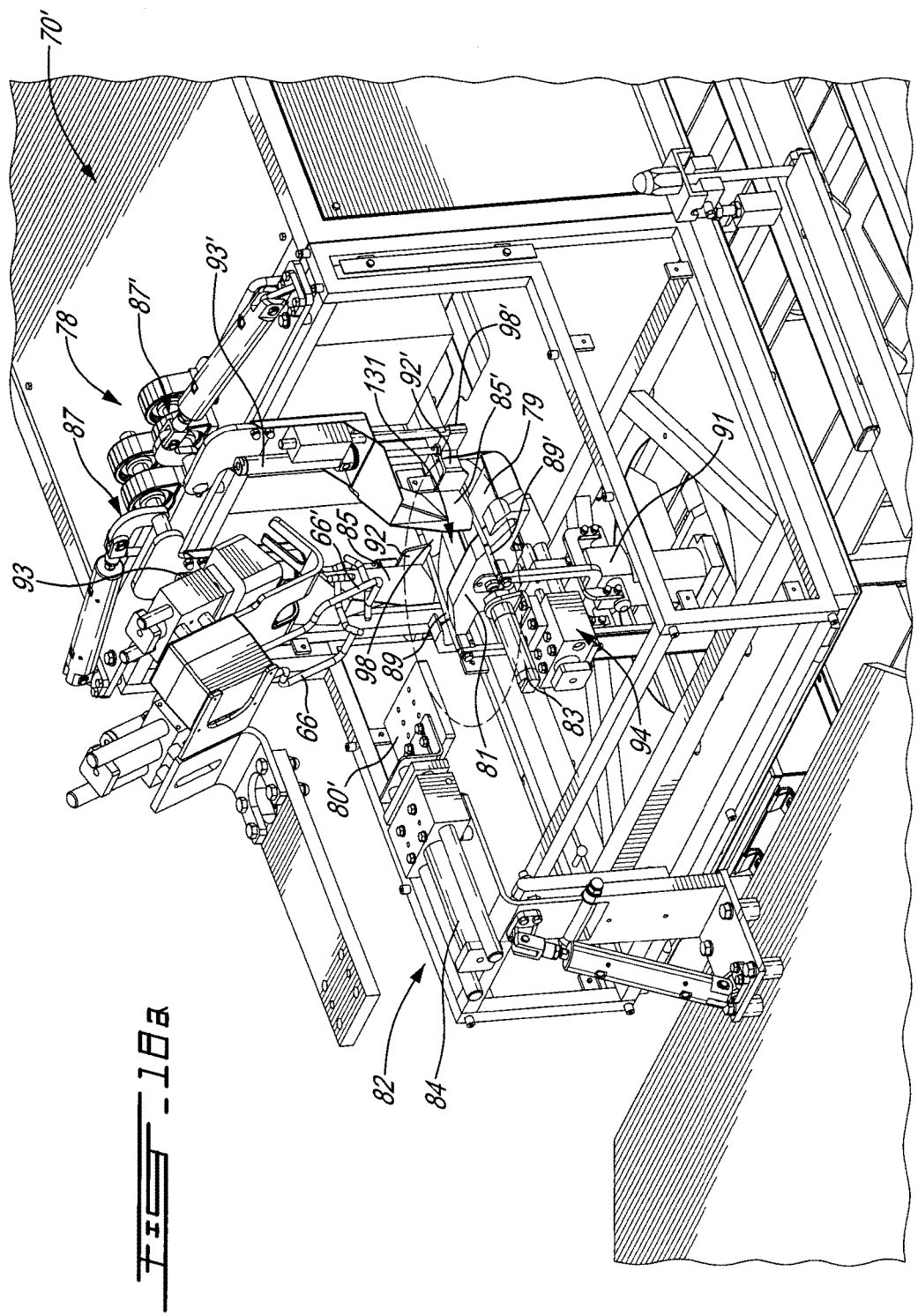

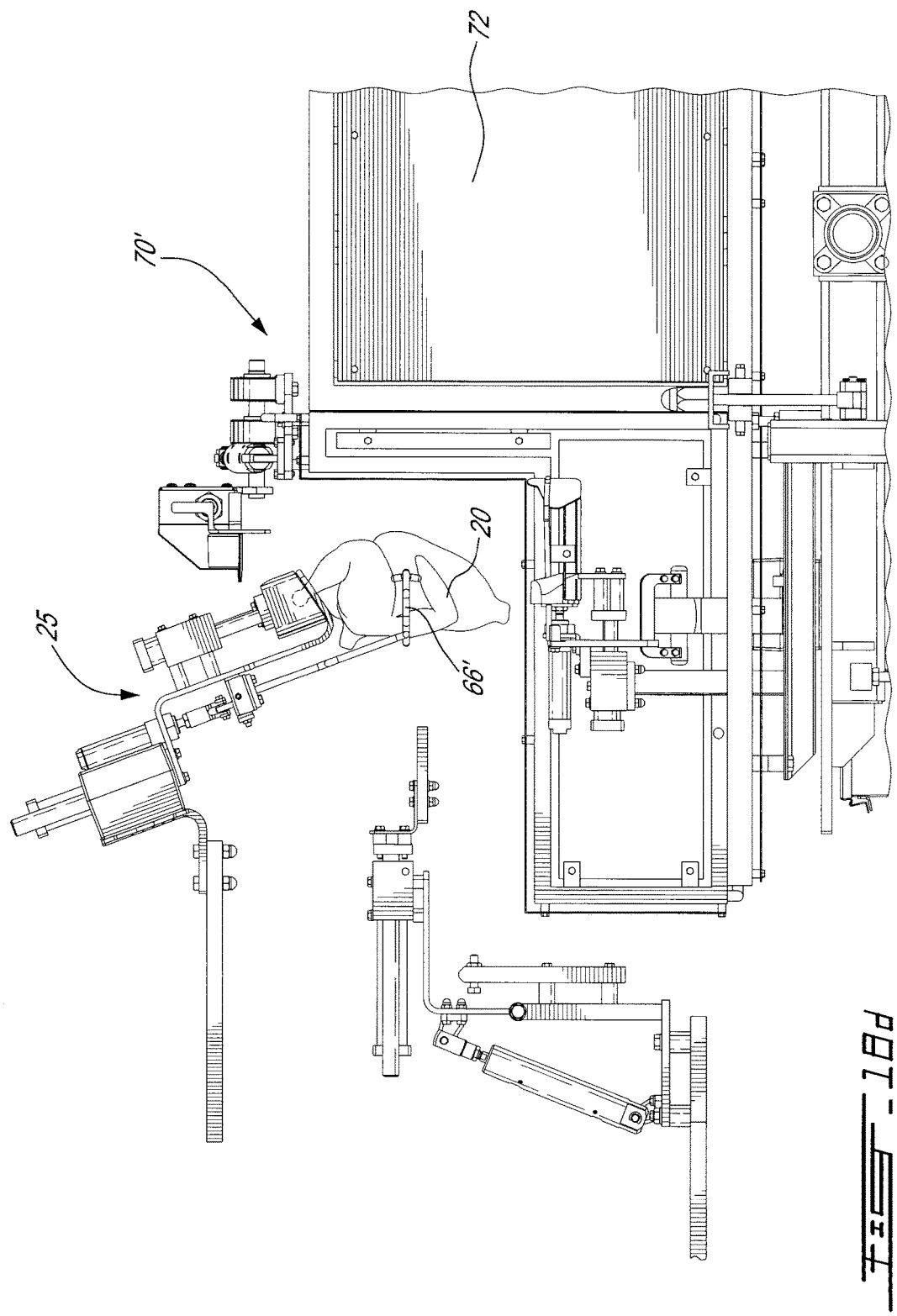

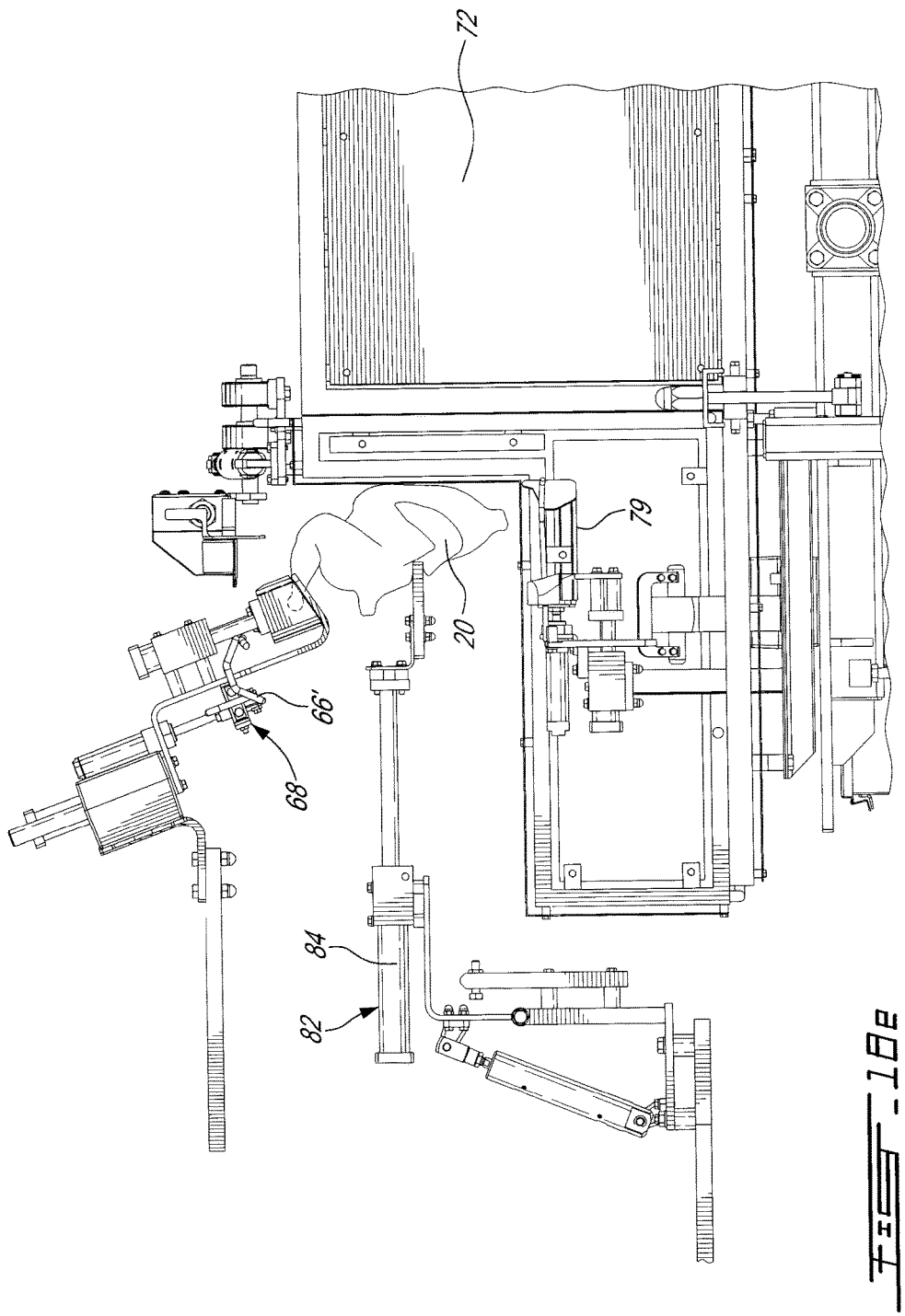

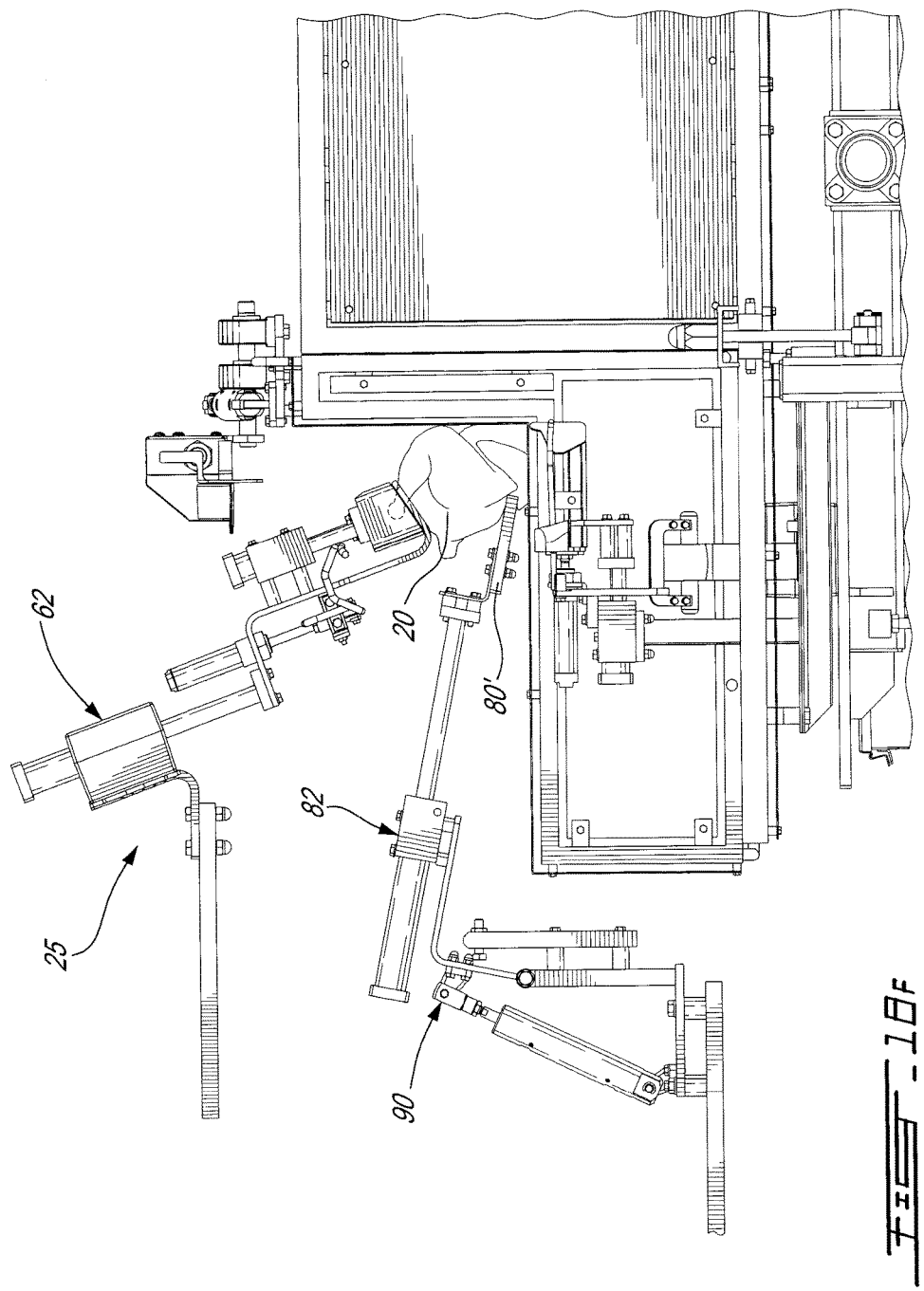

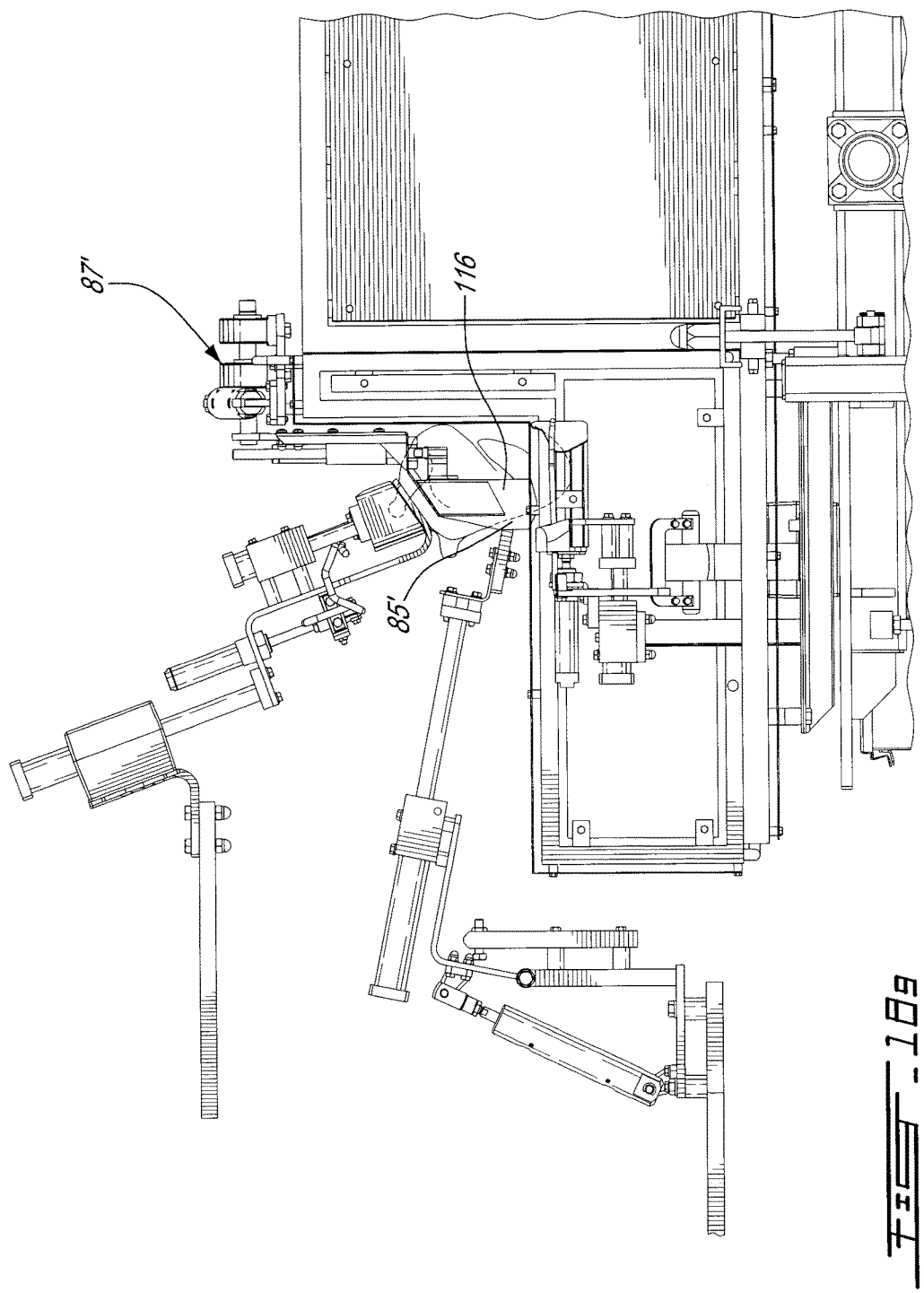

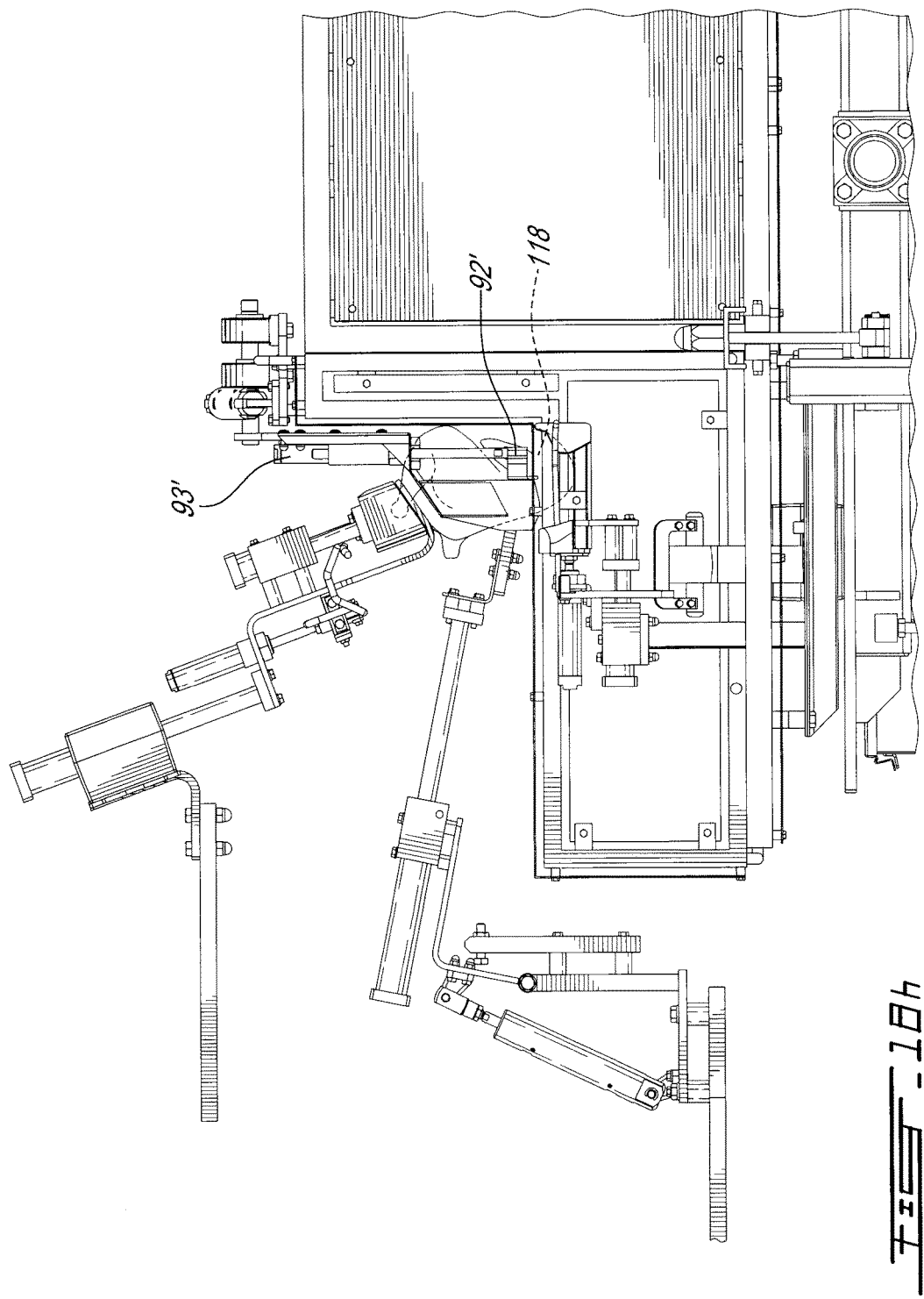

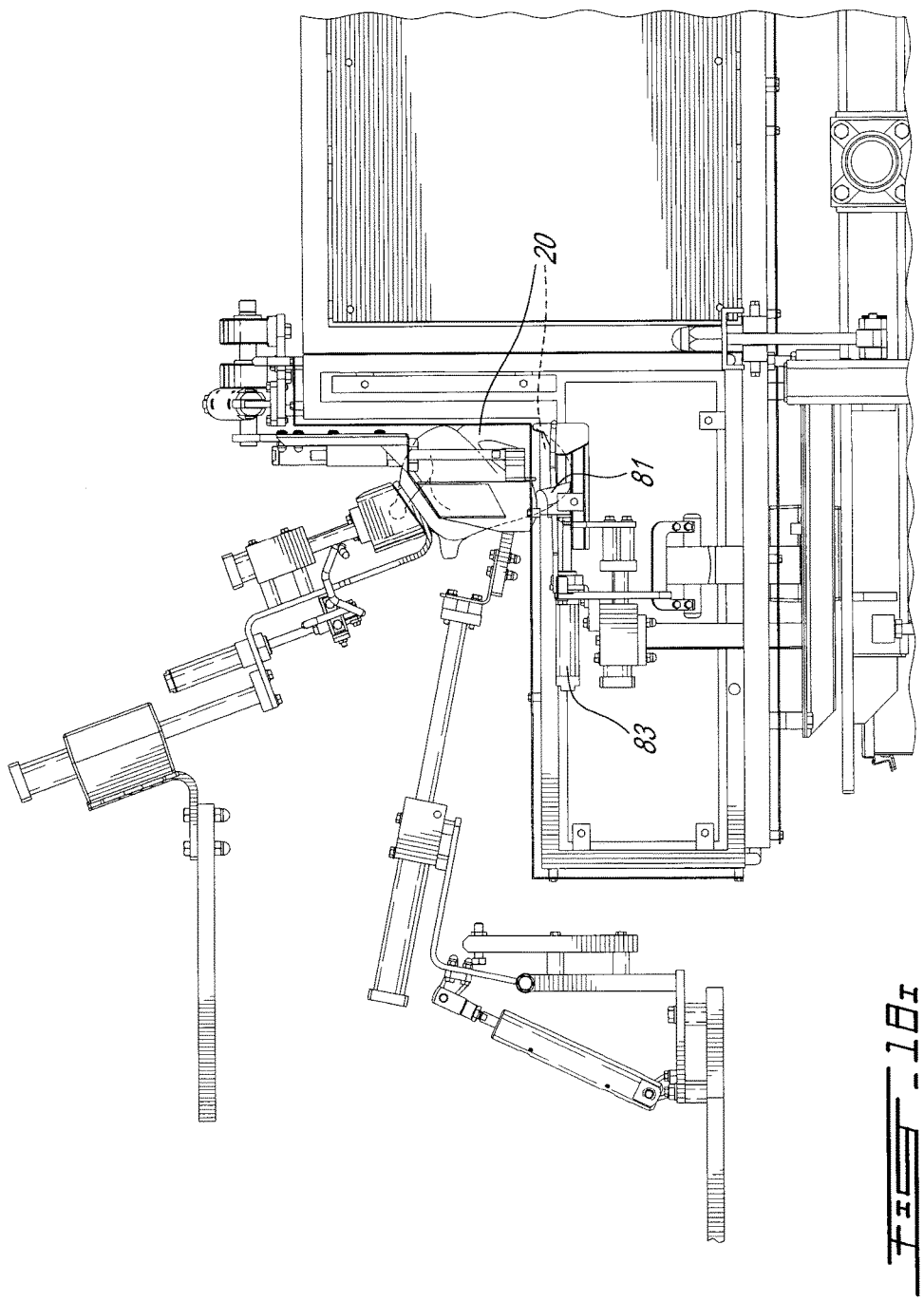

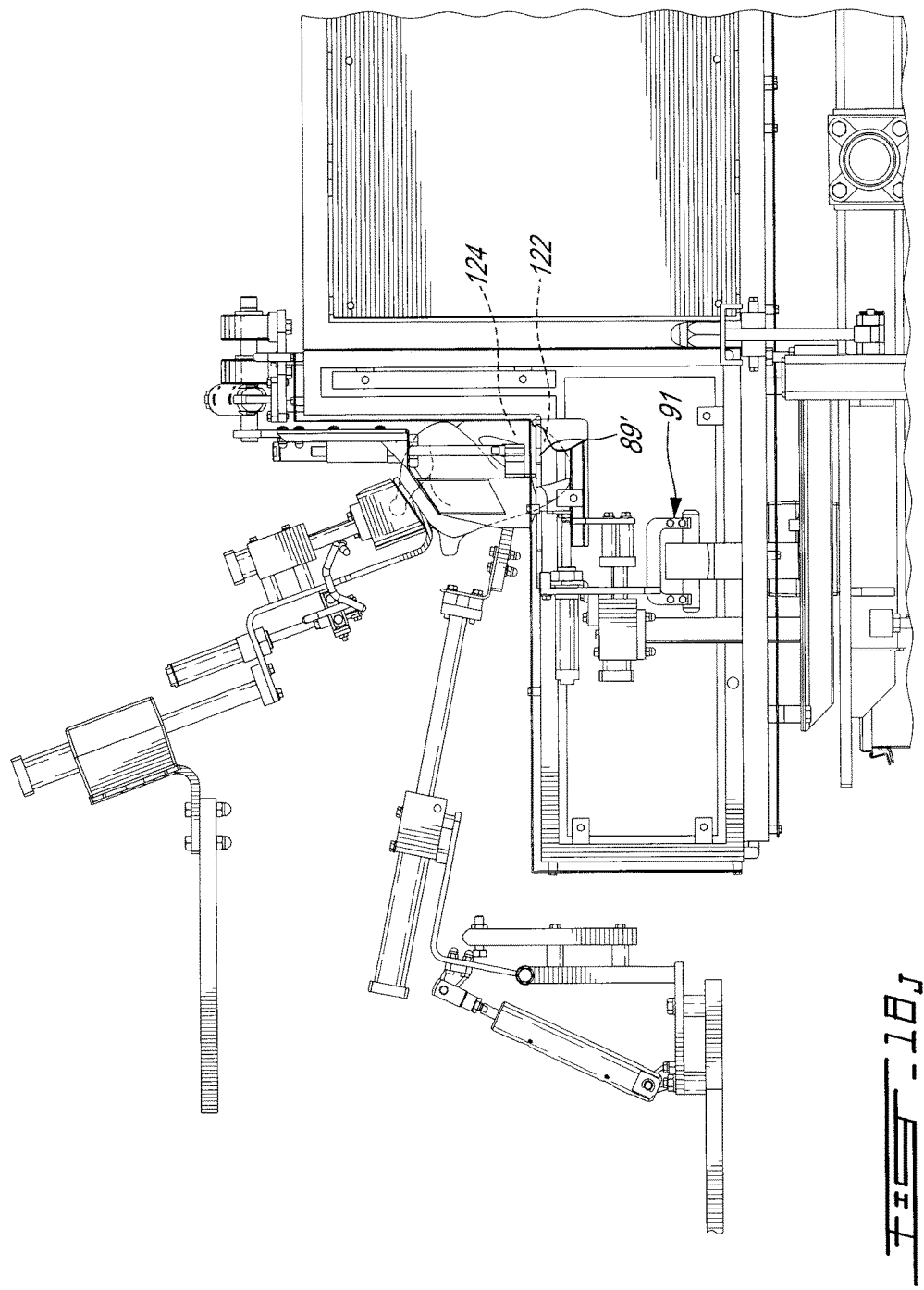

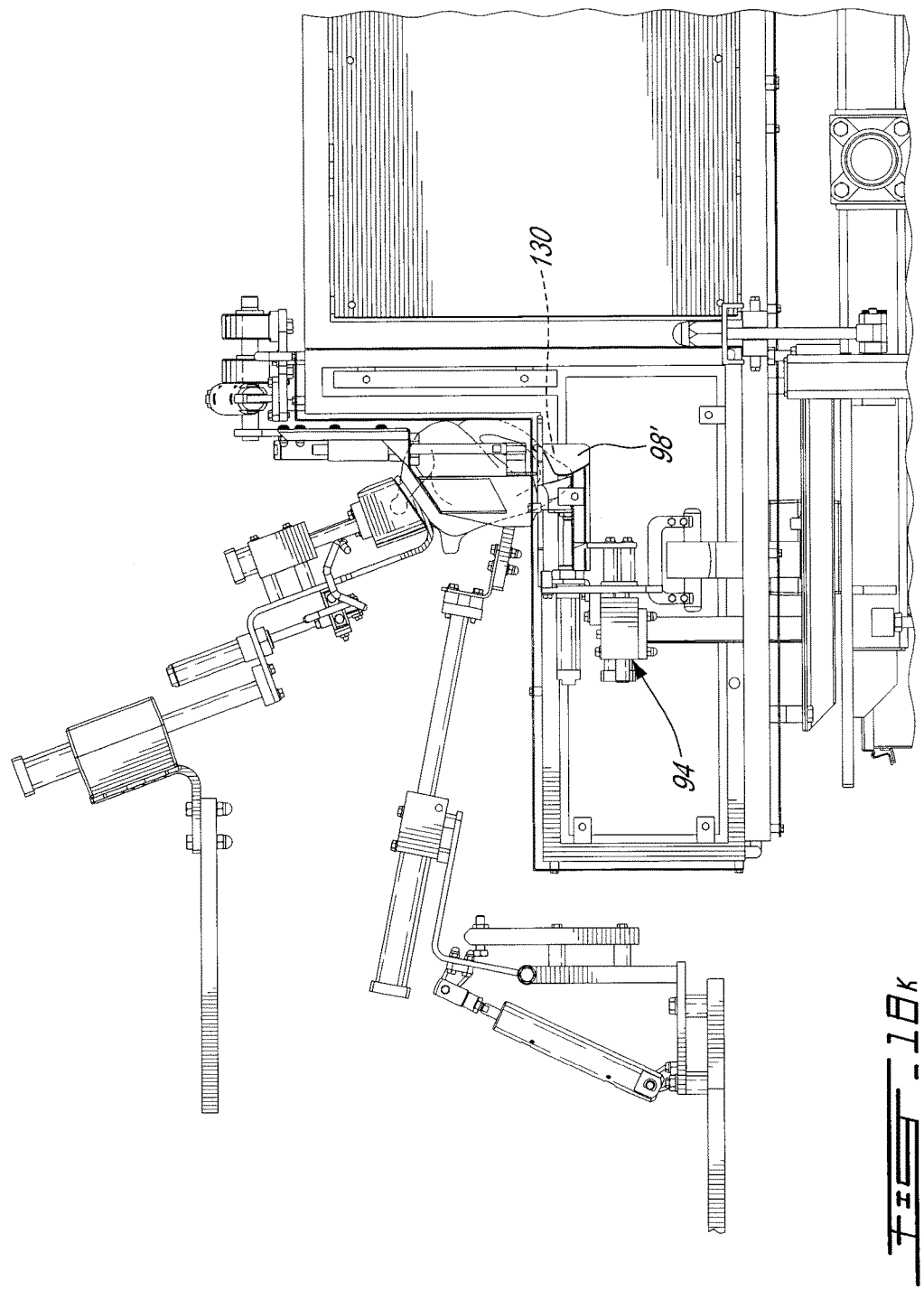

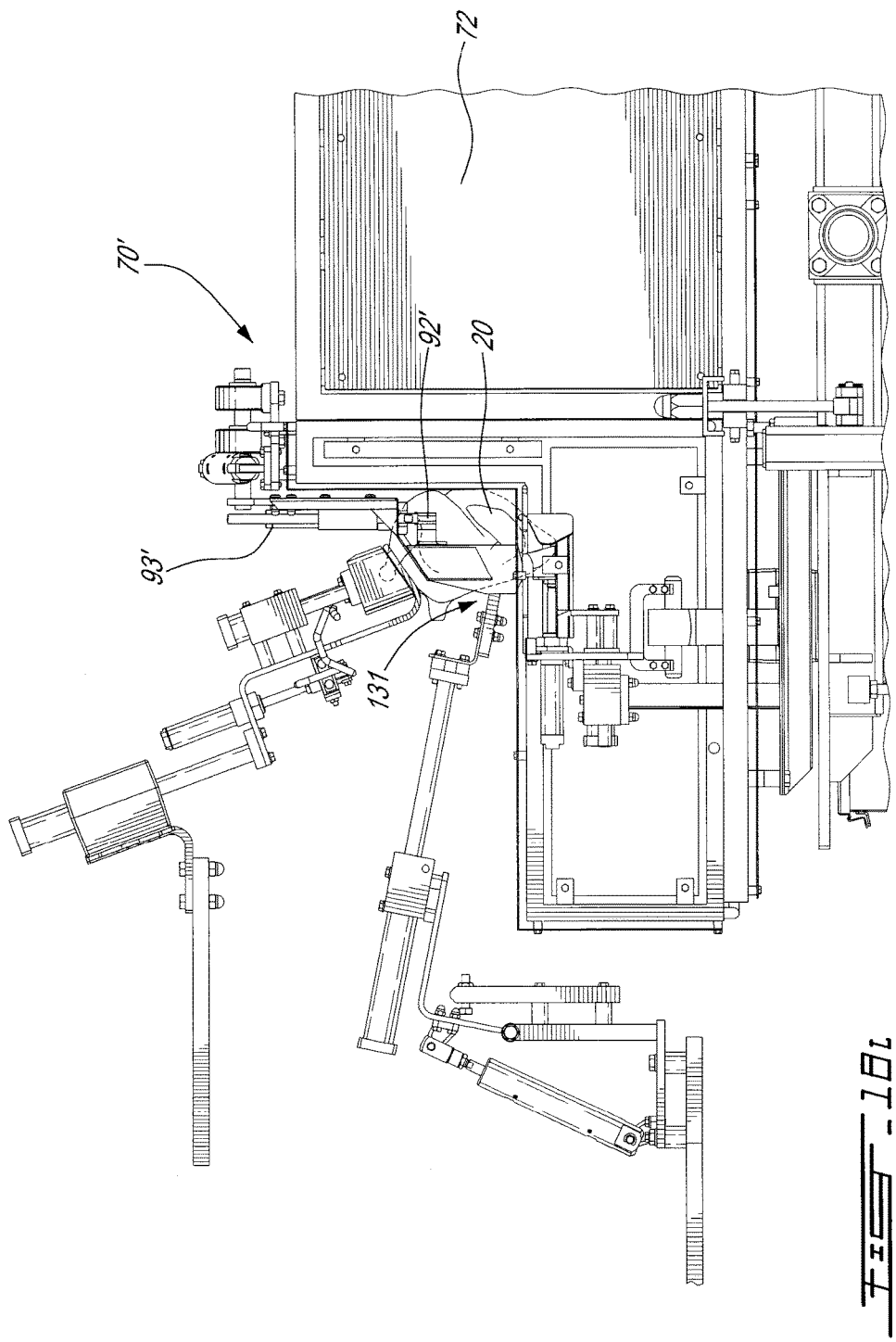

US 10,212,951 B2

SYSTEM AND METHOD FOR TRUSSING SLAUGHTERED BIRDS

FIELD OF THE INVENTION

The present invention relates to the field of bird slaughtering industry, and more particularly to systems and methods for trussing birds in said industry.

BACKGROUND OF THE INVENTION

In bird slaughterhouses, birds are generally trussed prior to packaging with one or more trussing elements such as cords, plastic or metallic ties or elastic bands, to retain the bird's members such as wings or legs in a stable position with respect to the bird's body. Usually, known trussing procedures require various levels of human involvement, from wholly manual to automated operation wherein either bird handling or bird trussing is still performed by a human operator, which operations are highly repetitive, stressing and strenuous due to high production rates involved in modern bird slaughterhouses, and may cause chronic injuries. The use of trussing systems such as supplied by Siebeck GMBH (Eberbach, Germany) requires an operator to present the slaughtered bird to the system in a predetermined position and orientation according to the desired trussing pattern. Shaping apparatus to prepare birds for packaging such as disclosed in U.S. Pat. No. 4,458,380 are also known. Other bird trussing systems requiring some human involvement in the trussing operation are disclosed in international PCT published applications no. WO 2006/003418 A1 and WO 2005/011389. Other systems attempting to provide wholly automated trussing operation are disclosed in international PCT published application no. WO 98/11784 A1, in European published patent applications no. EP 1 419 697 A1, EP 413 629 A1 and EP 425 400 A1, and in European Patent no. EP 493 852.

BRIEF DESCRIPTION OF THE DRAWINGS

Preferred embodiments of bird trussing systems and methods according to the invention will be herein described in view of the accompanying drawings in which:

FIG. 1a is a first perspective view of a bird trussing system as shown from a front side thereof;

FIG. 1c is a second perspective view of the bird trussing system as shown from a rear side thereof;

FIG. 1d is a second perspective view of the bird trussing system as shown from a right side thereof;

FIG. 2a is a perspective view of a bird holder disposed at a working position associated with a bird loading station provided on the system of FIGS. 1a to 1d;

FIG. 2b is a side view of the bird holder and loading station of FIG. 2a;

FIG. 2c is a plan view of the bird holder and loading station of FIG. 2a;

FIG. 3b is a side view of the bird holder and legs flexing station of FIG. 3a;

FIG. 3c is a plan view of the bird holder and legs flexing station of FIG. 3a;

FIG. 4a is a perspective view of a bird holder disposed at a working position associated with a bird's legs crossing station provided on the system of FIGS. 1a to 1d;

FIG. 4b is a side view of the bird holder and legs crossing station of FIG. 4a;

FIG. 4c is a plan view of the bird holder and legs crossing station of FIG. 4a;

FIG. 5a is a perspective view of a bird holder disposed at a working position associated with a first bird trussing station provided on the system of FIGS. 1a to 1d;

FIG. 5b is a side view of the bird holder and trussing station of FIG. 5a;

FIG. 5c is a plan view of the bird holder and trussing station of FIG. 5a;

FIG. 6a is a perspective view of a bird holder disposed at a bird working position associated with a fist intermediary station provided on the system of FIGS. 1a to 1d;

FIG. 6b is a side view of the first intermediary station of FIG. 6a;

FIG. 6c is a plan view of the first intermediary station of FIG. 6a;

FIG. 7a is a perspective view of a bird holder disposed at a working position associated with a second bird trussing station provided on the system of FIGS. 1a to 1d, illustrated without the front cover of the trussing module to show components within the working zone;

FIG. 7b is a side view of the bird holder and second trussing station of FIG. 7a;

FIG. 7c is a plan view of the bird holder and second trussing station of FIG. 7a, illustrated with the front cover of the trussing module;

FIG. 8a is a perspective view of a bird holder disposed at a bird working position associated with a second intermediary station provided on the system of FIGS. 1a to 1d;

FIG. 8b is a front view of the second intermediary station of FIG. 8a;

FIG. 8c is a plan view of the second intermediary station of FIG. 8a;

FIG. 9a is a perspective view of a bird holder disposed at a working position associated with a trussed bird discharging station provided on the system of FIGS. 1a to 1d;

FIG. 9b is a side view of the bird holder and discharging station of FIG. 9a;

FIG. 9c is a plan view of the bird holder and discharging station of FIG. 9a;

FIGS. 10a to 10c are photographic views of the bird loading station provided on the system of FIGS. 1a to 1d, showing its various steps of operation;

FIGS. 12a to 12i are photographic views of the bird's legs crossing station of FIG. 4a, showing its various steps of operation;

FIGS. 13a to 13j are photographic views of the first bird trussing station of FIG. 5a, showing its various steps of operation;

FIGS. 15a to 15c are photographic views of the trussed bird discharging station of FIG. 9a, showing its various steps of operation;

FIG. 16 is a perspective view of an alternate design for the bird holder disposed at a working position associated with the bird's legs flexing station provided on the system;

FIG. 17a is a perspective view of a bird holder of FIG. 16 disposed at a working position associated with an alternate embodiment of first bird trussing station that may be used by the system;

FIG. 17b is a side view of the bird holder and trussing station of FIG. 17a;

FIG. 17c is a plan view of the bird holder and trussing station of FIG. 17a;

FIGS. 17d to 17i are side views of the first bird trussing station of FIG. 17a, showing its various steps of operation;

FIG. 18a is a perspective view of the bird holder of FIG. 16 disposed at a working position associated with an alternate embodiment of second bird trussing station that may be used by the system, illustrated without the front cover of the trussing module to show components within the working zone;

FIG. 18b is a side view of the bird holder and second trussing station of FIG. 18a;

FIGS. 18d to 18l are side views of the second bird trussing station of FIG. 18a, showing its various steps of operation.

SUMMARY OF THE INVENTION

According to a broad aspect of the invention, there is provided a system for trussing slaughtered birds, comprising a conveyer provided with at least one bird holder for transporting a bird to at least one working position along the transport path of the conveyer, a bird trussing station located at the working position, including a trussing module defining a working zone and a mechanical arrangement for bringing the bird within the working zone in predetermined position and orientation relative thereto to allow for operation of the trussing module according to a trussing pattern by which a trussing element catches and maintains the bird in a trussed condition, and a controller operatively connected to the conveyer and the bird trussing station.

According to another broad aspect of the invention, there is provided a method for trussing a slaughtered bird, comprising the steps of: i) transporting the bird to a working position with a bird holder; ii) providing a trussing module at the working position, the trussing module defining a working zone; iii) bringing the bird within the working zone in predetermined position and orientation relative to the working zone; and iv) operating the trussing module according to a trussing pattern by which a trussing element catches and maintains the bird in a trussed condition.

DETAILED DESCRIPTION OF THE PREFERRED EMBODIMENTS

While the systems, devices and methods as described below are well adapted for trussing chicken, their design can be readily adapted for trussing other kind of slaughtered birds such as turkey, duck and the like.

Figure 1B:
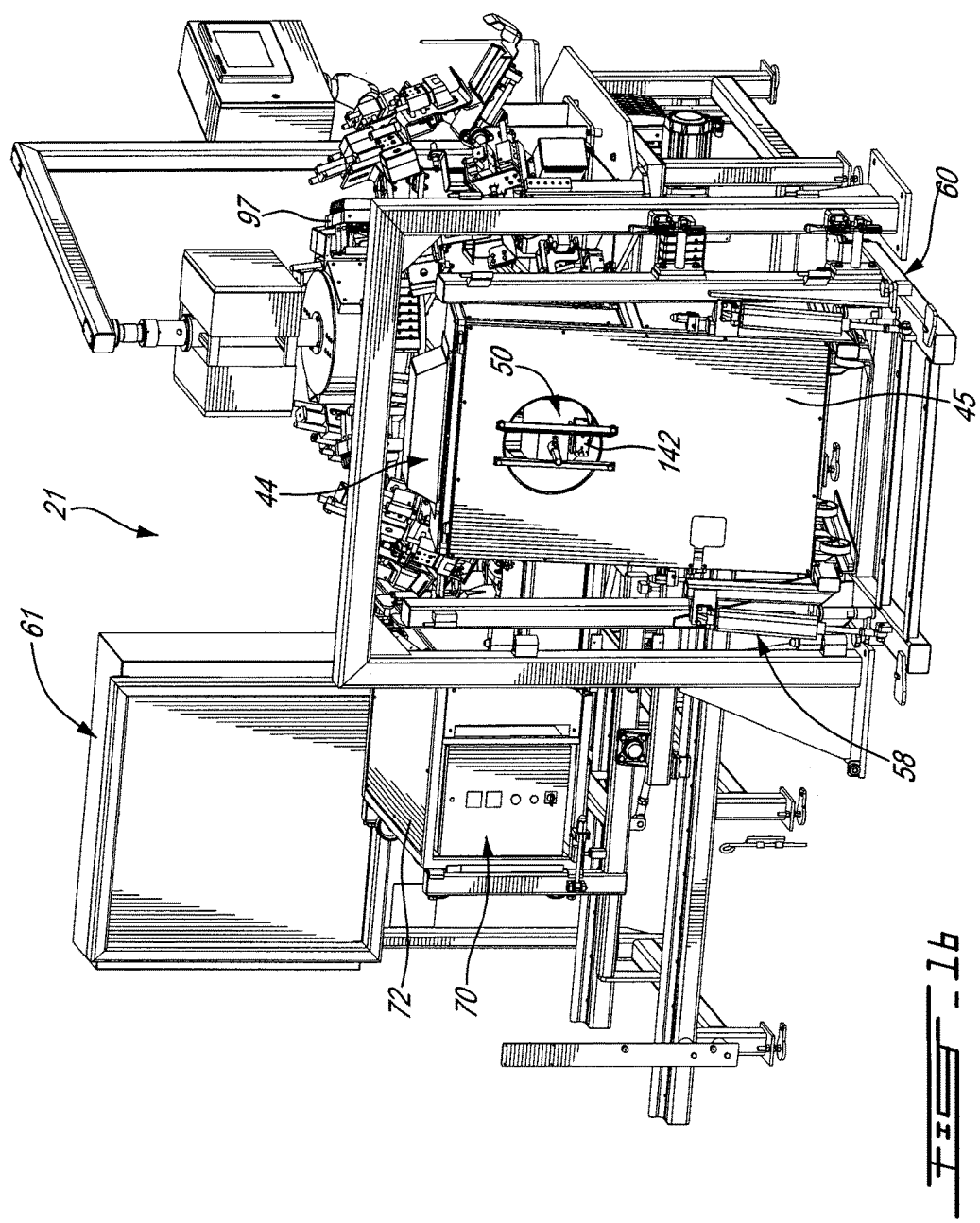
FIG. 1b is a second perspective view of the bird trussing system as shown from a left side thereof.

Referring now to FIG. 1a in view of FIGS. 1b to 1e, there is shown an embodiment of slaughtered bird trussing system generally designated at 21, which includes a conveyer 23 in the form of a carousel for transporting a bird to a plurality of working positions along the transport path of the conveyer 23, to truss the bird according to a first and second trussing pattern in the embodiment shown, as will be explained below in detail. While a carousel has been conveniently used in the present embodiment for transporting the birds to be trussed along a circular path, a conveyer of any other appropriate design such as linear or reciprocal type may be also used depending on the application contemplated. Moreover, the system may be designed to operate according to a single trussing pattern, or to more than two trussing patterns as required by the specific application considered. The conveyer 23 is mounted for rotation about a central vertical axis 32, above and with respect to a main platform 34, at periphery of which are secured the working stations of the system 21, each of which being described in detail below. The conveyer 23 includes a motor-driven indexing unit 26 mounted on the system main frame 53 below the platform 34, which indexing unit 26 is operatively coupled to a rotor 39 on which are secured for rotation therewith a plurality of bird holders 25 as better shown in FIG. 1e, cooperating with the conveyer 23 to transport each bird between the working positions. Vertically disposed onto the rotor 39 is a pneumatic supply unit 49 and an electrical connection unit 146 through which a rotor end 51 extends, which is mounted for rotation to an overhead support 52 secured to the system main frame 53 and acting as a stator.

Referring again to FIG. 1a, the system 21 further includes a first bird trussing station 44 located at a corresponding working position 55 as better shown in the embodiment of FIGS. 1c and 5a in accordance with an illustrative set-up for the purpose of describing its components, and including a first trussing module 45 defining a working zone 57 associated with a trussing plane passing therethrough, which plane being represented by x and y axis at z=0 in FIG. 5a. A trussing module making use of a cord as the trussing element, such as supplied by Siebeck GMBH (Eberbach, Germany) may be employed, typically provided with a cord dispensing device (not shown) moving circularly about axis z and around the working zone 57 adjacent an annular recess 59 in such a manner that the cord passes around the bird portion to be trussed, which module being further provided with cord tying and cutting devices (not shown) which are operable according to the first trussing pattern. The trussing station 44 further includes a mechanical arrangement 54 for bringing the bird within the working zone 57 in predetermined position and orientation relative to the trussing plane to allow for operation of the trussing module 45 according to the first trussing pattern by which the cord catches and maintains the bird in the desired trussed condition. As shown in FIGS. 1b and 5a, the mechanical arrangement 54 includes a bird receiving element 50 coupled to the trussing module 45 through a biasing device 142 acting along z axis to provide bird's size adaptation, which element 50 is disposed within the working zone 57 for maintaining the bird in the predetermined position and orientation relative to the trussing plane. The mechanical arrangement 54 further includes a bird's leg engaging element 56 coupled to a driving mechanism 99 for orienting the bird's body toward the working zone, which driving mechanism 99 includes a main linear displacement actuator 101 having a working end 103 coupled to the bird's leg engaging element 56 and a base 105 mounted to a pivoting mechanism 107 secured to the main platform 34 through a table 109 and acting within the vertical plane while the bird is moved toward the working zone. The mechanical arrangement 54 also includes a bird's neck engaging element 64 coupled to a driving mechanism 111 for pushing the bird's neck toward the working zone in the predetermined position and orientation relative to the trussing plane, which driving mechanism is conveniently secured to the main platform at an appropriate angular orientation therewith through the table 109. As shown in FIG. 1b, the mechanical arrangement 54 further includes a tilting mechanism 58 coupled to the trussing module 45 to bring the trussing plane to a predetermined tilt "α" with respect to a horizontal plane parallel to the main platform surface as better shown in FIG. 5b, which tilt "α" being preferably of about 20°. As will be explained below, the tilt "α" may be set to a lower value of about 10° between each operation cycle of the trussing module as shown on FIG. 5b. The mechanical arrangement 54 also includes a linear displaceable carrier 60 supporting the trussing module 45 to bring thereof to a predetermined position with respect to the conveyer 23. As part of the mechanical arrangement 54, and for each bird holder 25, there is provided a linear displacement mechanism 62 mounted on the conveyer 23 through a carrying plate 113 and coupled to bird holder 25 for moving the bird within a vertical plane toward the working zone 57. The bird trussing station 44 further includes a pair of opposed bird's wing engaging elements 46, 46' coupled to biasing mechanisms 47, 47' for maintaining the bird's wings away from the bird's flanks to allow the trussing element to pass around the bird's wing shoulder and transversely the bird's back according to a convenient trussing pattern.

Turning back to FIG. 1a, the system 21 further included a controlling device such as a programmable logic controller included in control unit 61 operatively connected to the conveyer 23, bird trussing station 44 and operator control panel 154, with appropriate control data link 155.

Figure 13C:
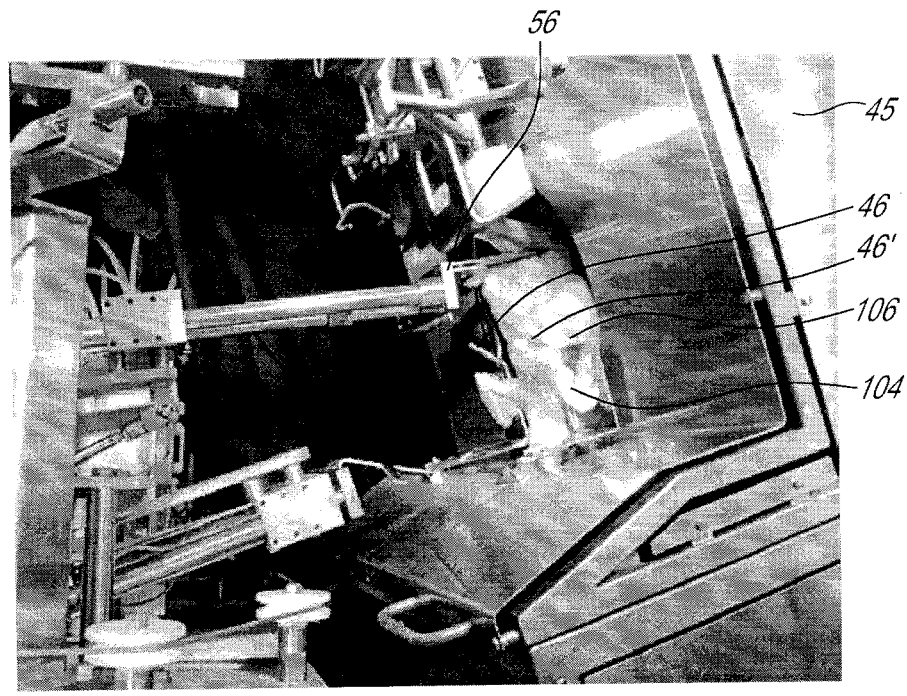
Figure 13D:
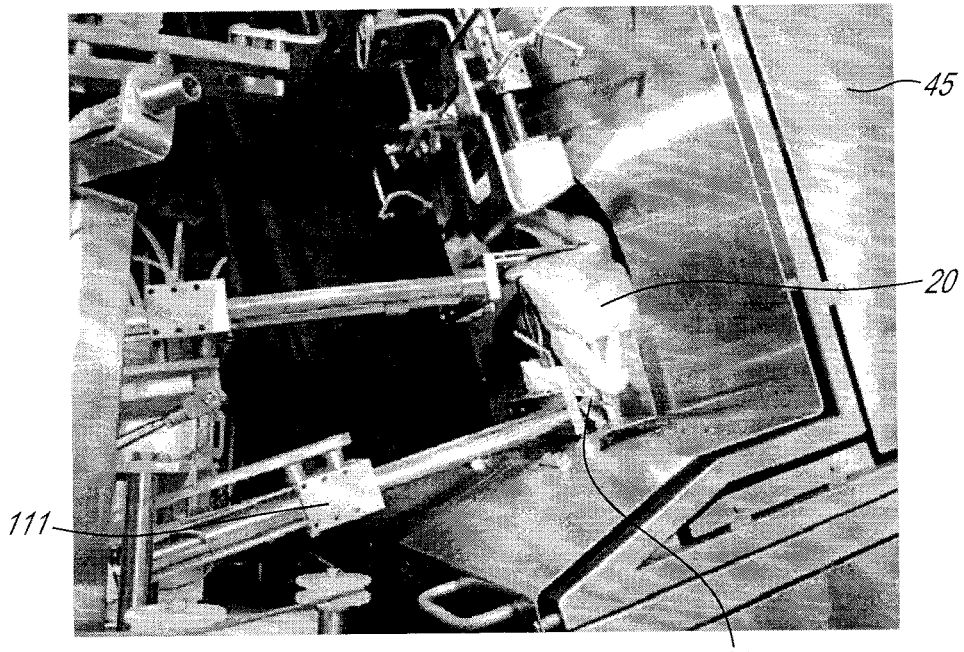
Figure 13E:
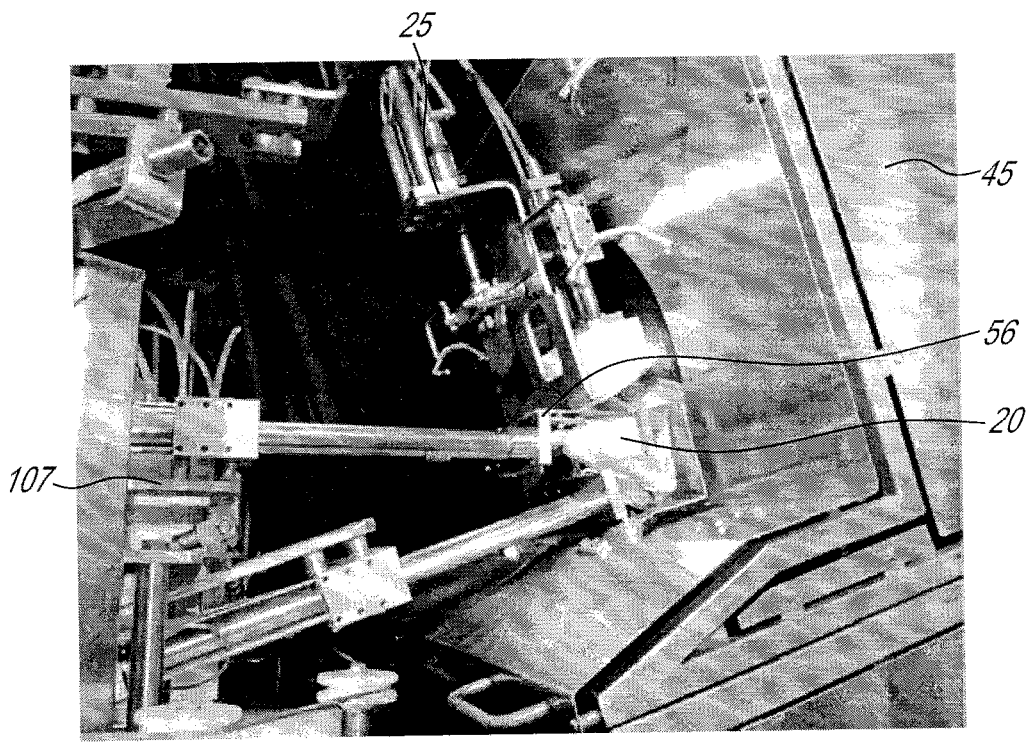
Figure 13F:
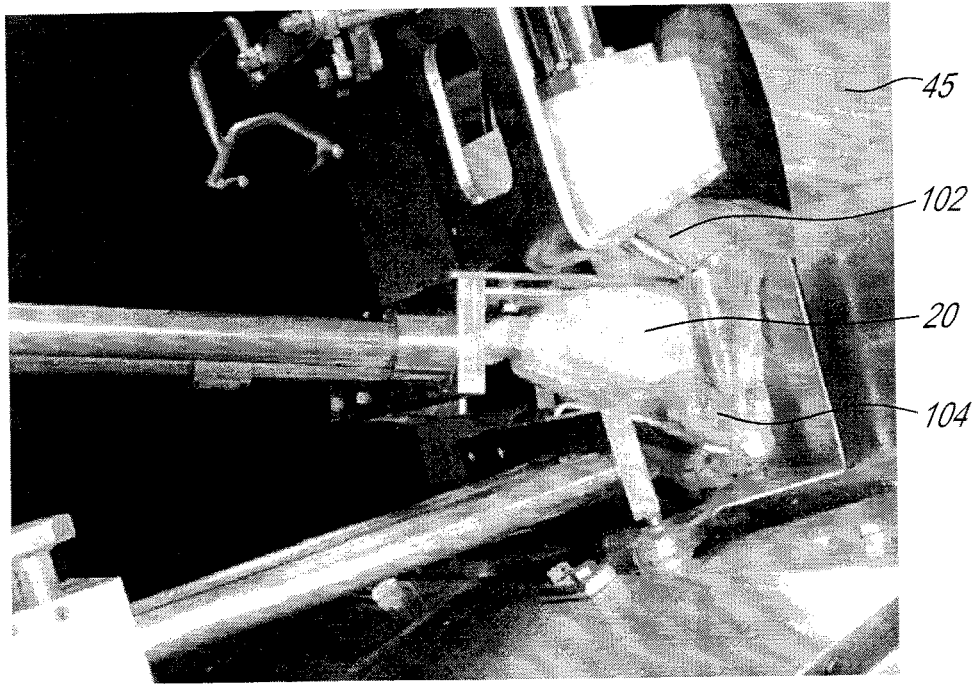
Figure 13G:
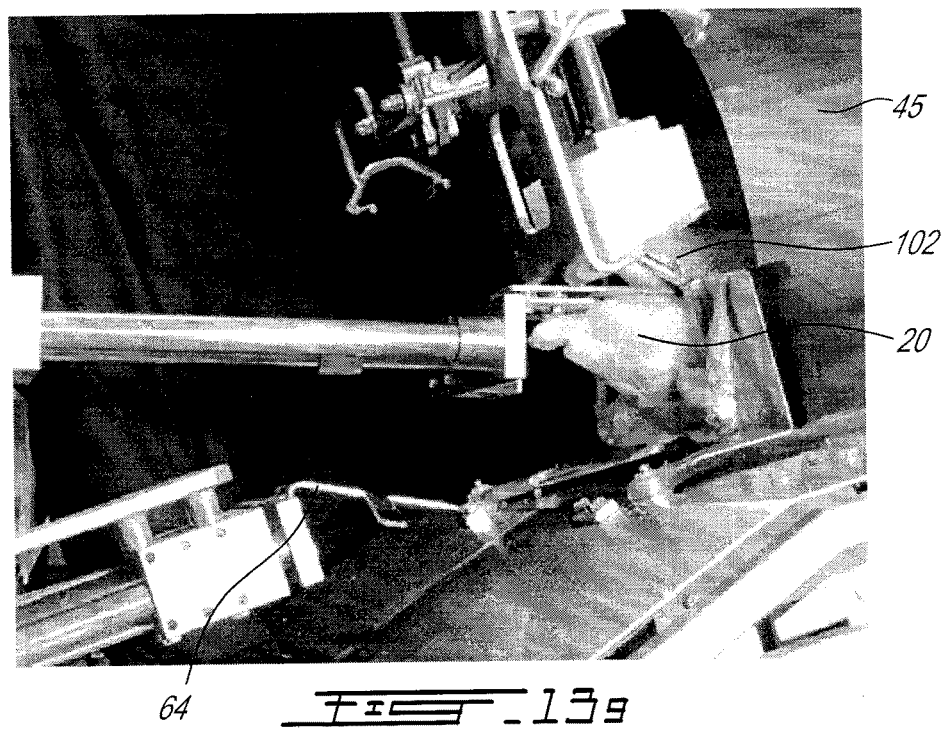
Figure 13H:
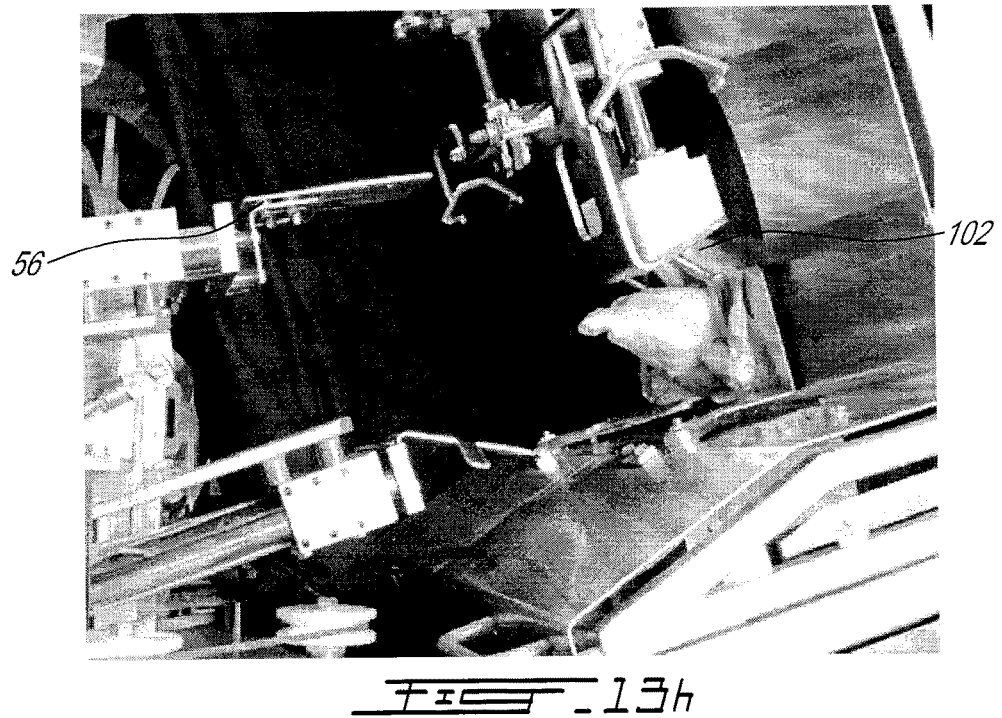
Figure 13I:
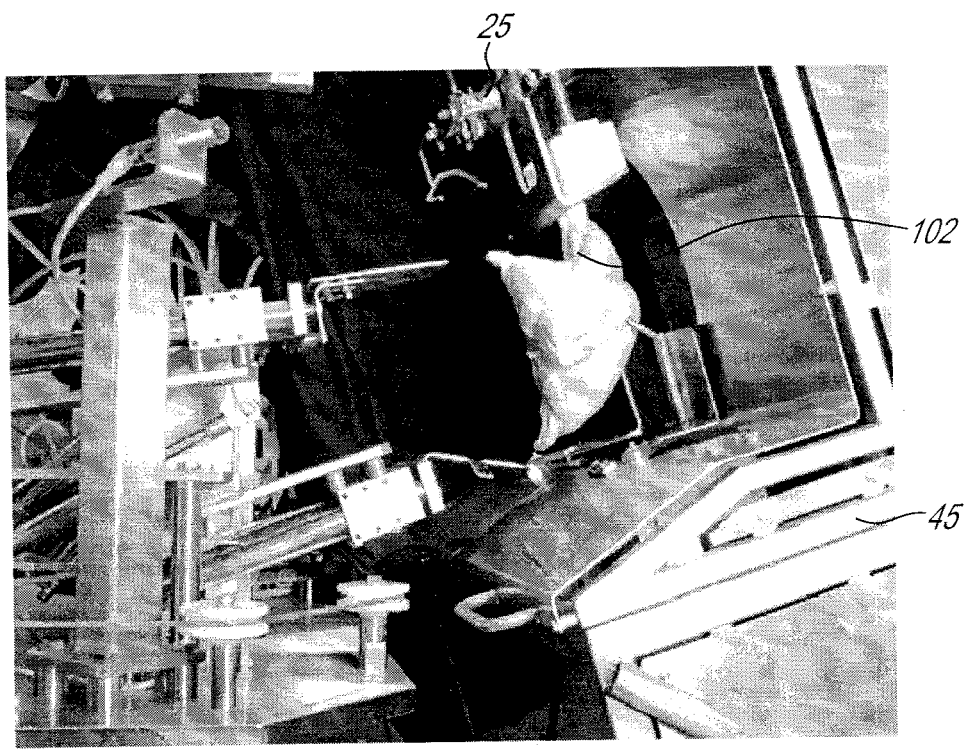
Figure 13J:
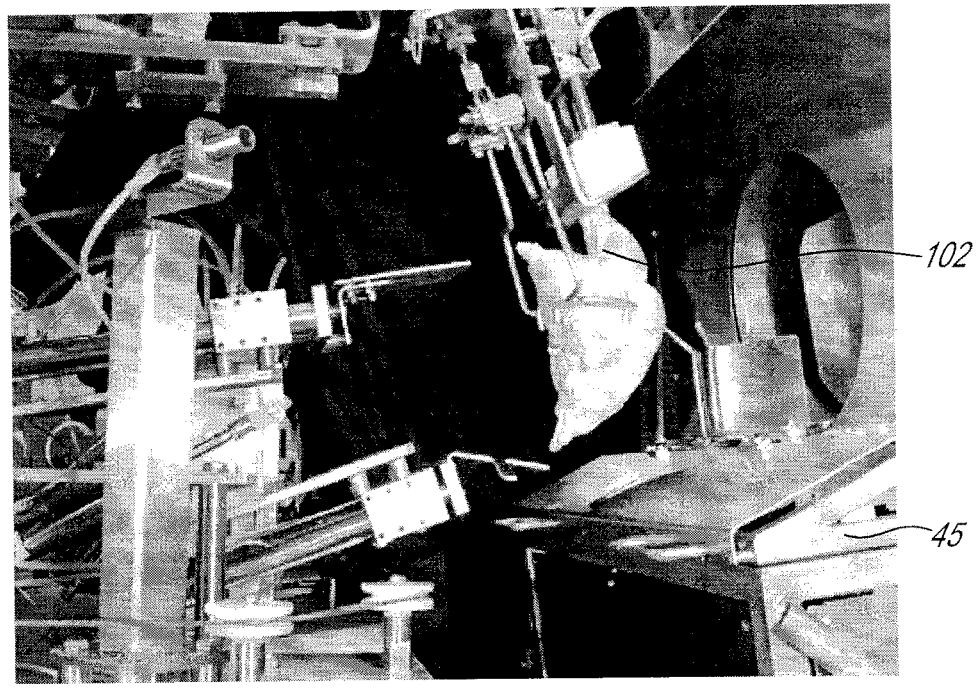

1. The basic mode of operation of the trussing station as described above will now be explained in view of FIGS. 13a to 13j. First, the bird 20 is transported to the working position with the bird holder 25 as shown in FIG. 13a, while the tilt is set at its lower value of about 10°. Then, the bird is brought within the working zone defined by the trussing module 45 in predetermined position and orientation relative to the trussing plane associated with the working zone as shown by FIGS. 13b to 13j. Referring to FIG. 13b, after the bird's flank engaging elements 66, 66' have been brought to their release position, the main linear displacement actuator 101 is then operated to cause the bird's leg engaging element 56 legs to push the bird's leg toward the working zone, as better shown in the enlarged view of FIG. 13c. To increase processing rate, It can be appreciated that the operation of actuator 101 may be programmed on the controller to begin during the last phase of the indexing movement of the carousel, provided the engagement of element 56 with the bird 20 occurs when the latter reaches the working position associated with trussing station 44. By comparing FIG. 13b with FIG. 13a, it can be seen that the trussing module 45 is tilted to bring the trussing plane to the predetermined tilt of about 20° with respect to a horizontal plane. Then, as shown in FIG. 13d, the driving mechanism 111 is operated to cause the bird's neck engaging element 64 to push the bird's neck toward the working zone. Then, as shown in FIG. 13e, the bird holder 25 is caused to move the bird downwardly within the vertical plane toward the working zone, while action of the pivoting mechanism 107 within the vertical plane allow the bird's leg engaging element 56 to follow the downward movement of the bird toward the working zone. Then, as shown in FIG. 13f, the trussing module 45 is operated according to the trussing pattern by which a cord 102, used as the trussing element in the example shown, catches and maintains the bird 20 in a trussed condition. In order to ensure tight trussing, while the trussing module 45 is operating, a backward movement is imparted to the bird' neck engaging element 64 toward a fully retracted position as shown in FIG. 13g, and a backward movement is imparted to the bird's legs engaging element 56 toward a fully retracted position as shown in FIG. 13h. In the presently described embodiment, the trussing is performed while maintaining the bird's wings 104 away from the bird's flanks 106 by the use of bird's wing engaging elements 46, 46' as better shown in FIG. 13c, to allow the cord 102 to pass around the bird's wing shoulder and transversely the bird's back and then around the crossed legs according to the chosen trussing pattern, as better shown in FIGS. 13i and 13j, which respectively illustrate the bird after having been brought out of the working zone respectively through upward movement of holder 25 and after reset of the trussing module 45 tilt back to its lower value of about 10°.

Figure 10B:
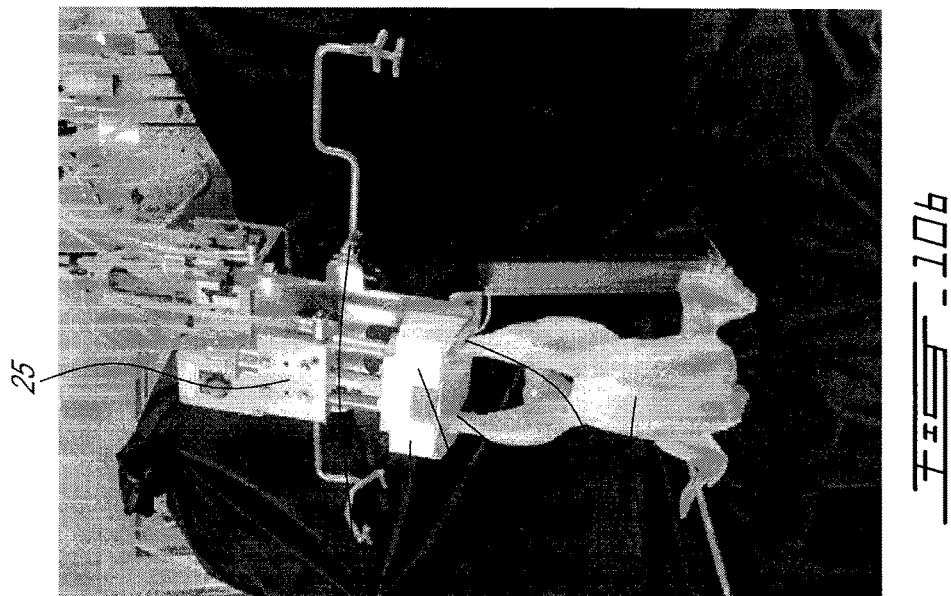
Figure 10A:
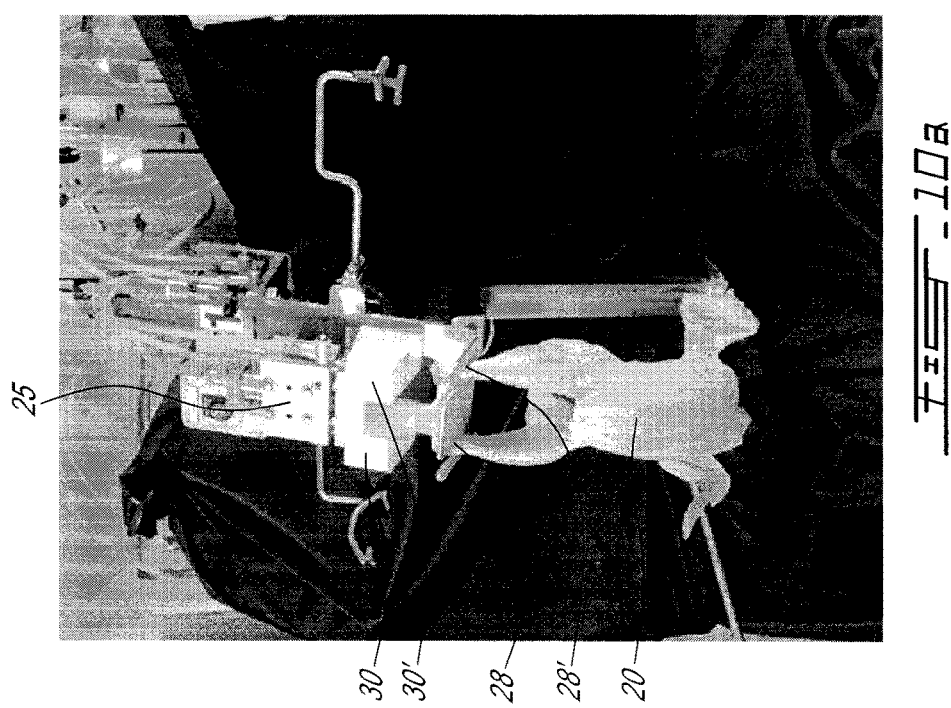

Referring now to FIGS. 2a, 2b and 2c in view of FIGS. 1e and 10a to 10c, there is shown the bird holder 25 disposed at a working position 22 associated with a bird loading station provided on the system 21 as generally designated at 76 in FIG. 1a. Each bird holder 25 has first and second bird's leg end securing devices 27, 27' each having a leg suspending element 28, 28' cooperating with a leg end locking element 30, 30' capable of being moved between a leg end locking position, as shown in FIG. 10b, and a leg end releasing position, as shown in FIG. 10a, allowing the leg end to be selectively engaged by and disengaged from the leg suspending element 28, 28'. The leg end locking elements 30, 30' are secured to a piston element 67 and lateral guiding rods 69, 69' of a linear displacement mechanism 63 having its stationary portion being mounted using spacers 71 as shown in FIG. 2b to a leg holding plate 65 provided on the bird holder 25 and from which extend the leg suspending elements 28, 28'. As shown in FIG. 2a, the bird holder 25 is further provided with a pair of opposed bird's flank engaging elements 66, 66' coupled to a driving mechanism 68, including a lever 73 linked to the working end of a linear actuator 74 having its base secured to holding plate 65, for laterally stabilizing the bird 20 during transport thereof, as shown in FIG. 10c. The flank engaging elements 66, 66' may be provided with front and rear gripping members 144 and 144' to improve engagement with the bird's flanks, provided these members do not interfere with the trussing element present on the bird 20 exiting the trussing station 44. Depending on the trussing pattern used, the rear members 144' could be omitted to avoid such interference. The bird loading station 76 includes a bird presence detector 77 using a photocell device, which detector 77 is mounted on a column 96 standing on the main platform 34 at a preset height with respect thereto so that the detector 77 is caused to send an electrical signal to the system controller when a bird is loaded on the bird holder 25. The loading operation may be manually performed, or automatically carried out by any appropriate loading device. The displacement mechanism 63 and linear actuator 74 are conveniently pneumatically driven upon appropriate command sent by the controller to a pneumatic distributor 97 through the electrical connection unit 146, using pneumatic lines (not shown) coming from the pneumatic distributor 97, which is fed by the pneumatic supply unit 49.

Figure 1E:
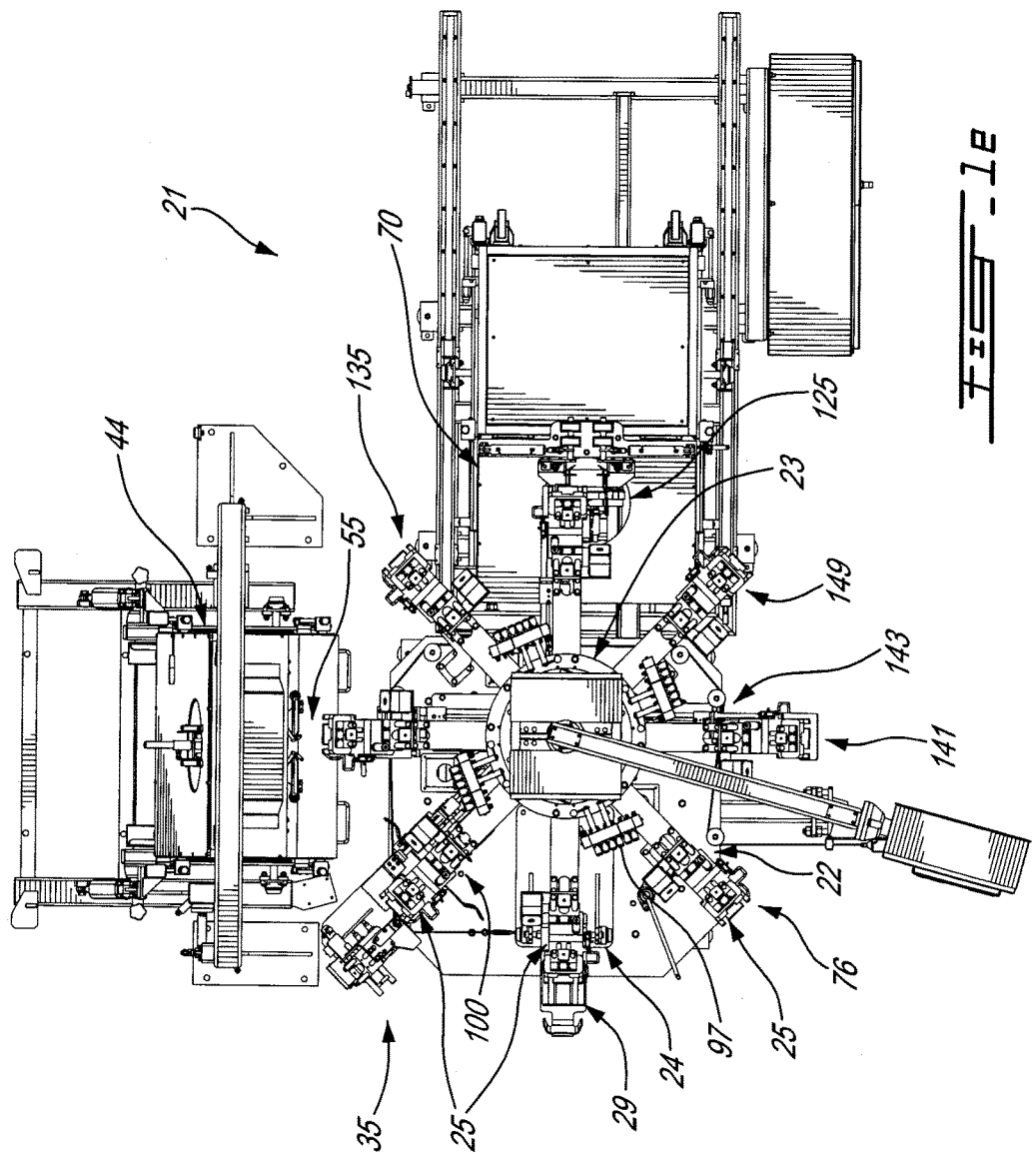
FIG. 1e is a plan view of the bird trussing system as shown in FIGS. 1a to 1d.

Turning now to FIGS. 4a, 4b and 4c, the system 21 may further include a bird's legs crossing station 35 operatively connected to the controller and located at a working position 100 upstream the first trussing station 44 as shown in FIG. 1e, which bird's legs crossing station 35 includes a device 37 for transferring one of the bird's leg ends initially secured to first leg end securing device 27 to the other leg end securing device 27', the latter being capable of securing both leg ends of the bird in a crossed legs attitude prior being transferred to the first trussing station 44 where bird's leg trussing is obtained due to appropriate position and orientation given to the bird relative to the trussing plane by the mechanical arrangement 54 shown in FIG. 5a. The bird's legs crossing station 35 according to the embodiment of FIGS. 4*a*, 4*b* and 4*c* is shown in an illustrative set-up for the purpose of the description of its components. The leg end transferring device 37 includes a mechanism 38 for pushing the leg end being transferred to disengage thereof from the leg suspending element 28 as shown in FIG. 4*c*, a mechanism 40 for displacing the leg end being transferred in alignment with the leg suspending element 28' of the other leg end securing device 27', and a mechanism 42 for pushing the leg end being transferred in engagement with the leg suspending element 28' of the leg end securing device 27'. The bird's legs crossing station 35 further includes a bird's body engaging device 36 using in the present embodiment a pair of opposed gripping members 110, 110' capable of being brought between a bird's body engaging position and a bird's body releasing position through operation of an actuator 112, which device 36 is coupled to a first driving mechanism 41 for bringing and maintaining the bird in a predetermined position within a vertical plane while the leg end being transferred is disengaged from the leg suspending element 28. The bird's legs crossing station 35 also includes a second driving mechanism 43 for moving the bird in a direction transverse to the vertical plane as indicated by arrow 115 shown in FIG. 4*c* to bring the bird in substantial alignment with the other leg end securing device 27' while the leg end being transferred is displaced in alignment with the leg suspending element 28' of the leg end securing device 27'. The leg end pushing mechanism 38 is coupled to the second driving mechanism 43 so as to be moved in the same direction transverse to the vertical plane as referred to above in view of arrow 115, while the leg end being transferred is displaced in alignment with the leg suspending element 28' of the other leg end securing device 27'.

Figure 12B:
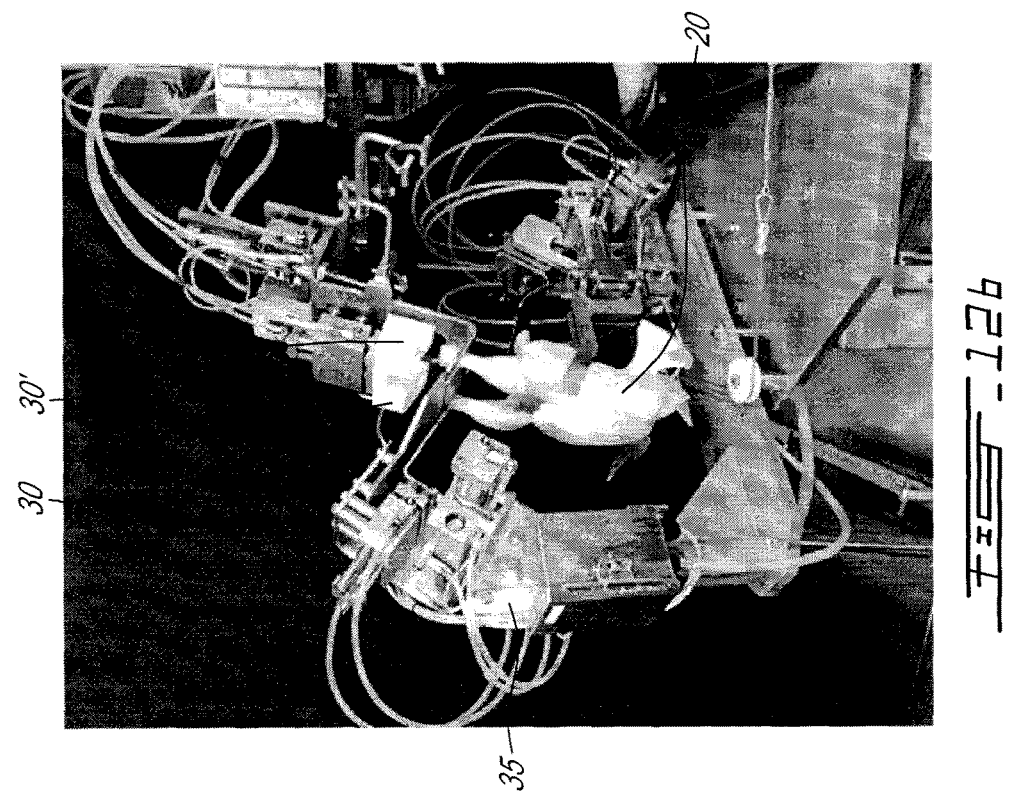
Figure 12A:
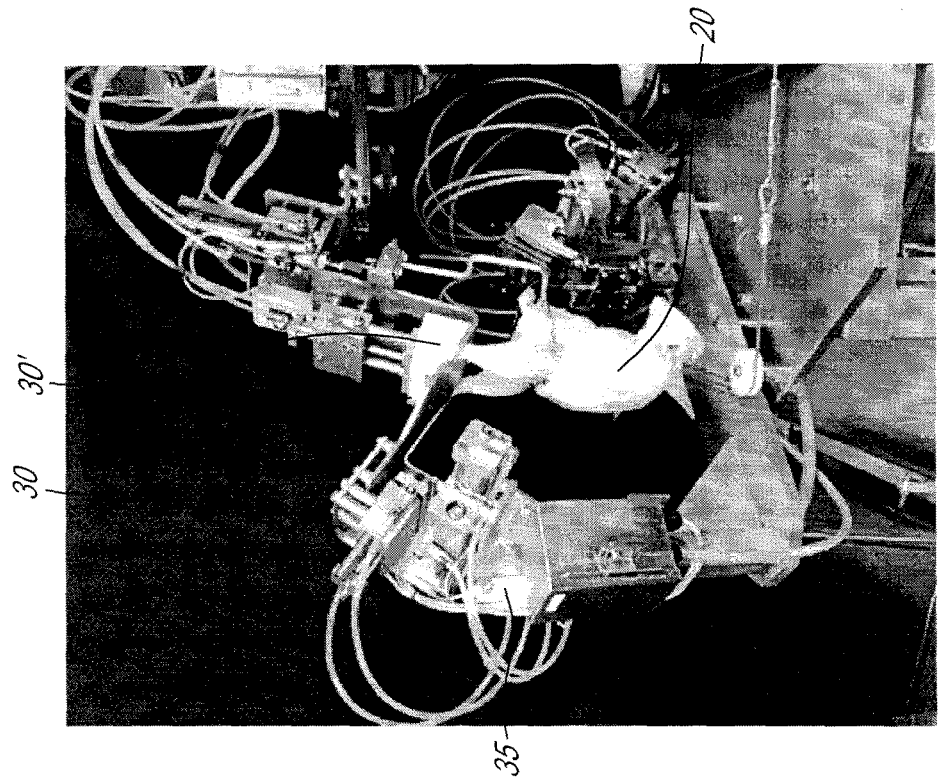
Figure 12D:
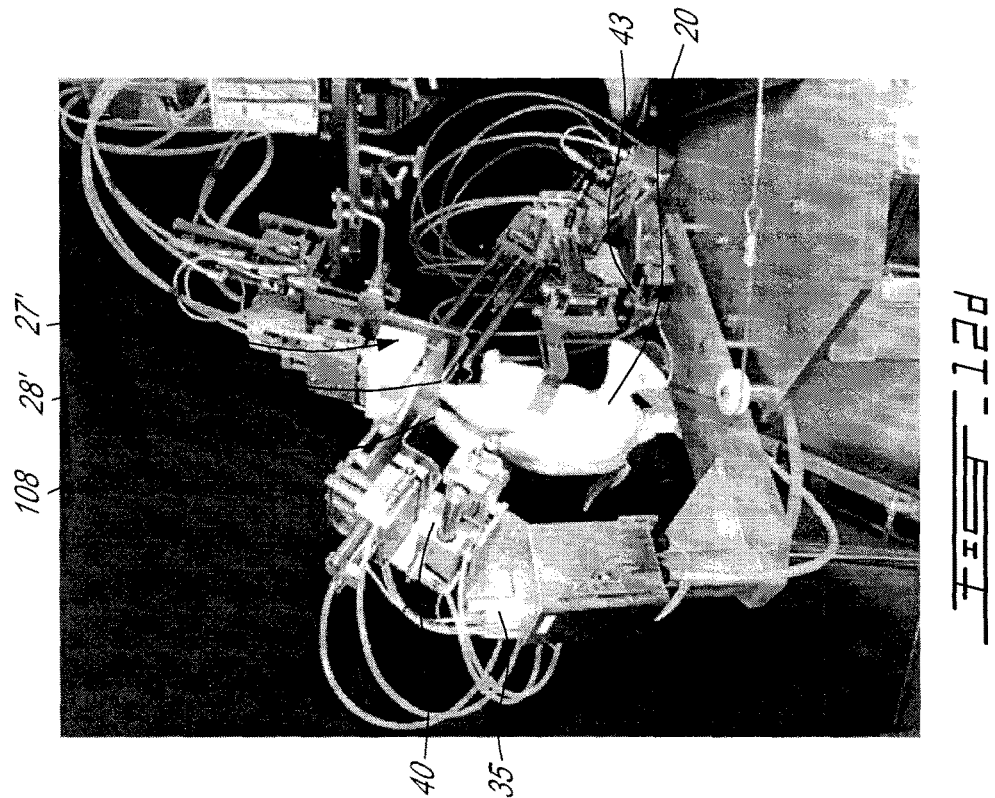
Figure 12C:
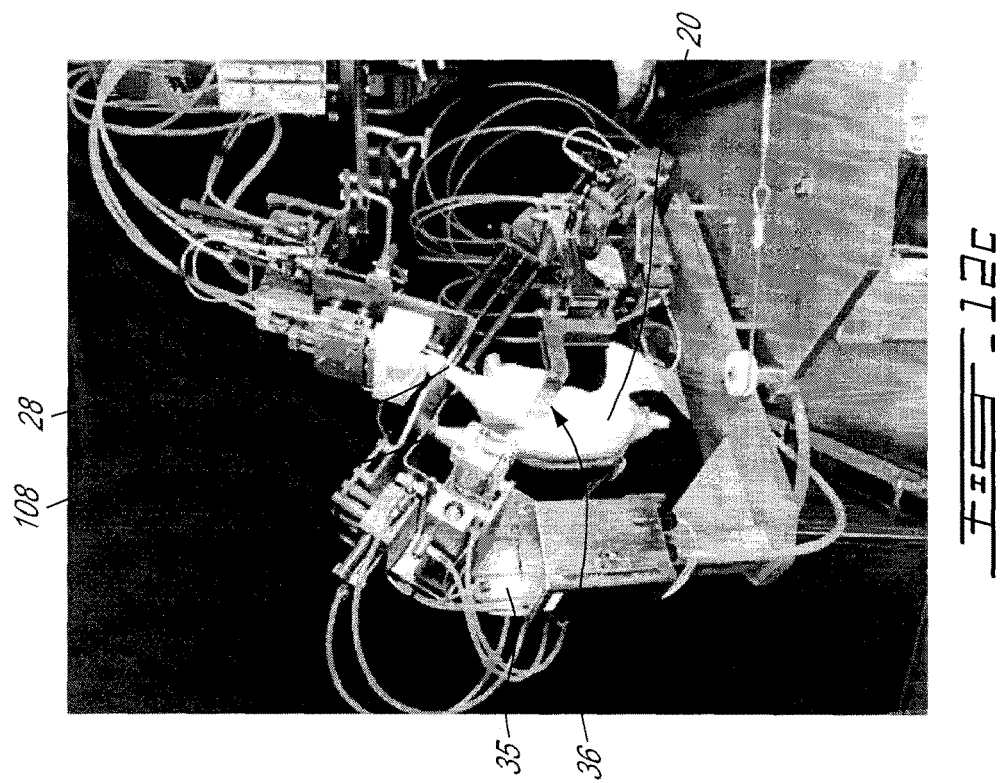
Figure 12F:
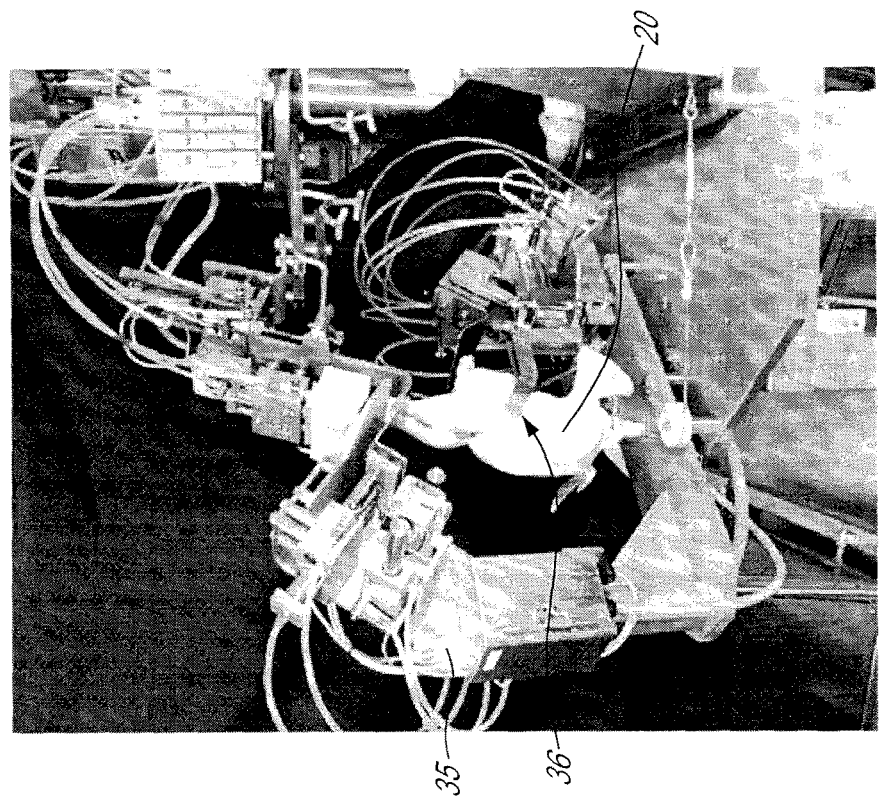
Figure 12E:
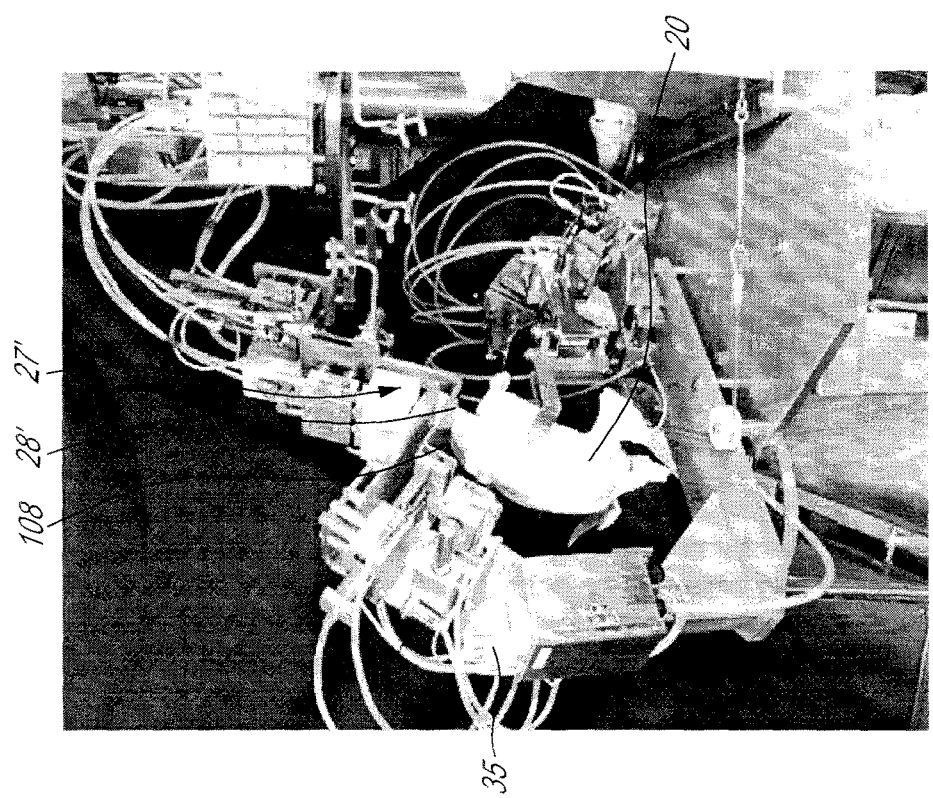
Figure 12H:
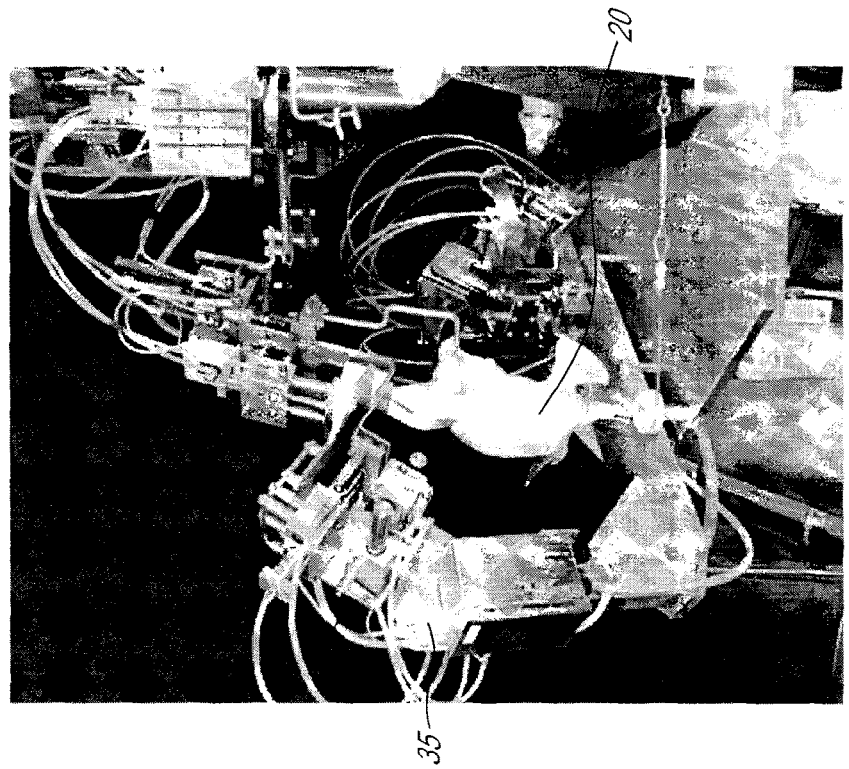
Figure 12G:
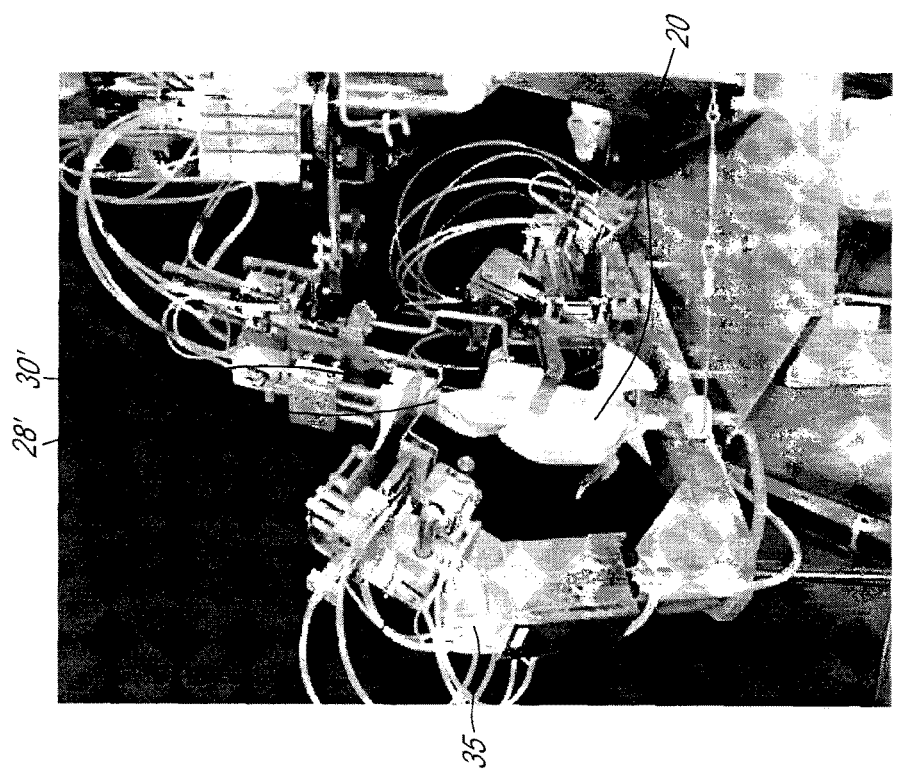

The basic mode of operation of the bird's legs crossing station 35 as described above will now be explained in view of FIGS. 12*a* to 12*i*. After the bird 20 has been transferred to the working position associated with the legs crossing station 35 as shown in FIG. 12*a*, each leg end locking element 30, 30' is moved to the leg end releasing position as shown in FIG. 12*b*, and the gripping members 110, 110' are brought to the bird's body engaging position. Then, as shown in FIG. 12*c*, the mechanism 38 as described above with reference to FIGS. 4*a* to 4*c* is operated to push the leg end 108 being transferred, to disengage thereof from the leg suspending element 28 while the bird 20 is brought and maintained in the predetermined position within the vertical plane by the bird's body engaging device 36 through operation of the first driving mechanism 41. Then, the mechanism 40 as described above with reference to FIGS. 4*a* to 4*c* is operated to displace the leg end 108 in alignment with the leg suspending element 28' of the other leg end securing device 27' as shown in FIG. 12*d*. In the presently described embodiment, the bird 20 is also moved in a direction transverse to the vertical plane upon operation of the second driving mechanism 43 as described above with reference to FIGS. 4*a* to 4*c*, to bring the bird in substantial alignment with the other leg end securing device 27' while the leg end 108 is displaced in alignment with the leg suspending element 28'. Thereafter, the mechanism 42 described above with reference to FIGS. 4*a* to 4*c* is operated to push the leg end 108 in engagement with the leg suspending element 28' of the other leg end securing device 27' as shown in FIG. 12*e*, while the pushing mechanism 38 is brought back to its retracted position. Then, after having retracted the bird's body engaging device 36 to its initial position through reverse operation of the first driving mechanism as shown in FIG. 12*f*, the leg end locking element 30' cooperating with the leg suspending element 28' is moved to the leg end locking position as shown in FIG. 12*g*, and the gripping members 110, 110' are brought back to the bird's body releasing position as shown in FIG. 12*h*. Finally, the mechanisms 40, 42 and 43 are brought back to their initial positions as shown in FIG. 12*i*.

Figure 3A:
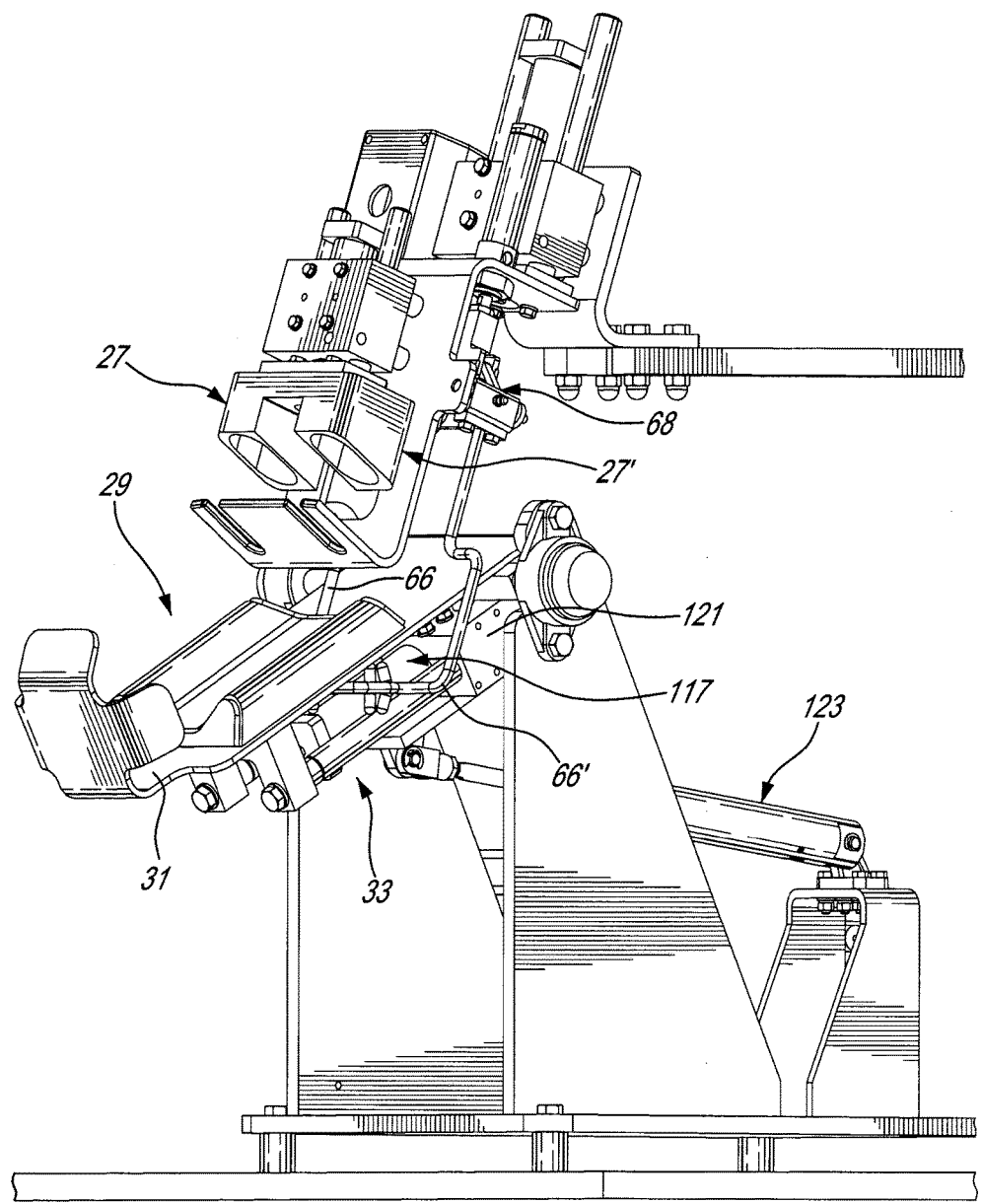
FIG. 3a is a perspective view of a bird holder disposed at a working position associated with a bird's legs flexing station provided on the system of FIGS. 1a to 1d.
Figure 86:
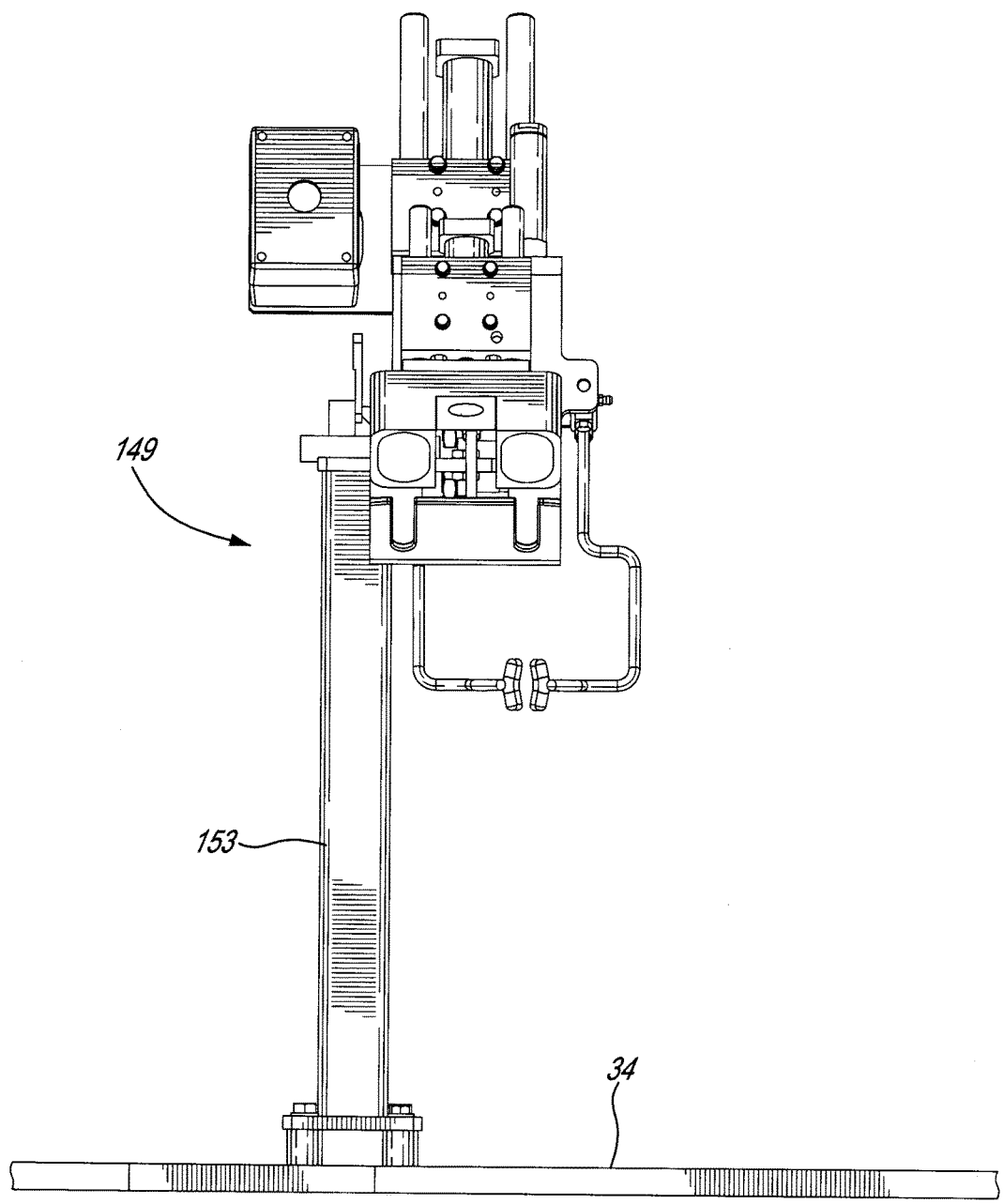

Referring now to FIGS. 3*a*, 3*b* and 3*c* in view of FIGS. 11*a* to 11*d*, the system 21 may further include a bird's legs flexing station 29 operatively connected to the controller and located at a working position 24 upstream the trussing station 44. The main purpose of the flexing station is to relax the leg articulations presenting some rigidity, generally characterizing slaughtered birds being processed in a cool environment, which rigidity could otherwise adversely affect trussing tightness. In the embodiment shown, the working position of bird's legs flexing station 29 is also upstream the legs crossing station 35, to facilitate its operation. The bird's legs flexing station 29, the embodiment of which being shown on FIGS. 3*a*, 3*b* and 3*c* in an illustrative set-up for the purpose of the description of its components, includes a bird's body engaging element 31 coupled to a driving mechanism 33 for compressing the bird against the leg end securing devices 27, 27' upon operation of the driving mechanism 33, to flex bird's legs sufficiently to provide relaxation thereof. The driving mechanism 33 includes a linear displacement mechanism 117 having a working end 119 as shown in FIG. 3*b* being coupled to the bird's body engaging element 31 and a base 121 being mounted to a pivoting mechanism 123 acting within a vertical plane.

Figure 11B:
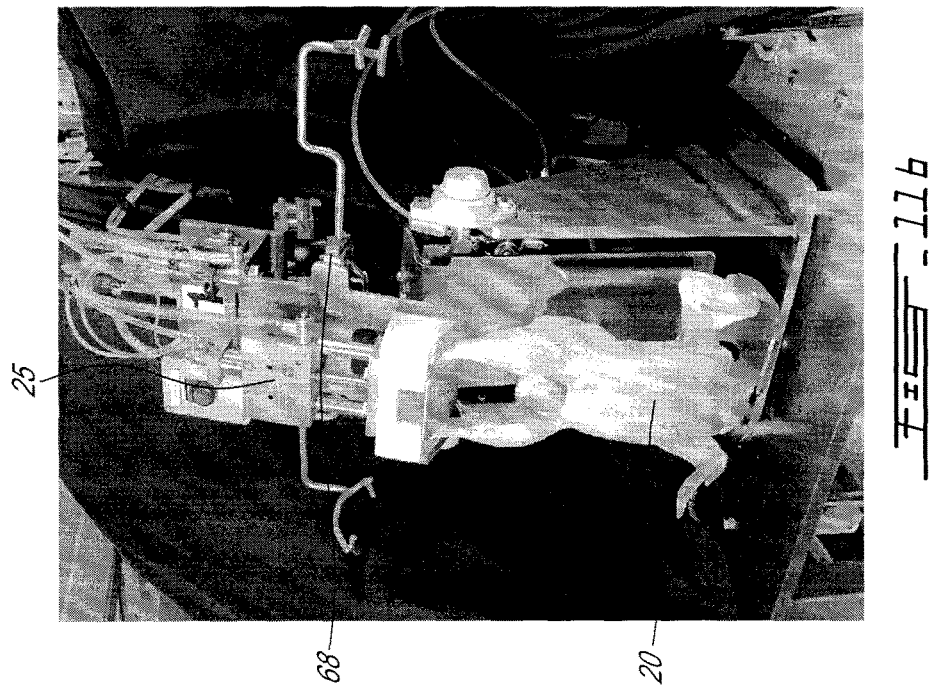
FIGS. 11a to 11d are photographic views of the bird's legs flexing station provided on the system of FIGS. 1a to 1d, showing its various steps of operation.
Figure 11A:
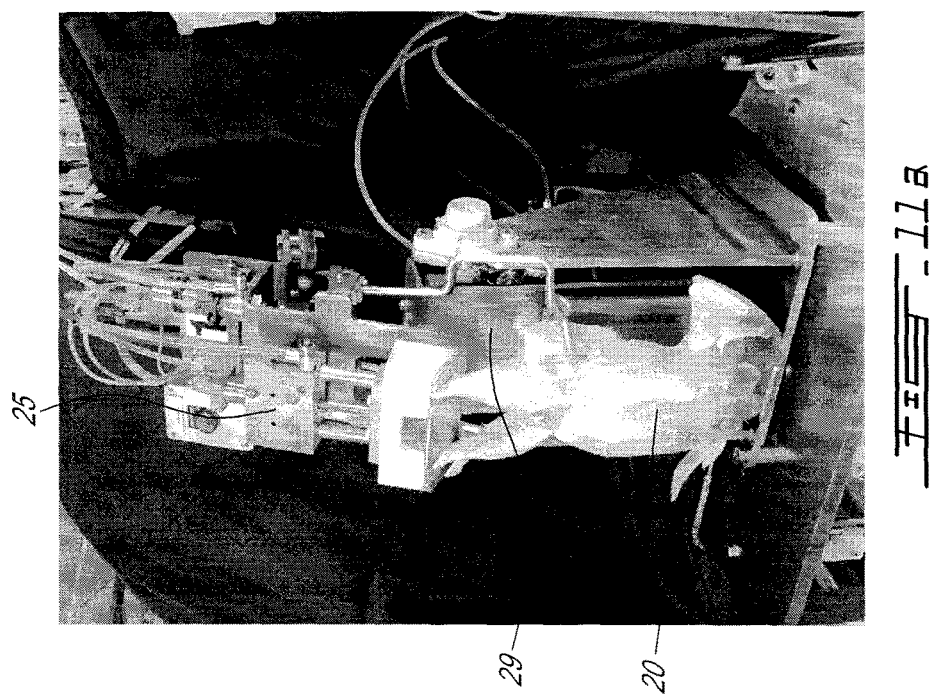
Figure 11D:
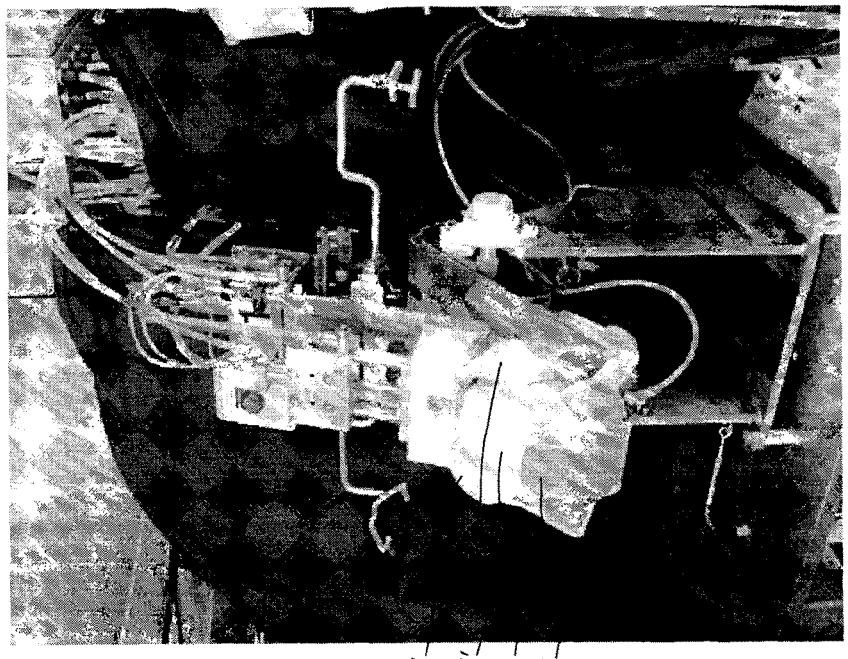
Figure 11C:
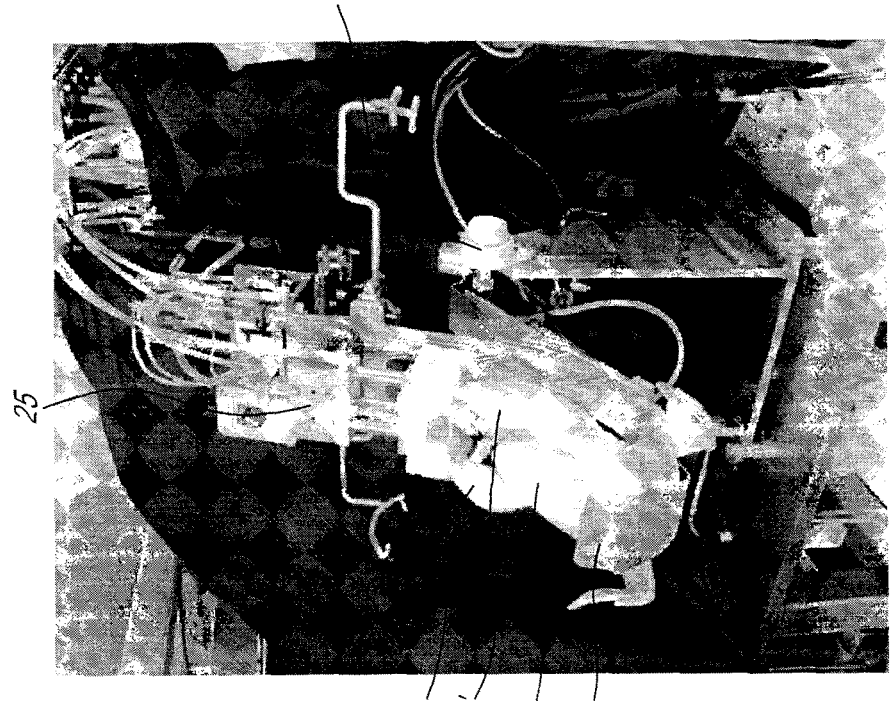

In operation, the bird 20 is transported to the working position associated with the flexing station 29 as shown in FIG. 11*a*. Then, the driving mechanism 68 is operated to bring the bird's flank engaging elements 66, 66' to the bird's flank releasing position as shown in FIG. 11*b*. Thereafter, the pivoting mechanism 123 is activated as shown in FIG. 11*c* to lift the bird's body engaging element 31 which brings the bird to a predetermined orientation with respect to the bird holder 25 so that its legs 114, 114' are in a proper position for being compressed upon operation of the linear displacement mechanism 117 as shown in FIG. 11*d*. Finally, the mechanisms 117, 123 and 68 are operated back to their respective initial positions as shown in FIG. 11*a*, and the bird having its legs being flexed is ready to be transferred to the next station, which is the legs crossing station 35 in the presently described embodiment.

Turning now to FIGS. 7*a*, 7*b* and 7*c*, for the purpose of further trussing the bird according to a second, complementary trussing pattern, the system 21 includes a second bird trussing station 70 operatively connected to the controller and located at a corresponding working position 125 better shown in FIGS. 1*d* and 7*a*, and including a second trussing module 72 defining a working zone 131 associated with a second trussing plane passing therethrough, which plane being represented by x' and y' axis at z'=0 in FIG. 7*a*. The second bird trussing station 70 according to the embodiment of FIGS. 7*a*, 7*b* and 7*c* is shown in an illustrative set-up for the purpose of the description of its components. The second trussing module 72 is conveniently similar to the first trussing module 45 as described above, making use of a cord as the trussing element, and provided with a cord dispensing device (not shown) moving circularly about axis z' around the working zone 131 and adjacent an annular recess 129 represented with dotted lines in FIGS. 7*a* and 7*b*, in such a manner to that the cord passes around the bird portion to be trussed. As in the case of the first trussing module 45 described above, the second trussing module 72 is also provided with cord tying and cutting devices (not shown) which are operable according to the second trussing pattern. The second trussing station 70 also includes a mechanical arrangement 78 for bringing the bird within the working zone 131 in predetermined position and orientation relative to the second trussing plane to allow for operation of the second trussing module 72 according to the trussing pattern by which the trussing element passes transversely around the bird's wing chest and bird's back to catch and maintain the bird's wings against the bird's flanks. The mechanical arrangement 78 includes a bird receiving element 79 disposed within the working zone 131 for maintaining the bird in the predetermined position and orientation relative to the trussing plane, and a bird's leg engaging element 80 as a means for engaging the bird's body coupled to a driving mechanism 82 for orienting the bird's body toward the further working zone. The driving mechanism 82 includes a linear displacement mechanism 84 having a working end 86 being coupled to the bird's leg engaging element 80 and a base 88 being mounted to a pivoting mechanism 90 acting within the vertical plane while the bird is moved toward the working zone 131. Conveniently, the linear displacement mechanism 62 mounted on the conveyer 23 for each bird holder 25 is also part of the mechanical arrangement 78, as described above in view of FIG. 5b, for moving the bird within a vertical plane toward the working zone 131. The mechanical arrangement 78 further includes a pair of opposed bird's wing elbow engaging elements 85, 85' coupled to a pair of first driving mechanism 87, 87', for maintaining the bird's wing elbow against the bird's flank. For so doing, the driving mechanisms 87, 87' are pivotally operable to move the bird's wing elbow engaging elements 85, 85' between a bird's wing elbow maintaining position and a bird's wing elbow releasing position. Optionally, each driving mechanism 87, 87' may be provided with a position sensor (not shown) for indicating to the controller whether each of them has been actually brought to their bird's wing elbow releasing position after the trussing operation, before the conveyer is caused to transport the trussed bird out of trussing station 70. The controller is programmed to cancel conveyer indexing and send an alarm signal to the operator control panel whenever a position sensor signal has not been received in due time by the controller after the trussing operation. The mechanical arrangement 78 also includes a pair of bird's wing wrist engaging elements 92, 92' coupled to a pair of second driving mechanisms 93, 93' for pushing the bird's wing wrists toward the working zone 131. In the embodiment shown, each second mechanism 93, 93' is a linear displacement mechanism having a working end 133 coupled to a respective one of the bird's wing wrist engaging element 92, 92' and a base 95, 95' mounted to a respective one of first driving mechanisms 87, 87'. The second driving mechanisms 93, 93' are operable when the operating status of first driving mechanisms 87, 87' corresponds to the bird's wing elbow maintaining position, and each driving mechanism 93, 93' is operable from the bird's wing wrist engaging position to the bird's wing wrist releasing position as the bird is finally brought within the working zone 131 in the predetermined position and orientation relative to the trussing plane prior to the operation of the second trussing module 72. The mechanical arrangement 78 also includes a bird's shoulder engaging element 81 coupled to a driving mechanism 83 for stabilizing the bird's body in a direction substantially perpendicular to the bird's chest, and a pair of opposed bird's wing forearm engaging elements 89, 89' coupled to a driving mechanism 91 for maintaining the bird's wing forearms against the bird's flanks. The mechanical arrangement 78 further includes a pair of bird's wing tips engaging elements 98, 98' coupled to a driving mechanism 94 for urging the bird's wing tips toward the bird's back. Conveniently, the tips engaging elements 98, 98' are coupled to the driving mechanism 94 trough the bird receiving element 79.

Figure 14A:
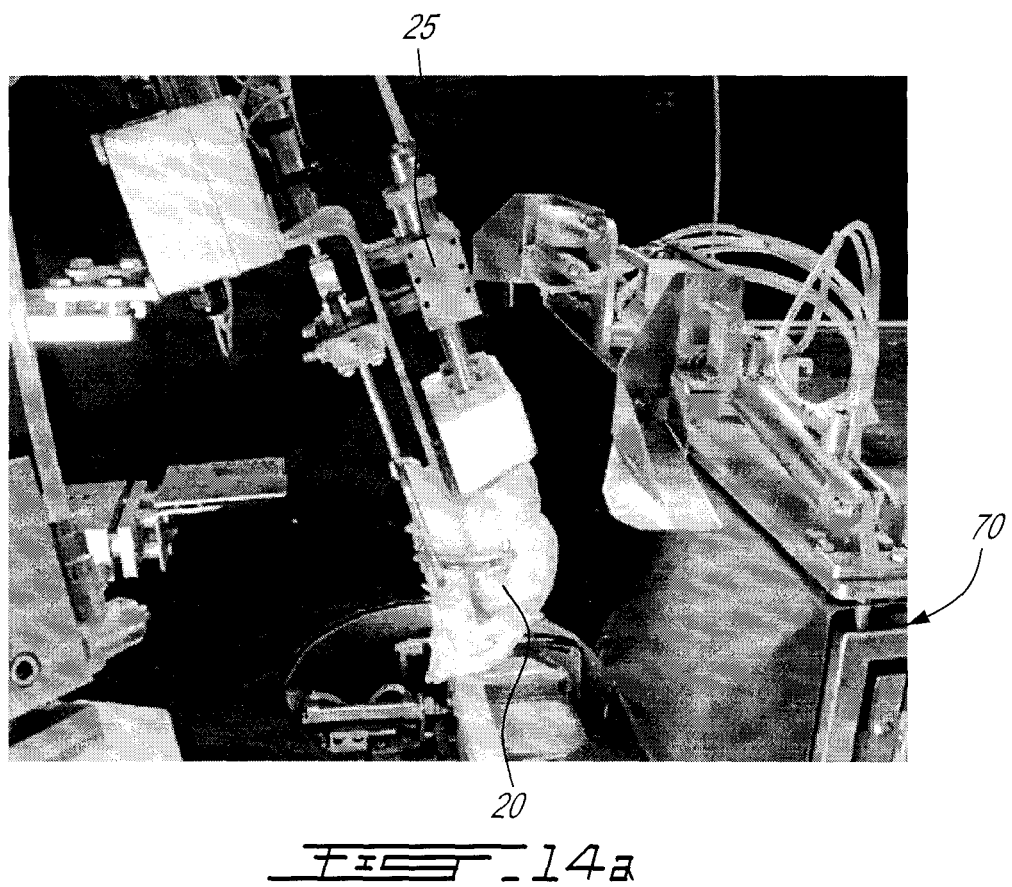
FIGS. 14a to 14r are photographic views of the second bird trussing station of FIG. 7a, showing its various steps of operation.
Figure 14E:
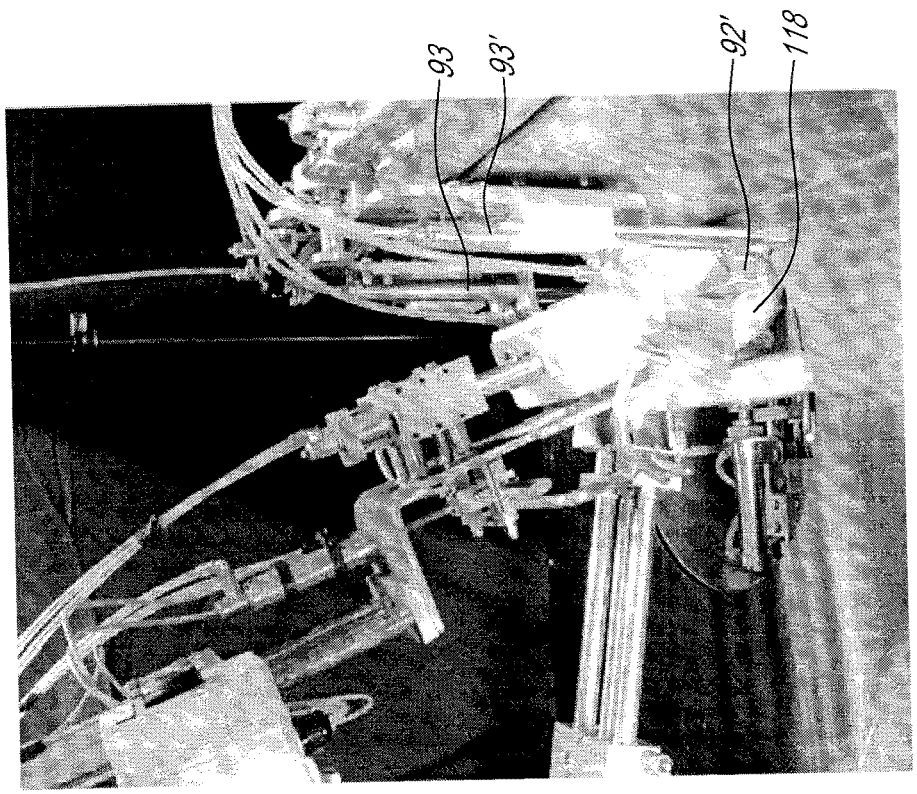
Figure 14D:
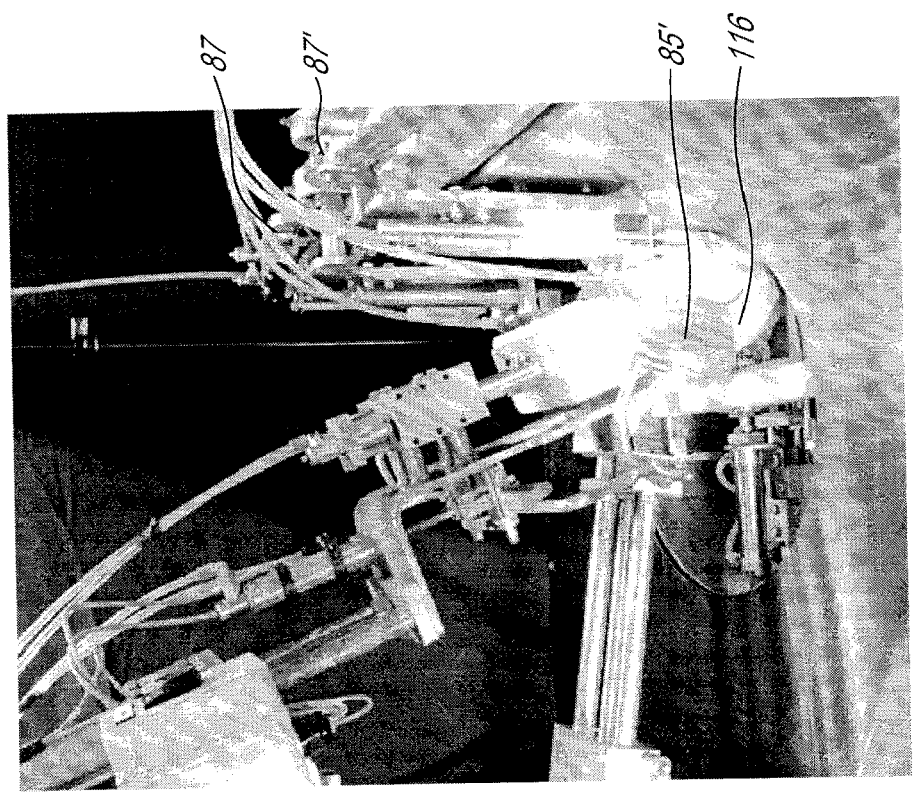
Figure 14F:
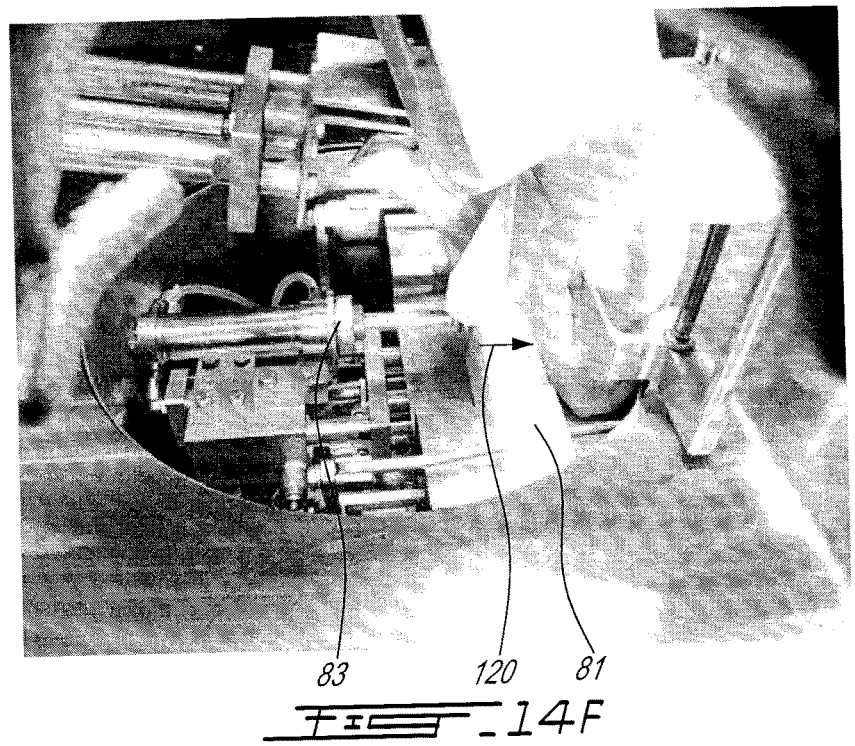
Figure 14G:
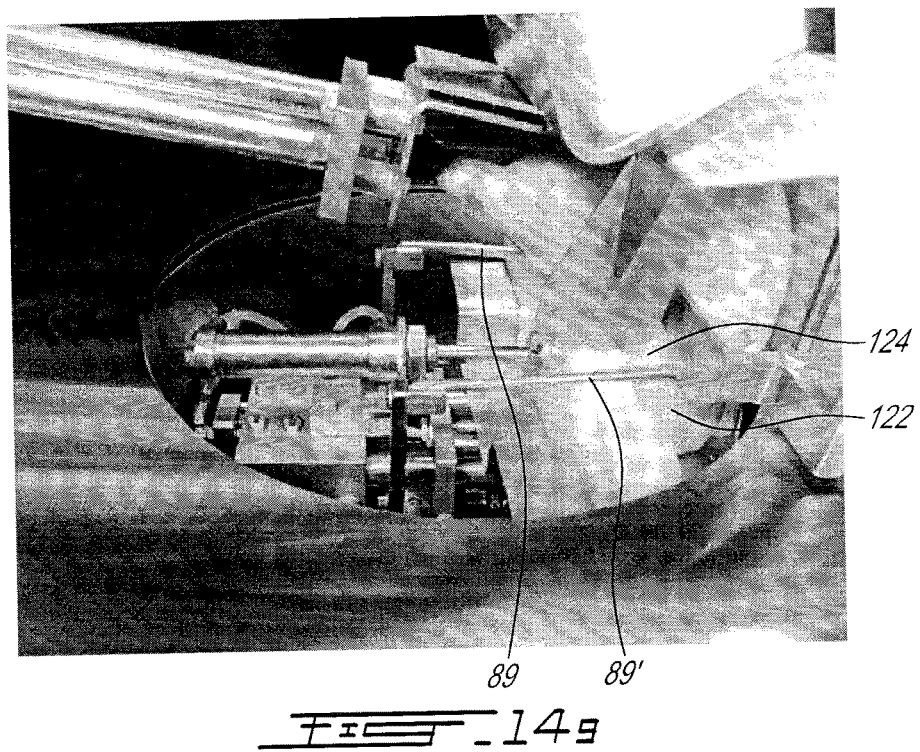
Figure 14H:
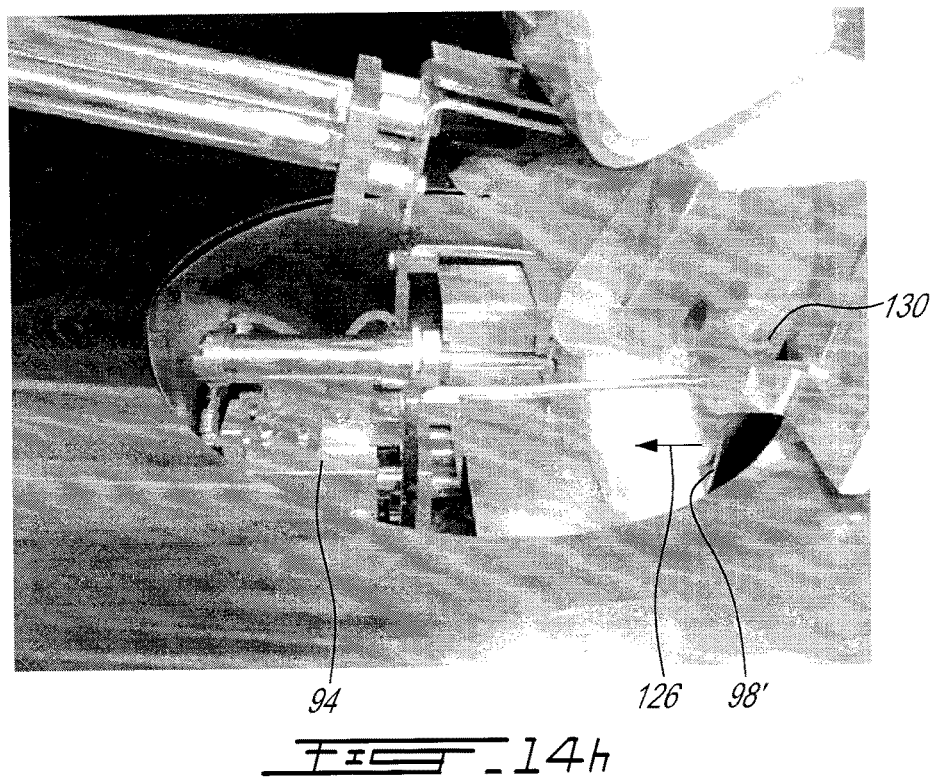
Figure 14J:
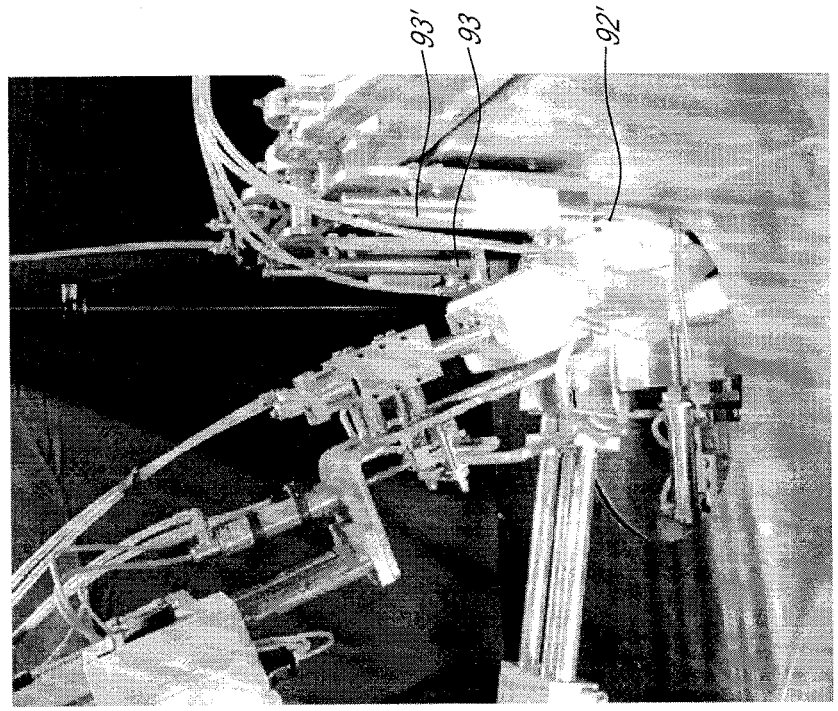
Figure 14I:
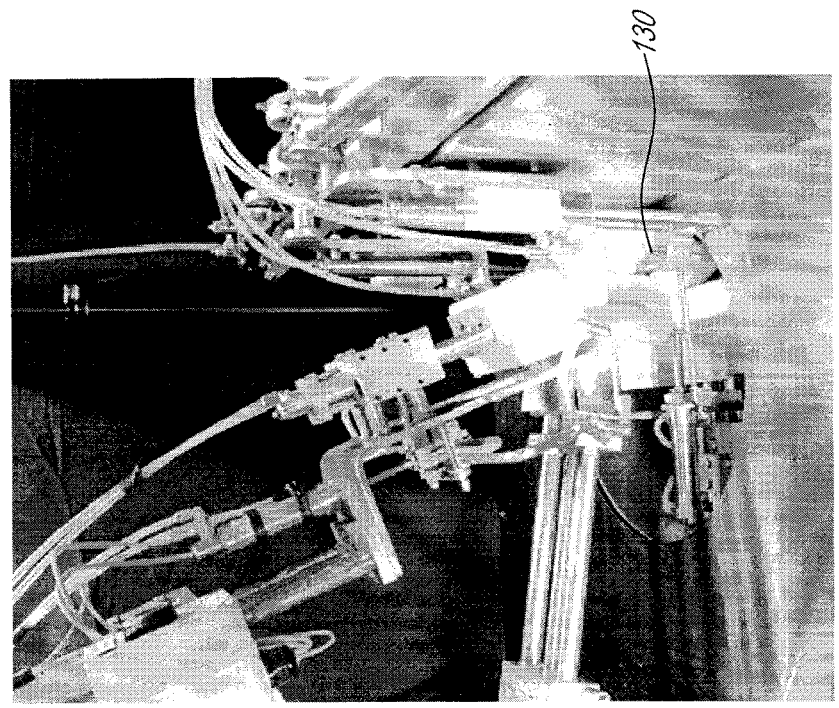
Figure 14I:
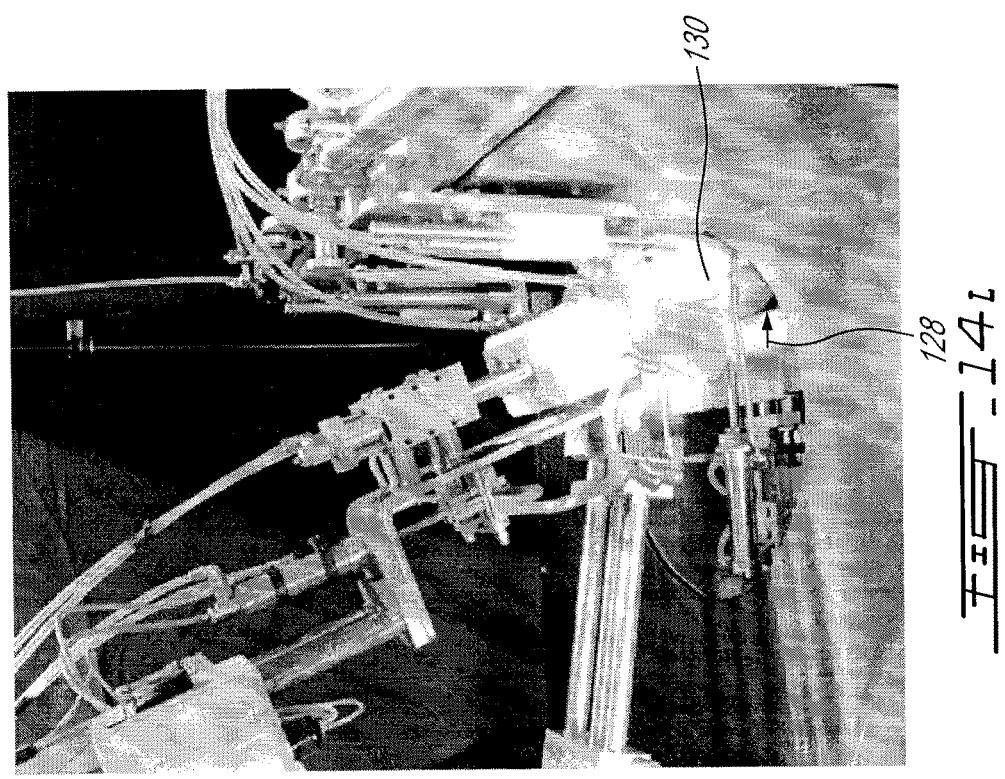
Figure 14K:
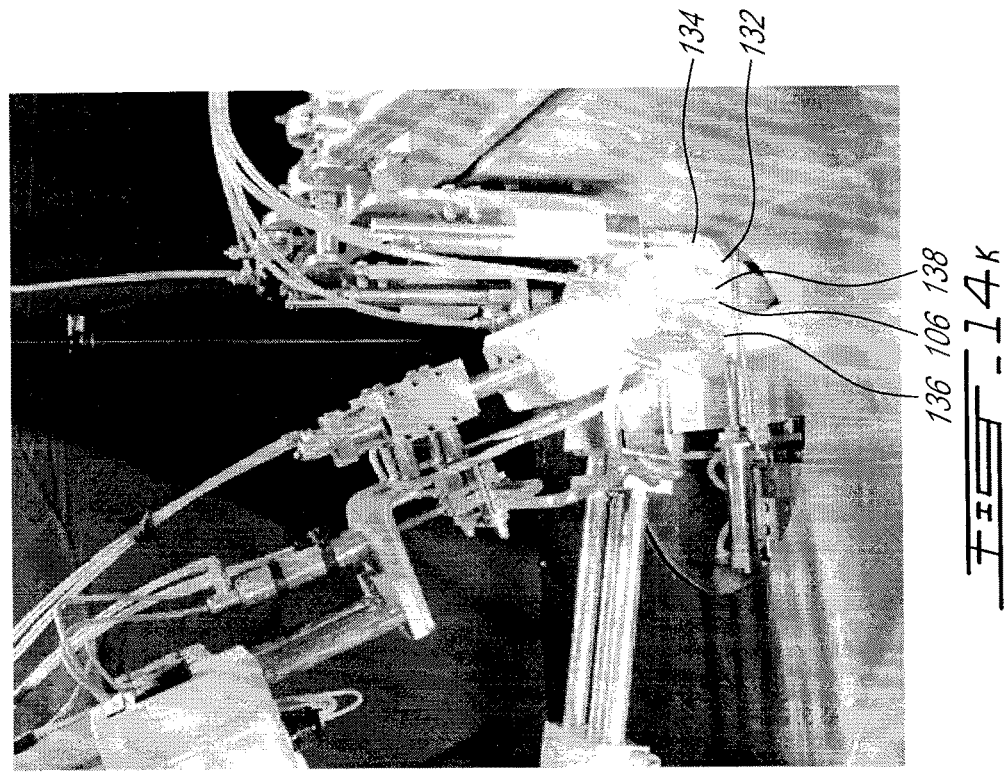
Figure 14N:
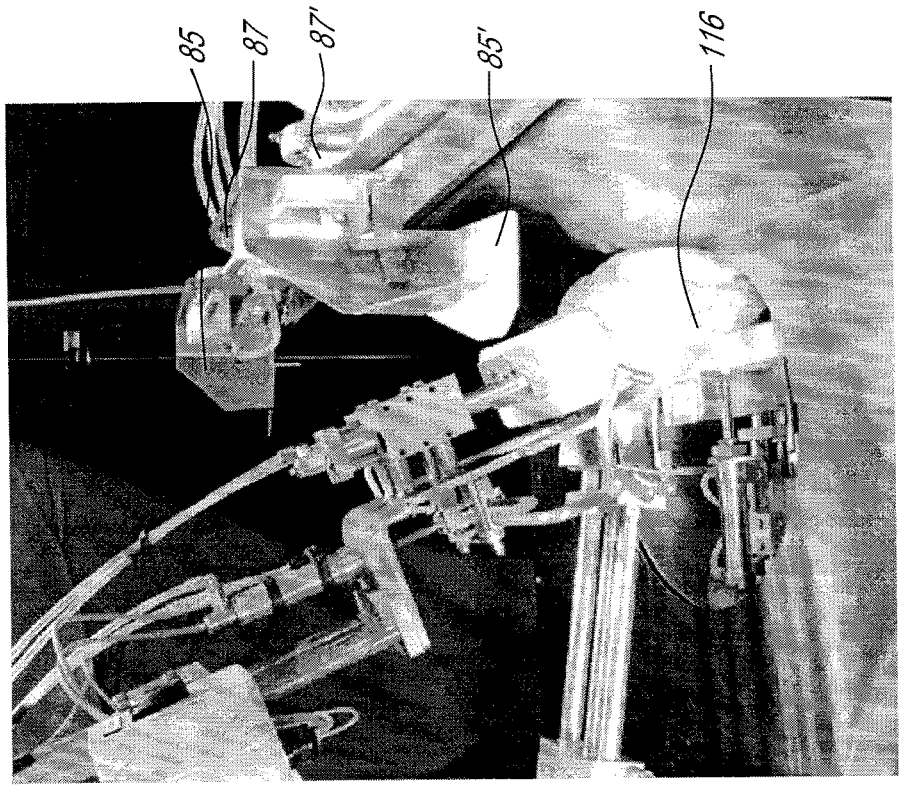
Figure 14M:
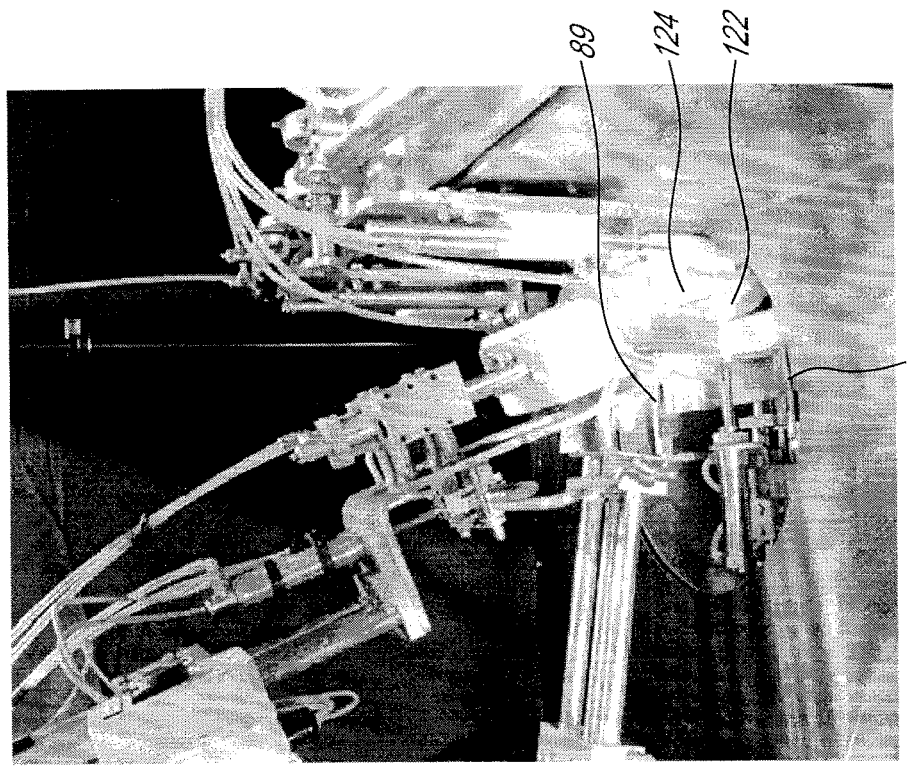
Figure 14P:
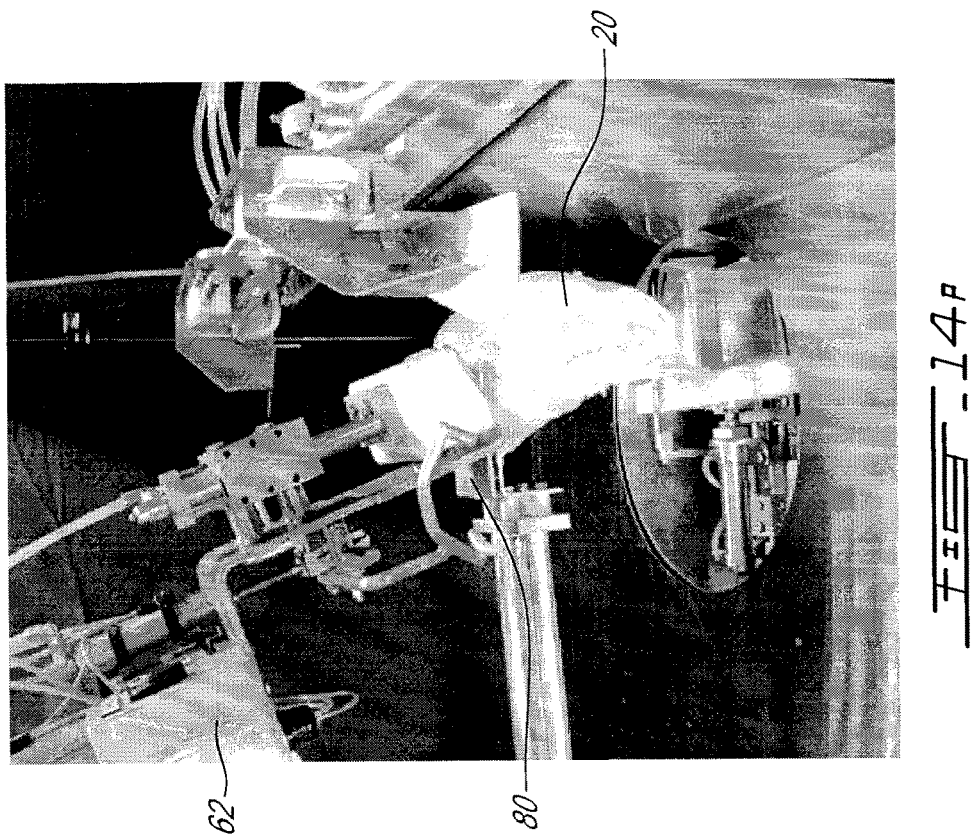
Figure 14Q:
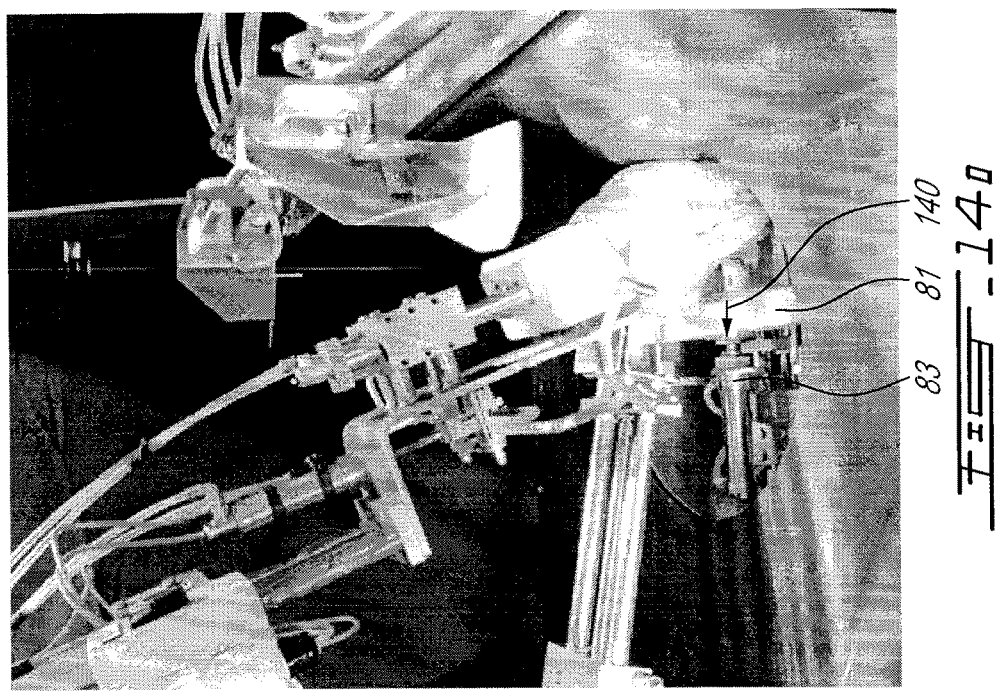
Figure 14R:
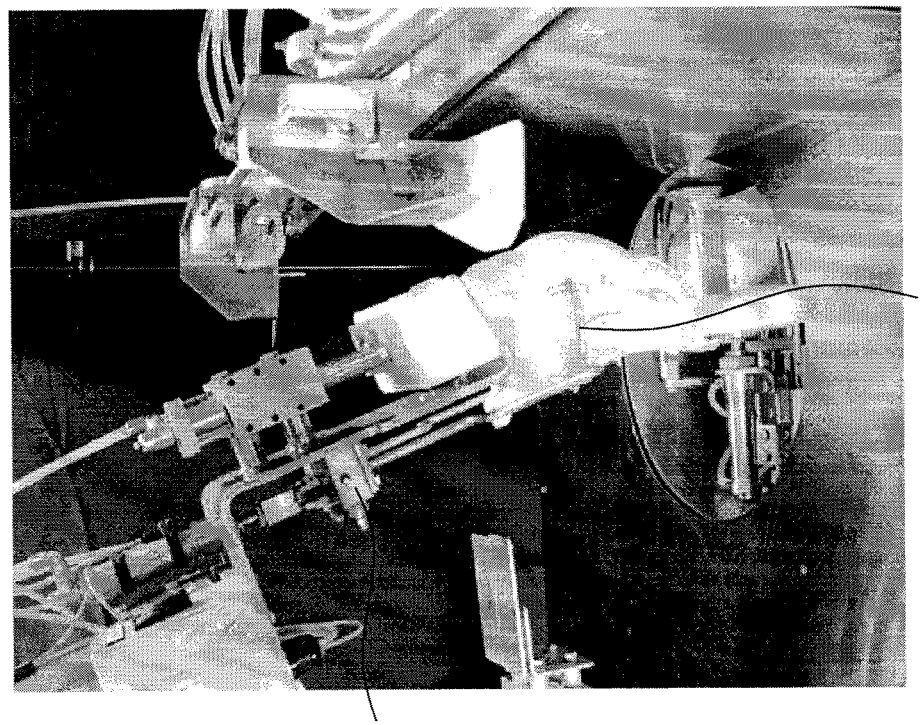
Figure 14Q:
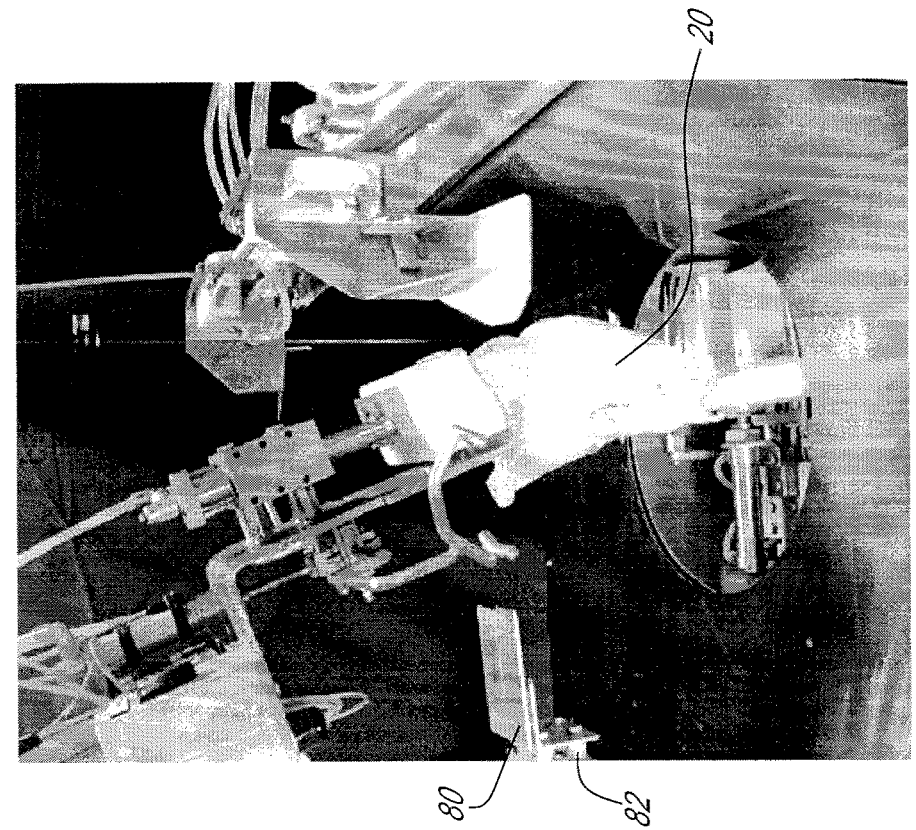

The basic mode of operation of the trussing station as described above will now be explained in view of FIGS. 14a to 14r. First, the bird 20 is transported to the working position associated with the trussing station 70 using the bird holder 25 as shown in FIG. 14a. Then, the bird is brought within the working zone defined by the trussing module 72 in predetermined position and orientation relative to the second trussing plane associated with the working zone, in a manner that will now be explained in view of FIGS. 14b to 14j. As shown in FIG. 14b, the driving mechanism 68 is operated to bring the bird's flank engaging elements 66, 66' to the bird's flank releasing position, and the driving mechanism 82 is operated to push forward the bird's leg engaging element 80, to orient the bird's body toward the working zone of the trussing module 72, above the bird receiving element 79. To increase processing rate, It can be appreciated that the operation of driving mechanisms 68 and 82 may be programmed on the controller to begin during the last phase of the indexing movement of the carousel, provided the engagement of element 80 with the bird 20 occurs when the latter reaches the working position associated with trussing station 70. Then, as shown in FIG. 14c, the linear displacement mechanism 62 mechanically coupled to the bird holder 25 is operated for moving the bird 20 within the vertical plane toward the working zone, while the pivoting mechanism 90, as described above in view of FIG. 7a and to which is mounted the driving mechanism 82, allows the leg engaging element 80 to follow the bird movement toward the working zone. Thereafter, as shown in FIG. 14d, the driving mechanisms 87, 87' are operated to bring the bird's wing elbow engaging elements 85, 85' to their respective positions for maintaining the bird's wing elbows 116. Then, as shown in FIG. 14e, the second driving mechanisms 93, 93' are operated for moving the bird's wing wrist engaging elements 92, 92' to push the bird's wings 118 toward the working zone. Thereafter, as shown in FIG. 14f, the driving mechanism 83 is operated for moving the bird's shoulder engaging element 81 in a direction substantially perpendicular to the bird's chest as indicated by arrow 120, for stabilizing the bird's body in that direction. Then, the driving mechanism 91 as described above in view of FIG. 7a is operated for moving inwardly the opposed bird's wing forearm engaging elements 89, 89' for maintaining the bird's wing forearms 122 against the bird's flanks 124, as shown in FIG. 14g. Then, as shown in FIG. 14h, the driving mechanism 94 is operated for moving the bird's wing tips engaging elements 98, 98' to urge the bird's wing tips 130 toward the bird's back as indicated by arrow 126, as also shown in FIG. 14i according to a different viewing angle. Thereafter, as shown in FIG. 14j, the driving mechanism 93, 93' are operated to bring the elements 92, 92' to their respective bird's wing wrist releasing position, since the bird is finally brought within the working zone 131 in the predetermined position and orientation relative to the trussing plane. Then, as shown in FIG. 14k, the trussing module 72 is operated according to the second trussing pattern by which the cord 132 passes transversely around the bird's chest 134 and bird's back 136 to catch and maintain the bird's wings 138 against the bird's flanks 106. Once the bird has been trussed, the various moving elements included in the second trussing station 70 are operated in an inverted way to ultimately release the trussed bird. The driving mechanism 94 is operated backward for moving the bird's wing tips engaging elements 98, 98' in a direction indicated by arrow 128 to release the bird's wing tips 130 as shown in FIG. 14*l*. The driving mechanism 91 as described above in view of FIG. 7*a* is operated for moving the opposed bird's wing forearm engaging elements 89, 89' outwardly for releasing the bird's wing forearms 122 from the bird's flanks 124 as shown in FIG. 14*m*. The driving mechanisms 87, 87' are operated backward to bring the bird's wing elbow engaging elements 85, 85' to their respective positions for releasing the bird's wing elbows 116 shown in FIG. 14*n*. The driving mechanism 83 is operated backward for moving the bird's shoulder engaging element 81 in a direction as indicated by arrow 140, for releasing the bird's body in that direction as shown in FIG. 14*o*. The linear displacement mechanism 62 is operated backward for moving the bird 20 within the vertical plane away from the working zone, while the pivoting mechanism 90, as described above in view of FIG. 7*a*, allows the leg engaging element 80 to follow the bird movement away from the working zone as shown in FIG. 14*p*. The driving mechanism 82 is operated backward for pulling the bird's leg engaging element 80, to release the bird's body accordingly, as shown in FIG. 14*q*. Finally, the driving mechanism 68 is operated to bring the bird's flank engaging elements 66, 66' to the bird's flank engaging position as shown in FIG. 14*r*.

Referring now to FIGS. 6*a*, 6*b* and 6*c* in view of FIG. 1*e*, the system 21 may be provided with a first intermediary station 135 located between the first and second bird trussing stations 44 and 70, to provide a resting position for the bird from which it can be brought in a proper attitude to be received at second trussing station 70. For so doing, the system controller is programmed to operate the driving mechanism 68 provided on each bird holder 25 so that bird's flank engaging elements 66,66' are successively brought to the bird's flank engaging position following the operation of the trussing module 45 to stabilize the bird during transport thereof out of the working position 55 using bird's flank engaging elements 66, 66', then to the bird's flank releasing position when the conveyer 23 is caused to stop the holder 25 at a bird resting position, and then back to the bird's flank engaging position to stabilize the bird during transport thereof to the working position 125 of trussing station 70 in a proper attitude for being brought by the mechanical arrangement 78 within the working zone 131 in predetermined position and orientation relative to the trussing plane of station 70. The intermediary station 135 includes a bird presence detector 137 using a photocell device, which detector 137 is mounted on a column 139 standing on the main platform 34 and at a preset height with respect thereto so that the detector 77 is caused to send electrical signal to the system controller when the bird is brought in the proper attitude. Otherwise, the controller is programmed to skip the second trussing operation by transporting an improperly postured bird past the second trussing station 70 brought in an inoperative mode.

Referring to FIGS. 9*a*, 9*b* and 9*c* in view of FIG. 1*e*, the system 21 also includes a trussed bird discharging station 141 operatively connected to the controller and located at a last working position 143, which discharging station 141 includes a bird's leg engaging element 145 coupled to a driving mechanism 147 mounted on main platform 34 for pushing a column 148 standing on the main platform 34, for pushing the trussed bird out of the bird holder 25. The bird discharging station 141 also includes a bird presence detector 150 using a photocell device, which detector 150 is mounted on column 96 using flange 152 at a preset height with respect thereto so that the detector 77 is caused to send an electrical signal to the system controller when a bird is unloaded from the bird holder 25.

Figure 15B:
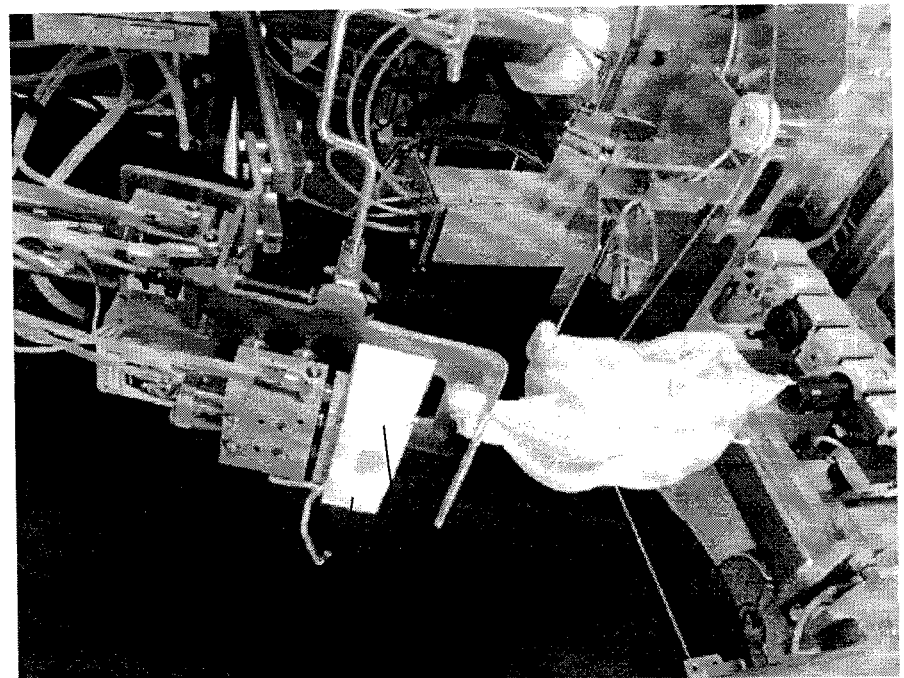
Figure 15A:
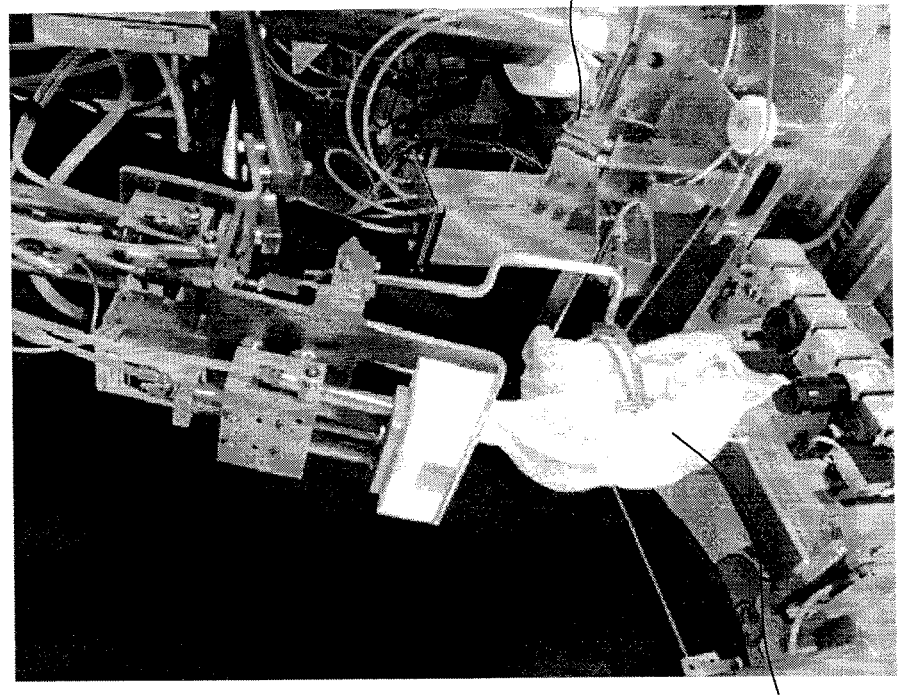

In operation, the bird 20 is brought by the conveyer to the working position associated with the discharging station 141 as shown in FIG. 15*a*. Then, each leg end locking element 30, 30' is moved to the leg end releasing position as shown in FIG. 15*b*. Finally, the driving mechanism 147 is operated for causing the bird's leg engaging element 145 to push the trussed bird 20 out of the bird holder 25.

Figure 8C:
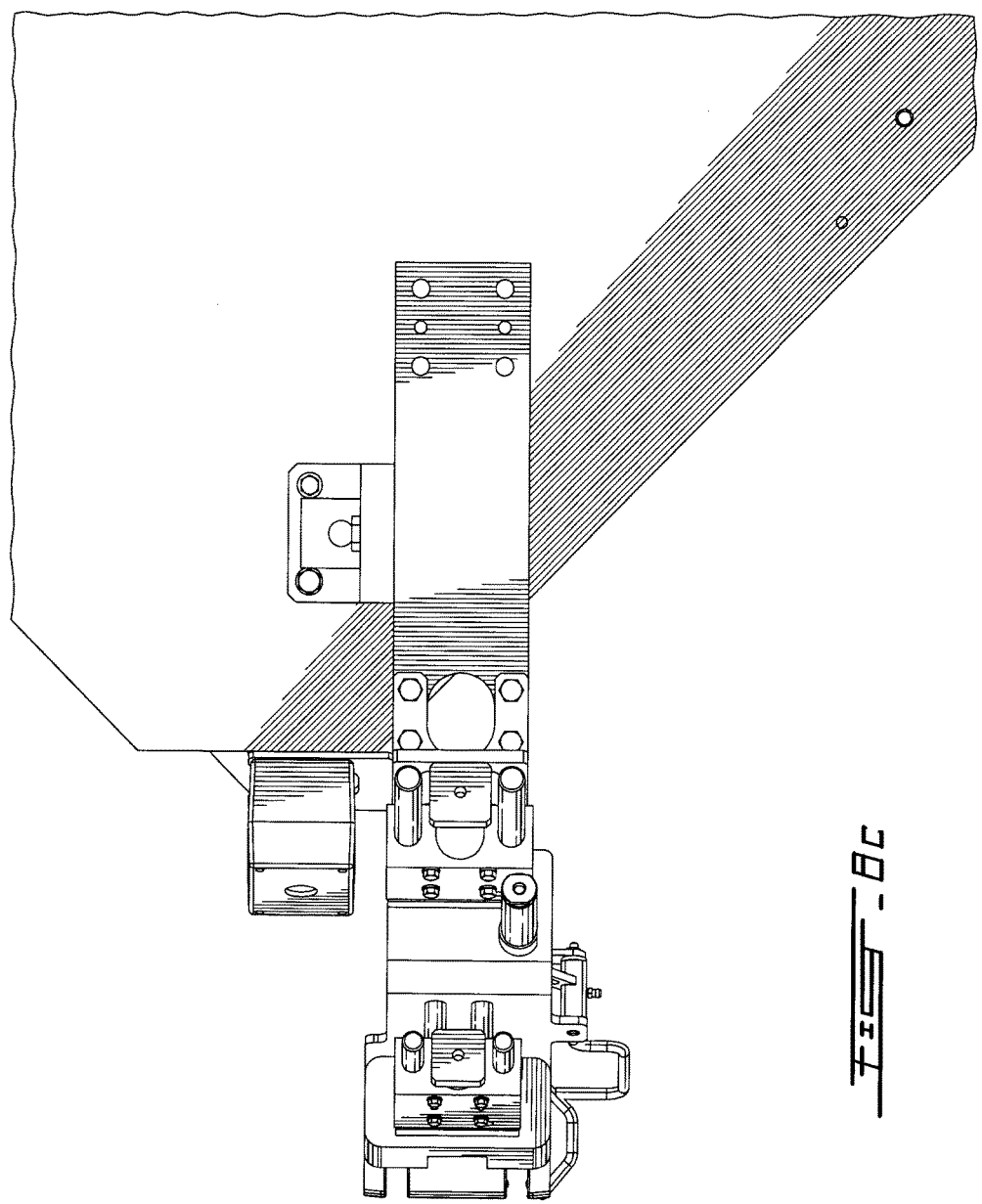

Referring to FIGS. 8*a*, 8*b* and 8*c* in view of FIG. 1*e*, the system 21 may also include a second intermediary station 149 located between the second bird trussing station 70 and the discharging station 141, to provide a reference position for the purpose of indexing the conveyer 23 with respect to the working positions 22, 24, 100, 55, 125 and 143 respectively associated with stations 76, 29, 35, 44, 70 and 141, with respect to main platform 34. For so doing, the second intermediary station 149 includes a presence detector 151 using a photocell device, which detector 151 is mounted on a column 153 standing on the main platform 34 and has its sensing field oriented toward the moving plane of each carrying plate 113, so that detector 151 is caused to send an electrical signal to the system controller when the carrying plate 113 is passing within its sensing field, which signal is used by the controller to perform indexing accordingly.

Referring to FIG. 16, an alternate design for the bird holder 25 will now be described with respect to the bird's legs flexing station 29 provided on the system. According to that alternate design, the leg suspending element 28, 28' provided on the bird's leg end securing devices 27, 27' are separated by a generally U-shaped cutoff 156 adapted to receive the upper portion of the bird's chest while the bird 20 is subjected to compression upon operation of the bird's leg flexing station 29, in the position shown in FIG. 11*d*, so that a higher level of leg flexion can be obtained. As also shown on FIG. 16, the inner edges 157, 157' of the leg suspending elements 28, 28' have been beveled, and the front portion of the leg end locking element 30, 30' have been provided with generally circular recesses 159, 159' to minimize the risk of leg fracture due to shearing while the bird is being flexed and then trussed.

Turning now to FIG. 17*a*, an alternate embodiment of first bird trussing station 44' that may be used by the system will now be described in view of FIGS. 17*b* and 17*c*, in accordance with an illustrative set-up for the purpose of describing its components. As can be appreciated through comparison with the embodiment described above in reference to FIG. 5*a*, the embodiment of FIG. 17*a* is illustrated according to a different viewing angle in order to better show of a modified mechanical arrangement 54' which characterizes that alternate first bird trussing station 44'. The purpose of the mechanical arrangement is still to bring the bird within the working zone 57 in predetermined position and orientation relative to the trussing plane to allow for operation of the trussing module 45 according to the first trussing pattern by which the cord catches and maintains the bird in the desired trussed condition. However, a different path for the first trussing pattern with respect to the bird's legs can be obtained, according to which the fastening element is passing near the ends of the crossed bird's legs in order to more tightly held thereof together. As shown in FIG. 17*a*, the modified mechanical arrangement 54' is provided with driving mechanism 99 for orienting the bird's body, which includes main linear displacement actuator 101' having a working end 103'. However, rather than being directly coupled to working end 193 as in the first embodiment, the bird's leg engaging element 56' is displaceably coupled to the working end 103 of the main linear displacement actuator 101' using a first linear displacement actuator 162 having its base 159 being secured to the working end 103 using an ear provided on a mounting plate 160, and having its own working end 167 attached to bird's leg engaging element 56'. Such configuration provides selective displacement of the bird's leg engaging element 56' relative to the driving mechanism 99 between a bird's leg engaging position for orienting the bird's body toward the working zone and a retracted position allowing the operation of the trussing module 45 according to the trussing pattern, as will be explained below in more detail. The modified mechanical arrangement 54' further includes a bird's back engaging element 165 coupled to the driving mechanism 99 for further orienting the bird's body toward the working zone. The bird's back engaging element 165 is also displaceably coupled to the working end 103 of main linear displacement actuator 101, using a second linear displacement actuator 164 having its base 169 being secured to the working end 103 using another portion of mounting plate 160, and having its own working end 171 attached to bird's back engaging element 165. Such configuration provides selective displacement of the bird's back engaging element 165 relative to the driving mechanism 99 between a bird's back engaging position for orienting the bird's body toward the working zone allowing the operation of the trussing module 45 according to the trussing pattern, and a retracted position, as will be explained below in more detail.

Figure 18B:
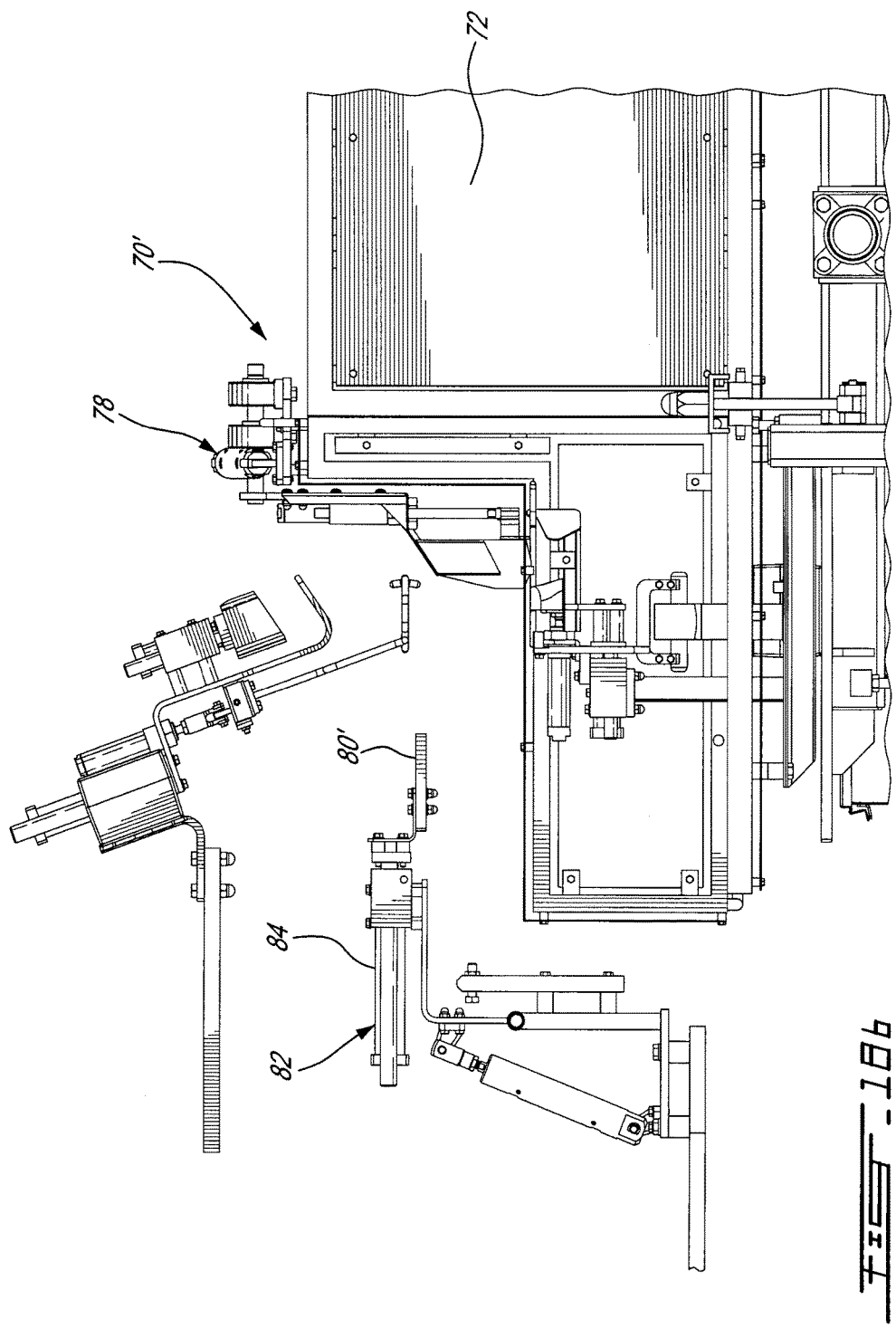
Figure 18C:
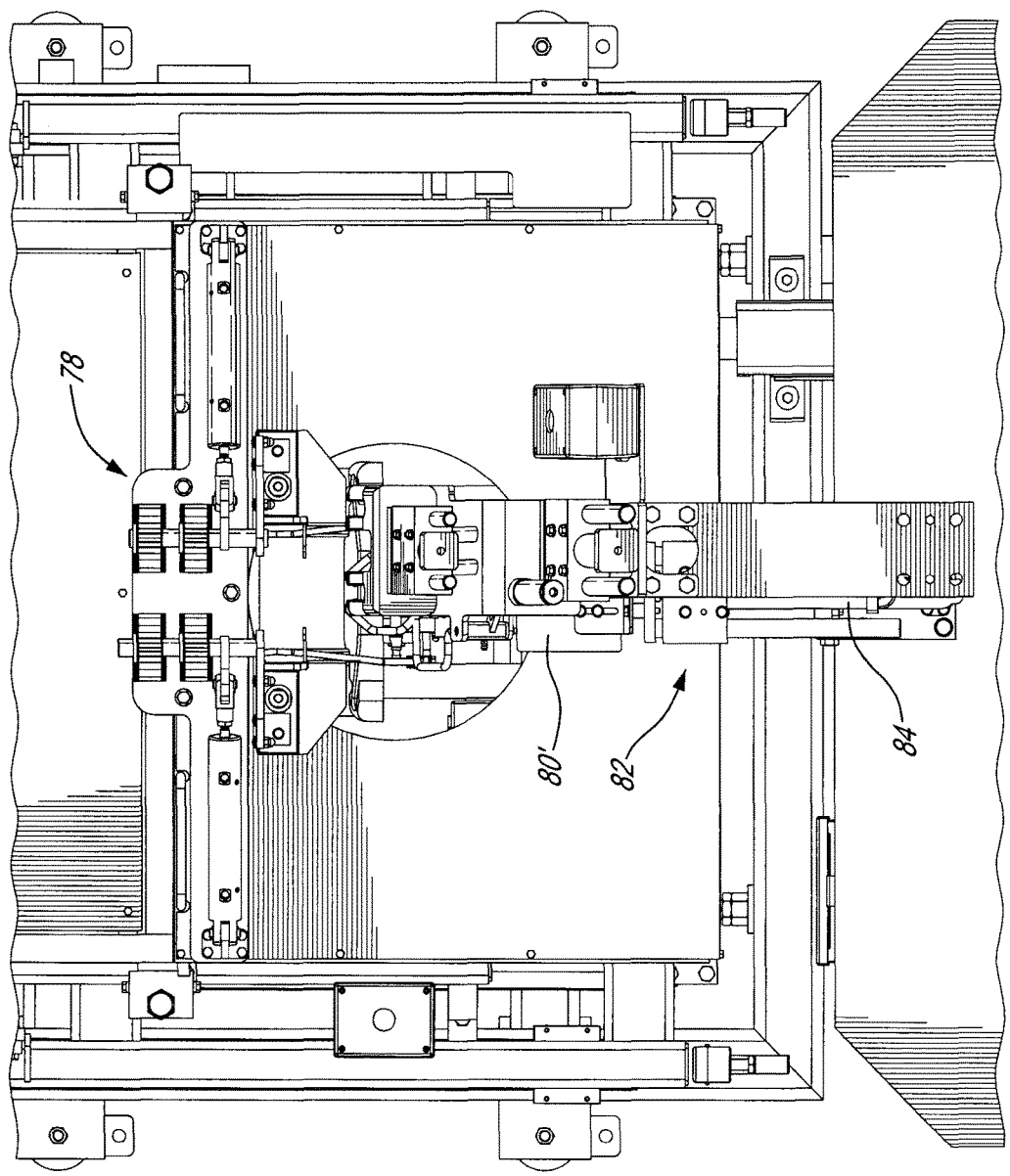
FIG. 18c is a plan view of the bird holder and second trussing station of FIG. 18a, illustrated with the front cover of the trussing module.

The operation of the alternate embodiment of first bird trussing station 44' will now be explained in view of FIGS. 17d to 17i. Referring now to FIG. 17d, the first actuator 162 having been brought to its fully extended position during a previous operation cycle, the main actuator 101 is operated toward its fully extended position, causing the element 56' to engage the bird's legs and push thereof toward the working zone, while the bird's flank engaging elements 66, 66' have been brought to their release position to allow that movement. To increase processing rate, It can be appreciated that the operation of actuators 101 may be programmed on the controller to begin during the last phase of the indexing movement of the carousel, provided the engagement of element 56' with the bird 20 occurs when the latter reaches the working position associated with trussing station 44'. By comparing FIG. 17d with FIG. 17b, it can be seen that the trussing module 45 has been tilted to bring the trussing plane to the predetermined tilt "α" of about 20° with respect to a horizontal plane. Just following or simultaneously to the bird's legs engaging operation and as shown in FIG. 17e, the driving mechanism 111 is operated to cause the bird's neck engaging element 64 to push the bird's neck toward the working zone, and the bird's wings are brought and maintained away from the bird's flanks by the elements 46, 46' through the action of biasing mechanisms 47, 47'. Operation of biasing mechanisms can also be programmed to occur after the movement of the bird's neck engaging element 64, provided the bird's wings are brought and maintained away from the bird's flanks when the trussing operation is performed. Then, as shown in FIG. 17f, the bird holder 25 is caused to move the bird downwardly within the vertical plane toward the working zone, while action of the pivoting mechanism 107 within the vertical plane allow the bird's leg engaging element 56' to follow the downward movement of the bird toward the working zone. Simultaneously to the downward movement of the bird holder 25 and as shown in FIG. 17g, the second actuator 164 is operated toward its fully extended position, causing the element 165 to engage the bird's back to push thereof toward the working zone and maintain the bird 20 in the desired predetermined position and orientation relative to the working zone. Then, as shown in FIG. 17h, as the bird holder 25 has been brought to its lower position, the first actuator 162 is operated back to its retracted position, causing the element 56' to release the bird's legs. Simultaneously, the driving mechanism 111 is operated backward to cause the element 64 to release the neck of the bird, which has been now brought to an appropriate position for trussing. Then, while the bird 20 is maintained by the bird's back engaging element 165 in the desired predetermined position and orientation relative to the working zone, the trussing module 45 is operated according to the trussing pattern by which a cord 102, used as the trussing element in the example shown, catches and maintains the bird 20 in a trussed condition, wherein the cord 102 is passed around the bird's wing shoulder, transversely the bird's back and around the crossed legs according to the chosen trussing pattern. Referring to FIG. 17i, the second actuator 164 is operated backward toward its fully retracted position to release the bird's back. Then, after reset of the trussing module 45 tilt back to its lower value of about 10° and backward operation of the main actuator 101 to its retracted position, the bird is brought out of the working zone through upward movement of holder 25 and the elements 66, 66' are brought to their bird's flank engaging positions to allow that the transport of the bird to the next station. Finally, to be in a proper setting for a next operation cycle of the trussing station 44', the first actuator 162 is brought to its fully extended position and the biasing mechanisms 47, 47' are returned to their release positions to bring the bird's wing engaging elements 46 ,46' in a position ready to receive a next bird to be trussed. Turning now to FIG. 18a, an alternate embodiment of second bird trussing station 70' that may be used by the system will now be described in view of FIGS. 18b and 18c. In that alternate trussing station 70', the mechanical arrangement 78 includes a bird's back engaging element 80' used as the means for engaging the bird's body, coupled to the driving mechanism 82 for orienting the bird's body toward the further working zone in a different manner, as will be explained later in more detail. However, apart from the use of a bird's back engaging element rather that a bird's legs engaging element, the alternate embodiment of second trussing station 70' is identical to the embodiment as described above in view of FIGS. 7a to 7c. The working end 86 of the linear displacement mechanism 84 provided on the driving mechanism 82 is coupled to the bird's leg engaging element 80 in such a manner that its end portion is disposed to engage the back of the bird rather that its legs. Such contacting configuration is particularly well adapted to a bird on which a first fastening element has been previously applied according to the trussing pattern used by the alternate first trussing station 44' as described above, wherein the fastening element is passed near the ends of the crossed bird's legs. In order to prevent any adverse interference of the applied fastening element with the bird's body engaging element, the latter is in this case is preferably designed to engage the bird's body sufficiently away from the bird's legs, which result can be obtained with birds' back engaging element 80'.

The mode of operation of the alternate second trussing station as described above will now be explained in view of FIGS. 18d to 18l, in view of FIG. 18a. First, the bird 20 is transported to the working position associated with the trussing station 70' using the bird holder 25 as shown in FIG. 18d. Then, the bird is brought within the working zone defined by the trussing module 72 in predetermined position and orientation relative to the second trussing plane associated with the working zone, in a manner that will now be explained in view of FIGS. 18*e* to 18*l*. As shown in FIG. 18*e*, the driving mechanism 68 is operated to bring the bird's flank engaging elements 66, 66' to the bird's flank releasing position, and the driving mechanism 82 is operated through its displacement mechanism 84 to push forward the bird's back engaging element 80', to orient the body of bird 20 toward the working zone of the trussing module 72, above the bird receiving element 79. To increase processing rate, It can be appreciated that the operation of driving mechanisms 68 and 82 may be programmed on the controller to begin during the last phase of the indexing movement of the carousel, provided the engagement of element 80' with the bird 20 occurs when the latter reaches the working position associated with trussing station 70'. Then, as shown in FIG. 18*f*, the linear displacement mechanism 62 mechanically coupled to the bird holder 25 is operated for moving the bird 20 within the vertical plane toward the working zone, while the pivoting mechanism 90 to which is mounted the driving mechanism 82, allows the bird's back engaging element 80' to follow the bird movement toward the working zone. Thereafter, as shown in FIG. 18*g*, the driving mechanisms 87, 87' are operated to bring the bird's wing elbow engaging elements 85, 85' to their respective positions for maintaining the bird's wing elbows 116. Then, as shown in FIG. 18*h*, the second driving mechanisms 93, 93' are operated for moving the bird's wing wrist engaging elements 92, 92' to push the bird's wings 118 toward the working zone. Thereafter, as shown in FIG. 18*i*, the driving mechanism 83 is operated for moving the bird's shoulder engaging element 81 in a direction substantially perpendicular to chest of the bird 20, for stabilizing the bird's body in that direction. Then, the driving mechanism 91 is operated for moving inwardly the opposed bird's wing forearm engaging elements 89, 89' for maintaining the bird's wing forearms 122 against the bird's flanks 124, as shown in FIG. 18*j*. Thereafter or simultaneously to the latter step and as shown in FIG. 18*k*, the driving mechanism 94 is operated for moving the bird's wing tips engaging elements 98, 98' to urge the bird's wing tips 130 toward the bird's back. Thereafter, as shown in FIG. 18*l*, the driving mechanism 93, 93' are operated back to bring the elements 92, 92' to their respective bird's wing wrist releasing position, since the bird 20 is finally brought within the working zone 131 in the predetermined position and orientation relative to the trussing plane. Then, the trussing module 72 is operated according to the second trussing pattern, and once the bird has been trussed, the various moving elements included in the trussing station 70' are operated in an inverted way to ultimately release the trussed bird in the same manner as explained before with respect to the first embodiment of second trussing station 70. by which the cord 132 passes transversely around the bird's chest 134 and bird's back 136 to catch and maintain the bird's wings 138 against the bird's flanks 106. Once the bird has been trussed, the various moving elements included in the second trussing station 70 are operated in an inverted way to ultimately release the trussed bird 20.

The invention claimed is:

1. A system for trussing slaughtered birds, comprising:
   a conveyer provided with at least one bird holder for transporting a bird to at least one working position along the transport path of the conveyer;
   a bird trussing station located at said working position, including a trussing module defining a working zone and a mechanical arrangement for bringing the bird within the working zone in predetermined position and orientation relative thereto to allow for operation of the trussing module according to a trussing pattern by which a trussing element catches and maintains the bird in a trussed condition; and
   a controller operatively connected to the conveyer and the bird trussing station.

2. The system according to claim 1, wherein said working zone is associated with a trussing plane passing therethrough and relative to which said position and orientation are predetermined.

3. The system according to claim 2, wherein said bird holder has first and second bird's leg end securing devices each having a leg suspending element cooperating with a leg end locking element capable of being moved between a leg end locking position and a leg end releasing position allowing the leg end to be selectively engaged by and disengaged from the leg suspending element, said system further comprising a bird's legs crossing station operatively connected to said controller and located at a working position upstream said trussing station, said bird's legs crossing station including a device for transferring one of the bird's leg ends initially secured to one of said leg end securing devices to the other one of said leg end securing devices which is capable of securing both leg ends of the bird in a crossed legs attitude, wherein said trussing pattern involves trussing of bird's legs.

4. The system according to claim 3, further comprising a bird's legs flexing station operatively connected to said controller and located at a working position upstream said trussing station, said bird's legs flexing station including a bird's body engaging element coupled to a driving mechanism for compressing the bird against said leg end securing devices upon operation of said driving mechanism to flex bird's legs sufficiently to provide relaxation thereof.

5. The system according to claim 4, wherein the working position of said bird's legs flexing station is upstream said bird's legs crossing station.

6. The system according to claim 5, wherein said driving mechanism includes a linear displacement mechanism having a working end coupled to said bird's body engaging element and a base mounted to a pivoting mechanism acting within a vertical plane.

7. The system according to claim 3, wherein said leg end transferring device includes a mechanism for pushing said leg end being transferred to disengage thereof from said leg suspending element, a mechanism for displacing said leg end being transferred in alignment with the leg suspending element of the other one of said leg end securing devices, and a mechanism for pushing said leg end being transferred in engagement with the leg suspending element of the other one of said leg end securing devices.

8. The system according to claim 7, wherein said bird's legs crossing station further includes a bird's body engaging device coupled to a first driving mechanism for bringing and maintaining the bird in a predetermined position within a vertical plane while the leg end being transferred is disengaged from said leg suspending element, and to a second driving mechanism for moving the bird in a direction transverse to said vertical plane to bring the bird in substantial alignment with the other one of said leg end securing devices while the leg end being transferred is displaced in alignment with the leg suspending element of the other one of said leg end securing devices.

9. The system according to claim 8, wherein said mechanism for pushing said leg end is coupled to said second driving mechanism so as to be moved in the direction transverse to said vertical plane while the leg end being transferred is displaced in alignment with the leg suspending element of the other one of said leg end securing devices.

10. The system according to claim 2, wherein said bird trussing station further includes a pair of opposed bird's wing engaging elements coupled to a biasing mechanism for maintaining the bird's wings away from the bird's flanks to allow the trussing element to pass around the bird's wing shoulder and transversely the bird's back according to said trussing pattern.

11. The system according to claim 2, wherein said mechanical arrangement includes a bird receiving element disposed within said working zone for maintaining the bird in said predetermined position and orientation relative to said trussing plane.

12. The system according to claim 11, wherein said bird receiving element is coupled to said trussing module with a biasing device to provide bird's size adaptation.

13. The system according to claim 11, wherein said mechanical arrangement further includes a tilting mechanism coupled to said trussing module to bring said trussing plane to a predetermined tilt with respect to a horizontal plane.

14. The system according to claim 13, wherein said mechanical arrangement further includes a displaceable carrier supporting said trussing module to bring thereof to a predetermined position with respect to said conveyer.

15. The system according to claim 11, wherein said mechanical arrangement further includes a bird's leg engaging element coupled to a driving mechanism for orienting the bird's body toward said working zone.

16. The system according to claim 15, wherein said mechanical arrangement further includes, for each said bird holder, a linear displacement mechanism mounted on said conveyer and coupled to said bird holder for moving the bird within a vertical plane toward said working zone.

17. The system according to claim 16, wherein said driving mechanism for orienting the bird's body includes a main linear displacement actuator having a working end coupled to said bird's leg engaging element and a base mounted to a pivoting mechanism acting within said vertical plane while the bird is moved toward said working zone.

18. The system according to claim 17, wherein said mechanical arrangement further includes a bird's back engaging element coupled to said driving mechanism for further orienting the bird's body toward said working zone.

19. The system according to claim 18, wherein said bird's leg engaging element is displaceably coupled to the working end of said main linear displacement actuator using a first linear displacement actuator to provide selective displacement of the bird's leg engaging element relative to the driving mechanism between a bird's leg engaging position for orienting the bird's body toward said working zone and a retracted position allowing the operation of the trussing module according to the trussing pattern.

20. The system according to claim 19, wherein said bird's back engaging element is displaceably coupled to the working end of said main linear displacement actuator using a second linear displacement actuator to provide selective displacement of the bird's back engaging element relative to the driving mechanism between a bird's back engaging position for orienting the bird's body toward said working zone allowing the operation of the trussing module according to the trussing pattern, and a retracted position.

21. The system according to claim 15, wherein said mechanical arrangement further includes a bird's neck engaging element coupled to a driving mechanism for pushing the bird's neck toward said working zone.

22. The system according to claim 2, wherein each said bird holder is provided with a pair of opposed bird's flank engaging elements coupled to a driving mechanism for laterally stabilizing the bird during transport thereof.

23. The system according to claim 2, wherein said trussing pattern involves trussing of bird's legs, said system further comprising a further bird trussing station operatively connected to said controller and located at a further working position, said further bird trussing station including a further trussing module defining a further working zone and a further mechanical arrangement for bringing the bird within the further working zone in further predetermined position and orientation relative thereto to allow for operation of the further trussing module according to a further trussing pattern by which a further trussing element passes transversely around the bird's wing chest and bird's back to catch and maintain the bird's wings against the bird's flanks.

24. The system according to claim 23, wherein said further working zone is associated with a further trussing plane passing therethrough and relative to which said further position and orientation are predetermined.

25. The system according to claim 24, wherein each said bird holder is provided with a pair of opposed bird's flank engaging elements coupled to a driving mechanism operable to cause said flank engaging elements to move between a bird's flank engaging position to laterally stabilize the bird and a bird's flank releasing position, said controller being programmed to operate said driving mechanism so that bird's flank engaging elements are successively brought to the bird's flank engaging position following the operation of said trussing module to stabilize the bird during transport thereof out of said working position, to the bird's flank releasing position when the conveyer is caused to stop the holder at a bird resting position, and then back to the bird's flank engaging position to stabilize the bird during transport thereof to said further working position in a proper attitude for being brought by said further mechanical arrangement within the further working zone in the further predetermined position and orientation relative to the further trussing plane.

26. The system according to claim 24, wherein said further mechanical arrangement includes a bird receiving element disposed within said working zone for maintaining the bird in said predetermined position and orientation relative to said further trussing plane.

27. The system according to claim 26, wherein said further mechanical arrangement further includes a bird's body engaging element coupled to a driving mechanism for orienting the bird's body toward said further working zone.

28. The system according to claim 27, wherein said further mechanical arrangement further includes, for each said bird holder, a linear displacement mechanism mounted on said conveyer and coupled to said bird holder for moving the bird within a vertical plane toward said further working zone.

29. The system according to claim 28, wherein said driving mechanism for orienting the bird's body includes a linear displacement mechanism having a working end coupled to said bird's body engaging element and a base mounted to a pivoting mechanism acting within said vertical plane while the bird is moved toward said working zone.

30. The system according to claim 29, wherein said bird's body engaging element is one of a bird's leg engaging element and a bird's back engaging element.

31. The system according to claim 26, wherein said further mechanical arrangement further includes a pair of opposed bird's wing elbow engaging elements coupled to a pair of first driving mechanisms for maintaining the bird's wing elbow against the bird's flank.

32. The system according to claim 31, wherein said further mechanical arrangement further includes a pair of bird's wing wrist engaging elements coupled to a pair of second driving mechanisms for pushing the bird's wing wrists toward said further working zone.

33. The system according to claim 32, wherein said first driving mechanisms are pivotally operable to move said bird's wing elbow engaging elements between a bird's wing elbow maintaining position and a bird's wing elbow releasing position.

34. The system according to claim 33, wherein each said second driving mechanism is a linear displacement mechanism having a working end coupled to a respective one of said bird's wing wrist engaging element and a base mounted to a respective one of said first driving mechanisms, said second driving mechanisms being operable when the operating status of said first driving mechanisms corresponds to said bird's wing elbow maintaining position.

35. The system according to claim 32, wherein said further mechanical arrangement further includes a bird's shoulder engaging element coupled to a driving mechanism for stabilizing the bird's body in a direction substantially perpendicular to the bird's chest.

36. The system according to claim 35, wherein said further mechanical arrangement further includes a pair of opposed bird's wing forearm engaging elements coupled to a driving mechanism for maintaining the bird's wing forearms against the bird's flanks.

37. The system according to claim 36, wherein said further mechanical arrangement further includes a pair of bird's wing tips engaging elements coupled to a driving mechanism for urging the bird's wing tips toward the bird's back.

38. The system according to claim 37, wherein said tips engaging elements are coupled to said driving mechanism through said bird receiving element.

39. The system according to claim 37, wherein each said second driving mechanism) is operable to cause the corresponding one of said bird's wing wrist engaging element to move from the bird's wing wrist engaging position to the bird's wing wrist releasing position as said bird is brought within the further working zone in said further predetermined position and orientation relative to the further trussing plane prior to the operation of said further trussing module.

40. The system according to claim 2, further comprising a trussed bird discharging station operatively connected to said controller and located at a last one of said working positions, said trussed bird discharging station including a bird's leg engaging element coupled to a driving mechanism for pushing the trussed bird out of the bird holder.

41. The system according to claim 2, wherein said conveyer is a carousel, the bird being transported along a circular path to said at least one working position.

42. A method for trussing a slaughtered bird, comprising the steps of:
 i) transporting the bird to a working position with a bird holder;
 ii) providing a trussing module at said working position, said trussing module defining a working zone;
 iii) bringing the bird within the working zone in predetermined position and orientation relative to said working zone; and
 iv) operating the trussing module according to a trussing pattern by which a trussing element catches and maintains the bird in a trussed condition.

43. The method according to claim 42, wherein said working zone is associated with a trussing plane passing therethrough and with reference to which said position and orientation are predetermined.

44. The method according to claim 43, wherein said step iii) includes the step of:
 a) engaging the bird's legs to push thereof toward the working zone;
 b) engaging the bird's neck to push thereof toward the working zone;
 c) engaging the bird's wings to maintain thereof away from the bird's flanks;
 d) engaging the bird's back to push thereof toward the working zone and maintain said predetermined position and orientation of the bird relative to the working zone; and
 e) releasing the bird's legs and bird's neck.

45. The method according to claim 43, wherein said bird holder has first and second bird's leg end securing devices, said method further comprising before said step i) the step of:
 i') crossing the bird legs by transferring one of the bird's leg ends initially secured to one of said leg end securing devices to the other one of said leg end securing devices which is capable of securing both leg ends of the bird disposed in a crossed legs position.

46. The method of claim 45, wherein each said leg end securing device has a leg suspending element cooperating with a leg end locking element capable of being moved between a leg end locking position and a leg end releasing position allowing the leg end to be selectively engaged by and disengaged from said leg suspending element, said step i') including the steps of:
 a) moving each said leg end locking element to the leg end releasing position;
 b) pushing said leg end being transferred to disengage thereof from said leg suspending element;
 c) displacing said leg end being transferred in alignment with the leg suspending element of the other one of said leg end securing devices;
 d) pushing said leg end being transferred in engagement with the leg suspending element of the other one of said leg end securing devices; and
 e) moving the leg end locking element cooperating with the leg suspending element of the other one of said leg end securing devices to the leg end locking position.

47. The method according to claim 46, wherein said step i') further includes the steps of:
 b') bringing and maintaining the bird in a predetermined position within a vertical plane while the leg end being transferred is disengaged from said leg suspending element; and
 c') moving the bird in a direction transverse to said vertical plane to bring the bird in substantial alignment with the other one of said leg end securing devices while the leg end being transferred is displaced in alignment with the leg suspending element of the other one of said leg end securing devices.

48. The method according to claim 45, further comprising before said step i) the step of:
 i") compressing the bird against said leg end bird holder to flex bird's legs sufficiently to provide relaxation thereof.

49. The method according to claim 48, wherein said step i") is performed prior to said step i').

50. The method according to claim 43, wherein step iv) is performed while maintaining the bird's wings away from the bird's flanks to allow the trussing element to pass around the bird's wing shoulder and transversely the bird's back according to said trussing pattern.

51. The method according to claim 43, wherein step iii) includes the step of:
   a) tilting said trussing module to bring said trussing plane to a predetermined tilt with respect to a horizontal plane.

52. The method according to claim 43, wherein said trussing pattern involves trussing of bird's legs, said method further comprising after said step iv) the steps of:
   v) transporting the bird to a further working position with the bird holder;
   vi) providing a further trussing module at said further working position, said further trussing module defining a further working zone associated with a further trussing plane passing therethrough;
   vii) bringing said bird within said further working zone in further predetermined position and orientation relative to said further trussing plane; and
   viii) operating the further trussing module according to a further trussing pattern by which a further trussing element passes transversely around the bird's wing chest and bird's back to catch and maintain the bird's wings against the bird's flanks.

53. The method according to claim 52, wherein said step vii) includes the step of:
   a) maintaining the bird's wing elbow against the bird's flank.

54. The method according to claim 53, wherein said step vii) further includes the steps of:
   b) engaging the bird wing wrists to push thereof toward said further working zone;
   c) stabilizing the bird's body in a direction substantially perpendicular to the bird's chest;
   d) maintaining the bird's wing forearms against the bird's flanks;
   e) urging the bird's wing tips toward the bird's back; and
   f) releasing said bird wing wrists.

55. The method according to claim 53, wherein said step v) includes the steps of:
   a) engaging the bird's flanks to stabilize the bird while moving said bird holder to transport the bird out of said working position;
   b) stopping the bird holder at a bird resting position and then releasing the bird's flanks; and
   c) engaging the bird's flank to stabilize the bird during transport thereof to said further working position in a proper attitude for being brought within the further working zone in the further predetermined position and orientation relative to the further trussing plane.

56. The method according to claim 43, further comprising the steps of:
   v) pushing the bird out of the bird holder.

\* \* \* \* \*